(12) United States Patent
Hunegnaw et al.

(10) Patent No.: US 12,116,683 B2
(45) Date of Patent: Oct. 15, 2024

(54) SYSTEM AND METHOD FOR METHANE PRODUCTION

(71) Applicant: Twelve Benefit Corporation, Berkeley, CA (US)

(72) Inventors: Sara Hunegnaw, Berkeley, CA (US); Ajay R. Kashi, Berkeley, CA (US); Kendra P. Kuhl, Berkeley, CA (US); Morgan George, Berkeley, CA (US); Sichao Ma, Berkeley, CA (US); Ziyang Huo, Berkeley, CA (US); Etosha R. Cave, Berkeley, CA (US); Kenneth X. Hua, Berkeley, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 0 days.

(21) Appl. No.: 16/736,615

(22) Filed: Jan. 7, 2020

(65) Prior Publication Data
US 2020/0216968 A1 Jul. 9, 2020

Related U.S. Application Data

(60) Provisional application No. 62/864,122, filed on Jun. 20, 2019, provisional application No. 62/789,371, filed on Jan. 7, 2019.

(51) Int. Cl.
*C25B 9/23* (2021.01)
*C25B 3/25* (2021.01)
(Continued)

(52) U.S. Cl.
CPC .................. *C25B 9/23* (2021.01); *C25B 3/25* (2021.01); *C25B 11/075* (2021.01); *C25B 11/091* (2021.01); *C25B 13/08* (2013.01)

(58) Field of Classification Search
CPC .... C25B 3/25; C25B 3/26; C25B 9/23; C25B 11/051; C25B 11/052; C25B 11/054; C25B 11/057; C25B 11/075; C25B 11/091
See application file for complete search history.

(56) References Cited

U.S. PATENT DOCUMENTS

| 4,042,496 A | 8/1977 | Tsushima et al. |
| 4,176,215 A | 11/1979 | Molnar et al. |

(Continued)

FOREIGN PATENT DOCUMENTS

| CA | 1-81143 A2 | 2/1980 |
| CA | 3070723 A1 | 1/2019 |

(Continued)

OTHER PUBLICATIONS

Nafion XL, FuelCellStore, Product Bulletin P-22 (Year: 2016).*
(Continued)

*Primary Examiner* — Luan V Van
*Assistant Examiner* — Mofoluwaso S Jebutu
(74) *Attorney, Agent, or Firm* — Weaver Austin Villeneuve & Sampson LLP

(57) ABSTRACT

Provided herein are systems and methods for operating carbon oxide ($CO_x$) reduction reactors (CRRs) for producing methane ($CH_4$). Embodiments of the systems and methods may also be used for producing other organic compounds including alcohols, carboxylic acids, and other hydrocarbons such as ethylene ($CH_2CH_2$). According to various embodiments, the systems and methods may be characterized by one or more of the following features. In some embodiments, a membrane electrode assembly (MEA) includes a cathode catalyst layer with a relatively low catalyst loading. In some embodiments, a bipolar MEA includes a thin cation-conducting layer and a thin anion- (Continued)

conducting layer, with the cation-conducting layer being thicker than the anion-conducting layer. In other embodiments a pure anion exchange polymer only membrane may be used to bridge the cathode catalyst and the anode catalyst. These and other features are described further below.

29 Claims, 21 Drawing Sheets

(51) Int. Cl.
    *C25B 11/075*     (2021.01)
    *C25B 11/091*     (2021.01)
    *C25B 13/08*     (2006.01)

(56) References Cited

U.S. PATENT DOCUMENTS

| | | | |
|---|---|---|---|
| 4,609,440 A | 9/1986 | Frese et al. | |
| 4,828,941 A | 5/1989 | Sterzel | |
| 4,921,586 A | 5/1990 | Molter | |
| 4,959,131 A * | 9/1990 | Cook | C25B 9/23 205/462 |
| 5,601,937 A | 2/1997 | Isenberg | |
| 5,992,008 A * | 11/1999 | Kindler | H01M 8/1004 29/730 |
| 6,358,651 B1 | 3/2002 | Chen et al. | |
| 7,605,293 B2 | 10/2009 | Olah et al. | |
| 7,608,356 B2 | 10/2009 | Risen et al. | |
| 7,704,369 B2 | 4/2010 | Olah et al. | |
| 7,883,817 B2 * | 2/2011 | Hori | H01M 4/8882 429/480 |
| 8,137,859 B2 | 3/2012 | Shin et al. | |
| 8,268,026 B2 | 9/2012 | Norbeck et al. | |
| 8,277,631 B2 | 10/2012 | Eastman et al. | |
| 8,652,104 B2 | 2/2014 | Goral et al. | |
| 8,652,704 B2 | 2/2014 | Sano et al. | |
| 8,658,016 B2 | 2/2014 | Lakkaraju et al. | |
| 8,721,866 B2 | 5/2014 | Sivasankar et al. | |
| 8,845,875 B2 | 9/2014 | Teamey et al. | |
| 8,845,878 B2 | 9/2014 | Cole et al. | |
| 8,956,990 B2 | 2/2015 | Masel et al. | |
| 9,012,345 B2 | 4/2015 | Masel et al. | |
| 9,145,615 B2 | 9/2015 | Zhai et al. | |
| 9,181,625 B2 | 11/2015 | Masel et al. | |
| 9,193,593 B2 | 11/2015 | Masel et al. | |
| 9,370,773 B2 | 6/2016 | Masel et al. | |
| 9,464,359 B2 | 10/2016 | Masel et al. | |
| 9,481,939 B2 | 11/2016 | Masel et al. | |
| 9,555,367 B2 | 1/2017 | Masel et al. | |
| 9,566,574 B2 | 2/2017 | Masel et al. | |
| 9,580,824 B2 | 2/2017 | Masel et al. | |
| 10,975,480 B2 | 4/2021 | Masel | |
| 10,975,481 B2 | 4/2021 | Guo et al. | |
| 11,578,415 B2 | 2/2023 | Cave et al. | |
| 2003/0059658 A1 | 3/2003 | Kohler et al. | |
| 2005/0239912 A1 | 10/2005 | Archella et al. | |
| 2006/0016685 A1 | 1/2006 | Hawkins et al. | |
| 2008/0045401 A1 | 2/2008 | Zhou et al. | |
| 2008/0318093 A1 | 12/2008 | Lee et al. | |
| 2009/0155102 A1 | 6/2009 | Park et al. | |
| 2010/0068592 A1 | 3/2010 | Akiyama et al. | |
| 2011/0237830 A1 | 9/2011 | Massel | |
| 2012/0171583 A1 | 7/2012 | Bocarsly et al. | |
| 2012/0328942 A1 | 12/2012 | Thomas-Alyea et al. | |
| 2013/0105304 A1 | 5/2013 | Kaczur et al. | |
| 2013/0118911 A1 | 5/2013 | Sivasankar et al. | |
| 2013/0345325 A1 | 12/2013 | Lecomte et al. | |
| 2014/0027303 A1 | 1/2014 | Cole et al. | |
| 2014/0093799 A1 * | 4/2014 | Masel | C25B 9/19 429/422 |
| 2014/0206894 A1 | 7/2014 | Cole et al. | |
| 2014/0206896 A1 | 7/2014 | Sivasankar et al. | |
| 2014/0291163 A1 | 10/2014 | Kanan et al. | |
| 2015/0010804 A1 | 1/2015 | Laramie et al. | |
| 2015/0030888 A1 | 1/2015 | Popat et al. | |
| 2015/0064602 A1 | 3/2015 | Lee et al. | |
| 2015/0136613 A1 | 5/2015 | Li et al. | |
| 2015/0267309 A1 * | 9/2015 | Kaczur | C25B 3/25 204/263 |
| 2016/0107154 A1 | 4/2016 | Masel et al. | |
| 2016/0161869 A1 | 6/2016 | Avneri | |
| 2017/0183789 A1 | 6/2017 | Matthews et al. | |
| 2017/0204525 A1 * | 7/2017 | Mutoro | C25B 1/02 |
| 2017/0259206 A1 | 9/2017 | Masel et al. | |
| 2017/0321333 A1 | 11/2017 | Kuhl et al. | |
| 2017/0321334 A1 | 11/2017 | Kuhl et al. | |
| 2018/0057950 A1 | 3/2018 | Co et al. | |
| 2018/0111083 A1 | 4/2018 | Masel | |
| 2018/0151890 A1 | 5/2018 | Ishida et al. | |
| 2018/0265440 A1 * | 9/2018 | Kudo | C25B 1/04 |
| 2018/0274109 A1 | 9/2018 | Kudo et al. | |
| 2018/0274114 A1 * | 9/2018 | Ono | C25B 1/04 |
| 2019/0062931 A1 | 2/2019 | Stark et al. | |
| 2019/0085477 A1 * | 3/2019 | Ono | C25B 1/00 |
| 2019/0127865 A1 | 5/2019 | Li et al. | |
| 2019/0226103 A1 | 7/2019 | Kuhl et al. | |
| 2020/0056294 A1 | 2/2020 | Kanan et al. | |
| 2020/0080211 A1 | 3/2020 | Schmid et al. | |
| 2020/0220185 A1 | 7/2020 | Ma et al. | |
| 2020/0240023 A1 | 7/2020 | Cave et al. | |
| 2020/0270756 A1 | 8/2020 | Kofuji et al. | |
| 2020/0308718 A1 * | 10/2020 | Patru | H01M 8/1053 |
| 2020/0376479 A1 | 12/2020 | Masel | |
| 2021/0002775 A1 | 1/2021 | Matsumoto et al. | |
| 2021/0292924 A1 | 9/2021 | Sargent et al. | |
| 2023/0155153 A1 | 5/2023 | Huo et al. | |

FOREIGN PATENT DOCUMENTS

| | | | |
|---|---|---|---|
| CN | 108570690 A | 9/2018 | |
| CN | 108624896 A | 10/2018 | |
| DE | 102014224013 A1 | 5/2016 | |
| DE | 102017208610 A1 | 11/2018 | |
| EP | 3375907 A1 | 9/2018 | |
| EP | 3378968 | 9/2018 | |
| EP | 3378969 A1 | 9/2018 | |
| EP | 3434810 A1 | 1/2019 | |
| JP | 100962903 | 6/2010 | |
| JP | 2012112001 A | 6/2012 | |
| JP | 2015533944 A | 11/2015 | |
| JP | 2016102245 A | 6/2016 | |
| JP | 2018031034 A | 3/2018 | |
| JP | 2018150592 A | 9/2018 | |
| JP | 2018150595 A | 9/2018 | |
| WO | WO-2013089112 A1 * | 6/2013 | B01J 31/1805 |
| WO | WO 2016/039999 A1 | 3/2016 | |
| WO | WO-2017144395 A1 | 8/2017 | |
| WO | WO-2017169682 A1 | 10/2017 | |
| WO | WO-2017176306 A1 | 10/2017 | |
| WO | WO-2017192788 A1 | 11/2017 | |
| WO | WO2018195045 | 10/2018 | |
| WO | WO2018/215174 | 11/2018 | |
| WO | WO2019185622 | 10/2019 | |
| WO | WO-2019206882 A1 | 10/2019 | |
| WO | WO2020020691 A | 1/2020 | |
| WO | WO-2020132064 A1 | 6/2020 | |
| WO | WO2020143970 A | 7/2020 | |

OTHER PUBLICATIONS

I. Merino-Garcia, J. Albo, A. Irabien, Productivity and Selectivity of Gas-Phase CO2 Electroreduction to Methane at Copper Nanoparticle-Based Electrodes, Dec. 14, 2016, Energy Technol. 2017, 5, 922. (Year: 2016).*

Ren, D., Fong, J. & Yeo, B.S. The effects of currents and potentials on the selectivities of copper toward carbon dioxide electroreduction. Nat Commun 9, 925 (2018). (Year: 2018).*

Olga A. Baturina et al., CO2 Electroreduction to Hydrocarbons on Carbon-Supported Cu Nanoparticles, ACS Catalysis 2014 4 (10), 3682-3695 (Year: 2014).*

(56) References Cited

OTHER PUBLICATIONS

Office Action issued in issued on Nov. 1, 2018, in U.S. Appl. No. 15/586,173.
Office Action issued in issued on Apr. 2, 2019, in U.S. Appl. No. 15/586,173.
Final Office Action issued in issued on Jan. 8, 2020, in U.S. Appl. No. 15/586,173.
Notice of Allowance issued in issued on Jan. 29, 2020, in U.S. Appl. No. 15/586,173.
Office Action issued in issued on Nov. 1, 2018, in U.S. Appl. No. 15/586,182.
Final Office Action issued in issued on Apr. 2, 2019, in U.S. Appl. No. 15/586,182.
Office Action issued on Dec. 30, 2019, in U.S. Appl. No. 15/586,182.
International Search Report and Written Opinion issued on Aug. 7, 2017, in PCT Application No. PCT/US2017/030935.
International Search Report and Written Opinion issued on Sep. 13, 2017, in PCT Application No. PCT/US2017/030936.
Preliminary Report on Patentability issued on Nov. 6, 2018, in PCT Application No. PCT/US2017/030936.
International Search Report and Written Opinion of the ISA, dated Apr. 30, 2019, for application No. PCT/US19/14586.
CA Office Action issued on Oct. 15, 2019, in Application No. 3,022,807.
EP Search Report issued on Dec. 2, 2019, in Application No. 17793299.3.
EP Search Report issued on Dec. 4, 2019, in Application No. 17793300.9.
CA Office Action issued on Sep. 30, 2019, in Application No. 3,022,812.
Li, et al., "Electrolysis of $CO_2$ to Syngas in Bipolar Membrane-Based Electrochemical Cells," ACS Publications, ACS Energy Letters, 2016, 1, pp. 1149-1153.
Lu et al. "A selective and efficient electrocatalyst for carbon dioxide reduction," Nature communication, Jan. 30, 2014.
Pătru, A., et al., "Design Principles of Bipolar Electrochemical Co-Electrolysis Cells for Efficient Reduction of Carbon Dioxide from Gas Phase at Low Temperature," Journal of The Electrochemical Society, 166 (2), (2019), pp. F34-F43.
Delacourt, C., "Electrochemical reduction of carbon dioxide and water to syngas (CO + $H_2$) at room temperature," Manuscript, Environmental Energy Technologies Division, Lawrence Berkeley National Laboratory and Department of Chemical Engineering, University of California Berkeley, 2006-2007, 171 pages.
Aeshala, L.M. et al., "Effect of solid polymer electrolyte on electrochemical reduction of $CO_2$, Separation and Purification Technology," 94, (2012), pp. 131-137.
Kriescher, Stefanie M.A. et al., "A membrane electrode assembly for the electrochemical synthesis of hydrocarbons from $CO_2$)g) and $Ho_2$(g), Electrochemistry Communications," 50 (2015), pp. 64-68.
Srinivasan, S. et al., "Advances in Solid Polymer Electrolyte Fuel Cell Technology with Low Platinum Loading Electrodes," Journal of Power Sources, 22 (1988) pp. 359-375.
Zhu, Wenlei et al., "Monodisperse Au Nanoparticles for Selective Electrocatalytic Reduction of CO2 to CO.Journal of the American Chemical Society," 2013, 135, pp. 16833-16836.
Spets et al. "Direct Glucose Fuel Cell with Anion Exchange Membrane in the Near Neutral State Electrolyte,International Journal of Electrochemical Science," 7, 11696-11705, Dec. 1, 2012, entire document, http.electrochemsci .org/papers/vol?/71211696 .pdf.
Zhu, Wenlei et al., "Active and Selective Conversion of $CO_2$ to CO on Ultrathin Au Nanowires," Journal of American Chemical Society, 2014, 136, pp. 16132-16135.
Ren, D., et al., "Selective Electrochemical Reduction of Carbon Dioxide to Ethylene and Ethanol on Copper(I) Oxide Catalysts," ACS Catal., 2015, 5, pp. 2814-2821.
Ren, D., et al., "The effects of currents and potentials on the selectivities of copper toward carbon dioxide electroredution," Nature Communication, 2018, 9:925, pp. 1-8.
Xia, Chuan, et al., "Continuous production of pure liquid fuel solutions via electrocatalytic $CO_2$ reduction using solid electrolyte devices," Nature Energy, http://www.nature.com/natureenergy; https://doi.org/10.1038/s41560-019-0451-x.
Sharma, et al., "Electrocatalytic conversion of carbon dioxide to fuels: a review on the interaction between $CO_2$ and the liquid electrolyte," WIREs Energy Environ 2017, 6:e239. doi: 10.1002/wene.239, pp. 1-21.
Verma, et al., "The effect of electrolyte composition on the electroreduction of $CO_2$ to CO on Ag based gas diffusion electrodes," Phys. Chem. Chem. Phys., 2016, 18, pp. 7075-7084.
Hori, Y., "Chapter 48: $CO_2$-reduction, catalyzed by metal electrodes," Handbook of Fuel Cells—Fundamentals, Technology and Applications, vol. 2, Electrocatalysis, 2003. pp. 720-733.
U.S. Appl. No. 16/697,066, filed Nov. 26, 2019, Cave et ak.
U.S. Appl. No. 16/736,615, filed Jan. 7, 2020, Hunegnaw et al.
International Search Report and Written Opinion issued on Mar. 19, 2020, in PCT Application No. PCT/US2019/063471.
International Preliminary Report on Patentability issued on Jun. 10, 2021, in PCT Application No. PCT/US2019/063471.
International Search Report and Written Opinion issued on Apr. 2, 2020, in PCT Application No. PCT/US2020/012600.
International Preliminary Report on Patentability issued on Jul. 22, 2021, in PCT Application No. PCT/US2020/012600.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
Endrodi, B., "Continuous-Flow Electroreduction of Carbon Dioxide," Progress in Energy and Combustion Science, 62, 3027, pp. 133-154.
Endrodi, B., "Multilayer Electrolyzer Stack Converts Carbon Dioxide to Gas Products at High Pressure with Multilayer Electrolyzer Stack Converts Carbon," ACS Energy Lett. 2019, 4, 1770-1777.
James, B.D., et al. 2017 DOE Hydrogen and Fuel Cells Program Review, Fuel Cell Systems Analysis, Strategic Analysis, Project IDI FC163, Jun. 8, 2017, 34 pages.
Li, et al., "Electrolytic Conversion of Bicarbonate into CO in a Flow Cell," Cell Press, Joule 3, Jun. 19, 2019, pp. 1487-1497.
U.S. Non Final Office Action dated Feb. 23, 2022 in U.S. Appl. No. 16/697,066.
U.S. Notice of Allowance dated Sep. 29, 2022 in U.S. Appl. No. 16/697,066.
U.S. Restriction Requirement dated Oct. 29, 2021, in U.S. Appl. No. 16/697,066.
Delacourt et al., "Design of an Electrochemical Cell Making Syngas (CO + H2) from CO2 and H2O Reduction at Room Temperature," Journal of The Electrochemical Society, 155 (1), (2008), pp. B42-B49.
Gangeri, M et al., "Fe and Pt Carbon Nanotubes for the Electrocatalytic Conversion of Carbon Dioxide to Oxygenates", Catalysis Today, May 2009, vol. 143, pp. 57-63.
Hori, Y et al., "Silver-coated Ion Exchange Membrane Electrode Applied to Electrochemical Reduction of Carbon Dioxide", Electrochimica Acta, Aug. 2003, vol. 48, pp. 2651-2657.
U.S. Corrected Notice of Allowance dated Jan. 9, 2023 in U.S. Appl. No. 16/697,066.
U.S. Appl. No. 18/053,945, inventors Huo et al., filed Nov. 9, 2022.
U.S. Appl. No. 18/145,702 inventors Cave et al., filed Dec. 22, 2022.
IN Office Action dated Jan. 31, 2023 in Application No. IN202117028812.
Indian Office Action dated Feb. 6, 2023, in IN Application No. IN202117034224.

(56) References Cited

OTHER PUBLICATIONS

International Search Report and Written Opinion dated Mar. 10, 2023 in PCT Application No. PCT/US2022/079570.
Rasouli, Armin., et al., "CO2 Electroreduction to Methane at Production Rates Exceeding 100 mA/cm2", ACS Sustainable Chemistry & Engineering, 2020, vol. 8(39), pp. 1-6.
Rong, Weifeng., et al., "Size-dependent Activity and Selectivity of Atomic-level Copper Nanoclusters During CO/CO2 Electroreduction", Angewandte Chemie, 2021, vol. 60, pp. 466-472.
BR Office Action dated Aug. 15, 2023, in Application No. BR1120210103686 with English translation.
BR Office Action dated Oct. 30, 2023, in BR Application No. 112021013400-0 with English Translation.
CA Office Action dated Feb. 28, 2024 in CA Application No. 3120748.
CA Office Action dated Jan. 15, 2024 in CA Application No. 3125442.
EP office action dated Sep. 1, 2023, in application No. EP20703613.8.
International Preliminary Report on Patentability dated Jun. 10, 2021 in Application No. PCT/US2019/063471.
JP Office Action dated Dec. 5, 2023 in JP Application No. 2021-528976 with English translation.
JP Office Action dated Jan. 9, 2024 in JP Application No. 20210538665 with English translation.
JP Office Action dated Sep. 5, 2023, in Application No. JP2021-528976 with English translation.
SA Examination Report dated Aug. 8, 2023, in Application No. 521422124 with English Translation.
SA Examination Report dated Feb. 6, 2024, in SA Application No. 521422124, with English Translation.
SA Office Action dated Mar. 12, 2024 in SA Application No. 521422472 with English translation.
SA Office Action dated Sep. 27, 2023, in application No. SA521422472 with English translation.
U.S. Corrected Notice of Allowance dated Mar. 19, 2024 in U.S. Appl. No. 18/145,702.
U.S. Non-Final Office Action dated Nov. 8, 2023 in U.S. Appl. No. 18/145,702.
U.S. Notice of Allowance dated Mar. 6, 2024 in U.S. Appl. No. 18/145,702.
CN Office Action dated May 15, 2024 in CN Application No. 202080013419.4 with English translation.
International Preliminary Report on Patentability and Written Opinion dated May 23, 2024 in PCT Application No. PCT/US2022/079570.
AE Search Report and Examination Report dated Jun. 26, 2024 in AE Application No. P6001154/2021.
JP Office Action dated Aug. 6, 2024 in JP Application No. 2021-538665, with English Translation.

* cited by examiner

SYSTEM AND METHOD FOR METHANE PRODUCTION

STATEMENT OF GOVERNMENT SUPPORT

This invention was made with government support under Award Number NNX17CJ02C awarded by the National Aeronautics and Space Administration. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates generally to the electrolytic carbon oxide reduction field, and more specifically to systems and methods for electrolytic carbon oxide reactor operation for production of methane and other hydrocarbons.

BACKGROUND

Membrane electrode assemblies (MEAs) for carbon oxide ($CO_x$) reduction can include a cathode layer, an anode layer, and a polymer electrolyte membrane (PEM) that provides ionic communication between the cathode layer and the anode layer. A cathode layer, which may also be referred to as a cathode catalyst layer, can include catalyst particles that preferentially catalyze reactions that produce methane or other desired product. Catalyst loading refers to the amount of catalyst material per geometric area of the MEA.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

One aspect of the disclosure relates to a membrane electrode assembly (MEA) including: a cathode catalyst layer including a carbon oxide reduction catalyst that selectively promotes production of a product selected from a hydrocarbon, a carboxylic acid, or an alcohol; an anode catalyst layer including a catalyst that promotes oxidation of water; a polymer electrolyte membrane (PEM) layer disposed between, and in contact with, the cathode catalyst layer and the anode catalyst layer, wherein the cathode catalyst layer is characterized by a catalyst loading of less than 1 $mg/cm^2$.

In some embodiments, the catalyst loading is less than 0.5 $mg/cm^2$. In some embodiments, the catalyst loading is less than 0.25 $mg/cm^2$. In some embodiments, the catalyst loading is less than 0.15 $mg/cm^2$. In some embodiments, the catalyst loading is less than 0.1 $mg/cm^2$ or less than 0.05 $mg/cm^2$.

In some embodiments, the carbon oxide reduction catalyst includes a transition metal. In some embodiments, the carbon oxide reduction catalyst includes copper, which may take various forms including pure copper, a copper alloy, and a mixture of nanoparticles, the mixture including copper nanoparticles and further including nanoparticles including one or more of silver, gold, and nickel.

In some embodiments, the MEA includes salt ions from a salt solution that contacts the MEA, wherein the salt in the salt solution has a concentration of at least about 10 µM. In some such embodiments, the salt in the salt solution has a concentration of at least about 10 mM. In some embodiments, the product is methane and the salt ions are sodium ions. In some embodiments, the product has two or more carbon atoms and the salt ions salt ions include ions of potassium, cesium, rubidium, or any combination thereof.

In some embodiments, the MEA is bipolar, having at least one layer of a cation conducting polymer, and at least one layer of an anion conducting polymer. In some embodiments, the PEM layer includes a polymer electrolyte layer and a cathode buffer layer. In some such embodiments, the polymer electrolyte layer includes a cation conducting polymer and the cathode buffer layer includes an anion conducting polymer. In some embodiments, the polymer electrolyte layer is between 20 and 60 microns thick. In some embodiments, the ratio of the thickness of the polymer electrolyte layer to the thickness of the cathode buffer layer is at least 3:1. In some embodiments, the cathode buffer layer is no more than 20 microns thick.

In some embodiments, the MEA is an anion-exchange membrane (AEM)-only MEA. In some such embodiments, the AEM is between 10 and 75 microns thick.

In some embodiments, the carbon oxide reduction catalyst is supported on a support structure. In some such embodiments, the support structure includes carbon.

Another aspect of the disclosure may be implemented in a method of operating an MEA, including providing an MEA as described herein and applying a current at a current density that results in high selectivity. In some embodiments, for a cathode catalyst loading of 0.001-0.01 $mg/cm^2$, a current of current density 100-200 $mA/cm^2$ may be applied; for a loading of 0.001-0.04 $mg/cm^2$, a current of current density 100-300 $mA/cm^2$ may be applied; for a loading of 0.01-0.06 $mg/cm^2$, a current of current density 300-400 $mA/cm^2$ may be applied; for a loading of 0.02-0.12 $mg/cm^2$, a current of current density 400-500 $mA/cm^2$ may be applied; for a loading of 0.04-0.2 $mg/cm^2$, a current of current density 500-600 $mA/cm^2$ may be applied; and for a loading of 0.1-0.25 $mg/cm^2$, a current of current density of over 600 $mA/cm^2$ may be applied.

Another aspect of the disclosure may be implemented in a system including a $CO_x$ reduction reactor that has one or more membrane electrode assemblies (MEAs) arranged in a stack, each MEA including a (i) cathode including a $CO_x$ reduction catalyst that promotes reduction of a carbon oxide to a hydrocarbon, a carboxylic acid, or an alcohol wherein $CO_x$ reduction catalyst has a loading, (ii) an anode comprising a catalyst that promotes oxidation, and (iii) a polymer electrolyte membrane (PEM) layer disposed between the cathode and the anode; and a power source controller configured to control current applied to $CO_x$ reduction reactor, wherein the power source controller is configured to, during normal operation of the $CO_x$ reduction reactor to apply a current density such that for a cathode catalyst loading of 0.001-0.01 $mg/cm^2$, a current of current density 100-200 $mA/cm^2$ may be applied; for a loading of 0.001-0.04 $mg/cm^2$, a current of current density 100-300 $mA/cm^2$ may be applied; for a loading of 0.01-0.06 $mg/cm^2$, a current of current density 300-400 $mA/cm^2$ may be applied; for a loading of 0.02-0.12 $mg/cm^2$, a current of current density 400-500 mA/cm$^2$ may be applied; for a loading of 0.04-0.2 mg/cm$^2$, a current of current density 500-600 mA/cm$^2$ may be applied; and for a loading of 0.1-0.25 mg/cm$^2$, a current of current density of over 600 mA/cm$^2$ may be applied.

These and other features of the disclosure will be presented in more detail below with reference to the associated drawings.

DETAILED DESCRIPTION

Figure 1A:
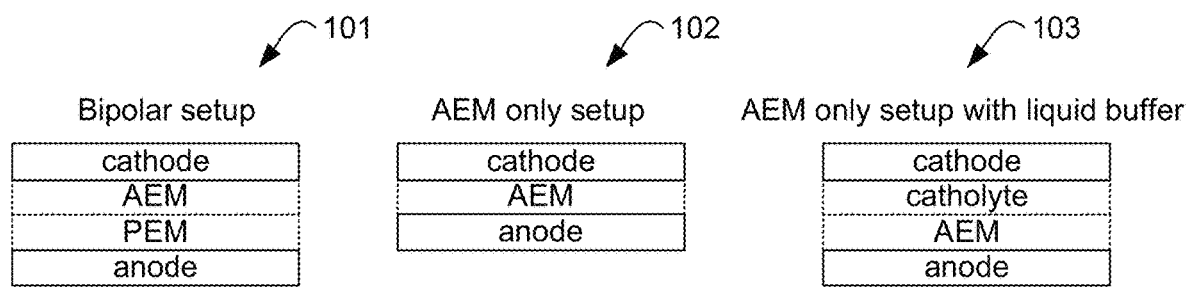
FIG. 1A is an illustration of three membrane electrode assemblies (MEA) set-ups according to various embodiments of the disclosure.

Provided herein are systems and methods for operating carbon oxide (CO$_x$) reduction reactors (CRRs) for producing methane (CH$_4$). Embodiments of the systems and methods may also be used for producing other organic compounds including alcohols, carboxylic acids, and other hydrocarbons such as ethylene (CH$_2$CH$_2$). According to various embodiments, the systems and methods may be characterized by one or more of the following features. In some embodiments, a membrane electrode assembly (MEA) includes a cathode catalyst layer with a relatively low catalyst loading. In some embodiments, a bipolar MEA includes a thin cation-conducting layer and a thin anion-conducting layer, with the cation-conducting layer being thicker than the anion-conducting layer. In other embodiments a pure anion exchange polymer only membrane may be used to bridge the cathode catalyst and the anode catalyst. These and other features are described further below.

A system for methane production includes a carbon oxide reduction reactor (CRR), such as a reactor that generates methane from an input (often a fluid input stream) that includes one or more carbon oxides (carbon dioxide and/or other oxidized carbon compounds, such as CO, CO$_x$, etc.). A system including a CRR is as shown by way of example in FIG. M1, described further below. The reactor typically accepts a gas-phase carbon oxide (e.g., carbon monoxide, carbon dioxide, etc.) input and/or performs the reaction(s) using gas-phase carbon oxide, but can additionally or alternatively accept liquid-phase carbon oxides, supercritical fluid-phase carbon oxides, solid-phase carbon oxides, and/or any other suitable carbon oxide input(s). The reactor is typically an electrolyzer and more particularly a gas-phase polymer-electrolyte membrane electrolyzer, though in various embodiments a system can additionally or alternatively include any other suitable reactors.

While the description below refers chiefly to methane production, also provided are systems and methods for production of other products including hydrocarbons such as ethylene (CH$_2$CH$_2$). In some embodiments, other products such as alcohols (e.g., methanol, ethanol, propanol) and carboxylic acids (e.g., formate and acetate) are generated.

In some embodiments, the reactor includes one or more elements such as described in U.S. patent application Ser. No. 15/586,182, filed 3 May 2017 and titled "Reactor with Advanced Architecture for the Electrochemical Reaction of CO$_2$, CO and Other Chemical Compounds", and/or U.S. patent application Ser. No. 16/254,255, filed 22 Jan. 2019 and titled "System and Method for Carbon Dioxide Reactor Control", each of which is hereby incorporated in its entirety by this reference. However, the reactor can additionally or alternatively include any other suitable elements in any suitable arrangement.

The system can optionally include one or more detectors, such as a methane detector configured to characterize methane content (e.g., flow rate, partial pressure, concentration, etc.) of the reactor products. For example, the system can include a gas chromatograph configured to characterize the reactor products (and/or the methane content thereof). However, the system can additionally or alternatively include any other suitable detectors for characterizing methane content and/or any other suitable aspects of the reactor products.

The reactor includes a MEA which includes one or more polymer electrolyte membranes (PEMs), providing ionic communication between the anode and cathode of the reactor. In some embodiments, the reactor includes an MEA including a cathode catalyst layer (which also may be referred to as a reduction catalyst layer); a PEM membrane (e.g., bipolar membrane, monopolar membrane, etc.; including one or more anion conductors such as anion exchange membranes (AEMs), proton and/or cation conductors such as proton exchange membranes, and/or any other suitable ion-conducting polymers; membrane including one or more buffer layers; etc.); and an anode catalyst layer (which also may be referred to as an oxidation catalyst layer). The ion-conducting polymers of each layer can be the same or different ion-conducting polymers. In one example (e.g., in which the reactor accepts an input containing carbon monoxide, such as wherein the carbon oxides of the input are substantially all carbon monoxide), the MEA includes an AEM and does not include a proton exchange membrane. In a variation of this example, the MEA includes substantially no proton exchange membrane, such as including only a thin and/or highly porous proton exchange membrane. However, the MEA can additionally or alternatively include any other suitable membrane elements. FIG. 1A shows schematic examples of MEAs that may be implemented with a Cu catalyst to produce methane or other product. At 101, a bipolar MEA with an AEM and a cation-conducting PEM is shown. As described further below, the AEM may function as a cathode buffer layer. At 102 and 103, AEM only MEAs are shown; an AEM-only MEA without a buffer layer is shown at 102, and an AEM-only MEA with a liquid buffer is shown at 103. The AEM-only MEAs are useful for CO or mixed $CO/CO_2$ feedstocks as described further below.

Further examples of MEA designs that may be implemented in the systems described herein are provided below with reference to FIGS. 10-17. In particular, bipolar MEAs are described below including with reference to FIGS. 10 and 11 and AEM-only MEAs are described further below including with reference to FIGS. 12 and 13.

A carbon dioxide reactor and/or MEA described herein may be configured such that they would satisfy one or more tests (e.g., based on a set of one or more performance metrics achieved during operation under a set of one or more conditions). The performance metrics and/or conditions can include methane production selectivity, current efficiency, current density, voltage, voltage efficiency, and/or any other suitable metrics.

The methane production selectivity is defined as the ratio of the methane production rate to the total reduction products production rate (e.g., while operating under the conditions of the test). In one or more tests, the methane production selectivity may be greater than a threshold selectivity value (e.g., 20%, 30%, 40%, 45%, 50%, 55%, 60%, 70%, 80%, 25-40%, 40-60%, 60-75%, 75-90%, etc.).

Methane production selectivity may be measured as the Faradaic yield (FY). Faradaic yield, which is also sometimes referred to as Faraday efficiency, coulombic efficiency or current efficiency, is the efficiency with which charge is transferred in a system facilitating an electrochemical reaction. The use of Faraday's constant in Faradaic efficiency correlates charge with moles of matter and electrons. Faradaic losses are experienced when electrons or ions participate in unwanted side reactions. These losses appear as heat and/or chemical byproducts. The below examples include plots of Faradaic yield for various products.

The current efficiency is defined as the fraction of device current that is attributable to (e.g., participates directly in, such as contributing to oxidation and/or reduction of one or more reactants) the desired electrochemical reaction or reactions (e.g., methane production). In one or more tests, the current efficiency is preferably greater than a threshold current efficiency value (e.g., 30%, 40%, 45%, 50%, 55%, 60%, 70%, 10-25%, 25-40%, 40-60%, 60-75%, 75-90%, greater than 90%, or less than 10%, etc.).

The current density is defined as the device current per unit geometric area of the MEA. In operation, the current density may be greater than a threshold current density value (e.g., 70, 100, 150, 200, 250, 300, 400, 500, 1000, 10-50, 50-100, 100-170, 170-230, 230-300, 300-500, or 500-2000 $mA/cm^2$, etc.).

The voltage of a single cell containing a single MEA is defined as the potential between the anode and cathode of the cell during operation. In one or more tests, the single cell voltage is preferably less than a threshold voltage value (e.g., 5, 3, 2.5, 2.2, 2, 1.8, 1.6, 1.4, 1.3, 1.2, 1.1-1.4, 1.4-1.8, 1.8-2.2, 2.2-3, or 3-5 V, etc.).

The voltage efficiency is defined as the ratio of the thermodynamic voltage limit (e.g., for the desired electrochemical reaction such as methane production) to the operating voltage (between the cathode and anode). In some examples, the thermodynamic limit is approximately 1.1 volts. In one or more tests, the voltage efficiency is preferably greater than a threshold voltage efficiency value (e.g., 10%, 20%, 30%, 40%, 50%, 60%, 80%, 90%, 95%, 5-15%, 15-30%, 30-50%, 50-70%, 70-80%, 80-90%, or 90-98%, etc.).

In a specific example of a test, the carbon oxide reactor would satisfy the test if, while operating the reactor (e.g., as described below), including supplying reactants (including carbon dioxide) to the reactor and maintaining a voltage of less than 5 V, the reactor operates with a current density greater than 200 $mA/cm^2$, and produces methane with a methane production selectivity greater than 25% or 40%. Faradaic yield, as shown in the plots of FIGS. 3 and 5-7 may alternatively be used to evaluate a carbon oxide reactor.

However, the tests can additionally or alternatively include any other suitable performance metrics, conditions, and/or values associated therewith.

Cathode Catalyst Layer

In some embodiments, one or more of the catalysts (e.g., reduction catalyst, oxidation catalyst) can include catalyst particles (e.g., defining a porous network of particles), which may be nanoparticles. The cathode catalyst layer of the MEA includes a catalyst configured for production of methane or other desired product. A catalyst configured for methane has a propensity to catalyze one or more methane production reactions preferentially over other reactions. Suitable catalysts include transition metals such as copper (Cu). According to various embodiments, the catalyst may be doped or undoped Cu or an alloy thereof. In some embodiments, nitrogen-doped carbon is used.

In general, the catalysts described herein are non-noble metal catalysts. Gold (Au), for example, may be used to catalyze carbon monoxide (CO) production. MEAs that employ Au or other noble metal catalysts (e.g., platinum or palladium) may employ much higher loadings than those described herein.

As described further below including with reference to FIGS. 10-14, one or more of the catalyst layers can optionally include one or more polymer electrolytes. A polymer electrolyte can be mixed with the catalyst particles (e.g., arranged within the porous network, such as loaded into the open regions defined by the porous network). The polymer material can enable operation at higher current densities than a comparable catalyst layer with no such polymer. The polymer can be the same material as the polymer electrolyte membrane (or as components thereof) or can be a different polymer material.

In a first example, the cathode catalyst layer includes an anion-conducting polymer (e.g., aminated tetramethyl polyphenylene, poly(ethylene-co-tetrafluoroethylene)-based quaternary ammonium polymer, quaternized polysulfone, 2259-60 (Pall RAI), AHA by Tokuyama Co, Fumasep® FAA-3 (fumatech GbbH), Sustanion®, Morgane ADP by Solvay, Tosflex® SF-17 by Tosoh anion exchange membrane material, Aemion™ by Ionomr, Tetrakis by Ecolectro, OrionTM1 by Orion Polymer Corporation, etc.). In a second example, the anode catalyst layer includes a cation-conducting polymer (e.g., perfluorosulfonic acid polytetrafluoroethylene co-polymersulfonated poly(ether ketone), poly(styrene sulfonic acid-co-maleic acid), Nafion® (DuPont™), GORE-SELECT® (Gore), FumaPEM® (fumatech GmbH), Aquivion® PFSA (Solvay), etc.). In a third example, the catalyst layer includes a bipolar polymer electrolyte, such as an electrolyte including both an anion-conducting polymer and a cation-conducting polymer, and/or including a cation-and-anion-conducting polymer (e.g., polyethylene oxide, polyethylene glycol, poly(vinylidene fluoride), polyurethane, etc.).

Also as further described below, one or more of the catalyst layers can optionally include one or more support structures, including electron-conductive support structures. In some examples, the presence of the support structure can result in an increase in hydrogen production (e.g., increase an overall hydrogen production rate, increase a ratio of hydrogen production to methane production, etc.). The support structure can include materials such as carbon (e.g., Vulcan carbon), boron-doped diamond, fluorine-doped tin oxide, and/or any other suitable materials.

The conformation of the catalyst layer may be engineered to achieve a desired methane (or other desired product) production characteristics for the MEA. Conformation characteristics such as thickness, catalyst loading, and catalyst roughness can affect methane production rate, methane production selectivity (e.g., selectivity over other potential products, such as hydrogen, ethylene, etc.), and/or any other suitable characteristics of carbon dioxide reactor operation.

Figure 1B:
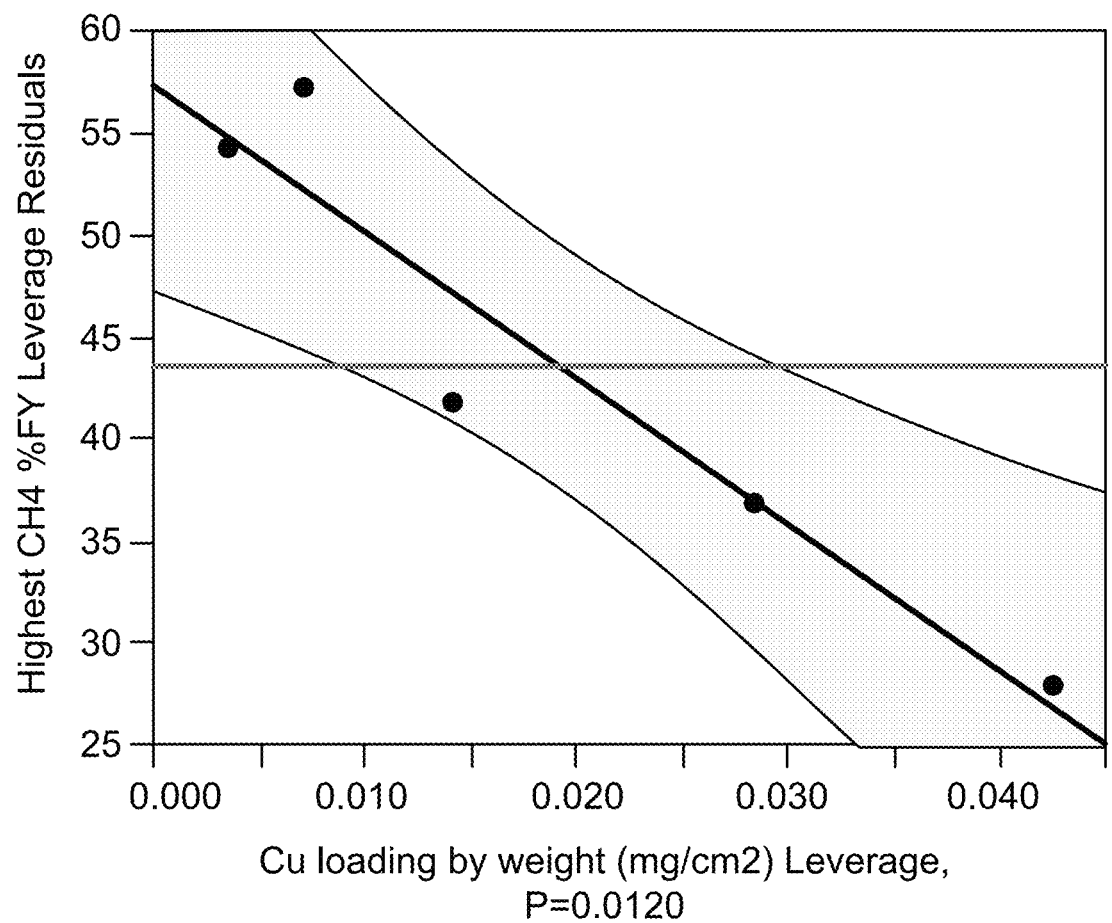
FIG. 1B is a plot illustrating the dependence of methane selectivity on catalyst loading according to certain embodiments.

In some embodiments, the cathode catalyst layer includes a relatively small amount of catalyst material (e.g., per unit of MEA geometric area), which can enable higher methane production selectivity. This effect is shown in the example of FIG. 1B, which is a plot showing maximum Faradaic yield (FY) for methane as a function of Cu catalyst loading ($mg/cm^2$). As shown in the plot, methane selectivity (as expressed by FY $CH_4$) is higher at lower catalyst loadings. As used herein, the area of an MEA is the area of a geometric plane at the MEA surface; it does account for pores or other deviations from planarity at the MEA surface.

In some examples, the correlation of increased selectivity with decreased amount of catalyst material can be due to changes in catalyst surface morphology, changes in mass transport to the catalyst active surface (e.g., thereby increasing current efficiency), and/or any other suitable effects.

In some embodiments, the catalyst loading is a few $\mu g/cm^2$ or less (e.g., 1, 2, 4, 10, 20, 30, 40, 0.1-1, 1-2.5, 2.5-5, or 5-10 $\mu g/cm^2$), but can alternatively be tens or hundreds of $\mu g/cm^2$ (e.g., 10, 15, 20, 25, 35, 50, 10-30, 30-100, 100-1000 $\mu g/cm^2$, etc.) or more. As described further below, higher loadings may be used with higher current densities. The data in FIG. 1B was produced using a current density of 200 $mA/cm^2$; maximum methane yield depends on current density and catalyst loading. However, even at higher current densities (e.g., 600-1200 $mA/cm^2$), relatively low catalyst loadings (less than 1 $mg/cm^2$, less than 0.9 $mg/cm^2$, less than less than 0.8 $mg/cm^2$, less than 0.7 $mg/cm^2$, less than 0.6 $mg/cm^2$, less than 0.5 $mg/cm^2$, less than 0.4 $mg/cm^2$, less than 0.3 $mg/cm^2$, or less than 0.25 $mg/cm^2$) may be used. (As is apparent, loadings in this document are expressed in both $\mu g/cm^2$ and $mg/cm^2$ with 1 $\mu g/cm^2=0.001$ $mg/cm^2$). The relationship between catalyst loading and current density is described further below with reference to FIG. 3.

The thickness of the catalyst layer is on the few-micron or sub-micron scale (e.g., 0.25, 0.5, 1, 2, 3, 5, 0.1-0.3, 0.3-1, 1-3, or 3-10 $\mu m$, etc.) in some embodiments, but can alternatively be thicker or thinner. However, the catalyst layer can alternatively include a larger amount of catalyst material (e.g., which may reduce methane production selectivity) and/or any other suitable amount of catalyst material.

Figure 2:
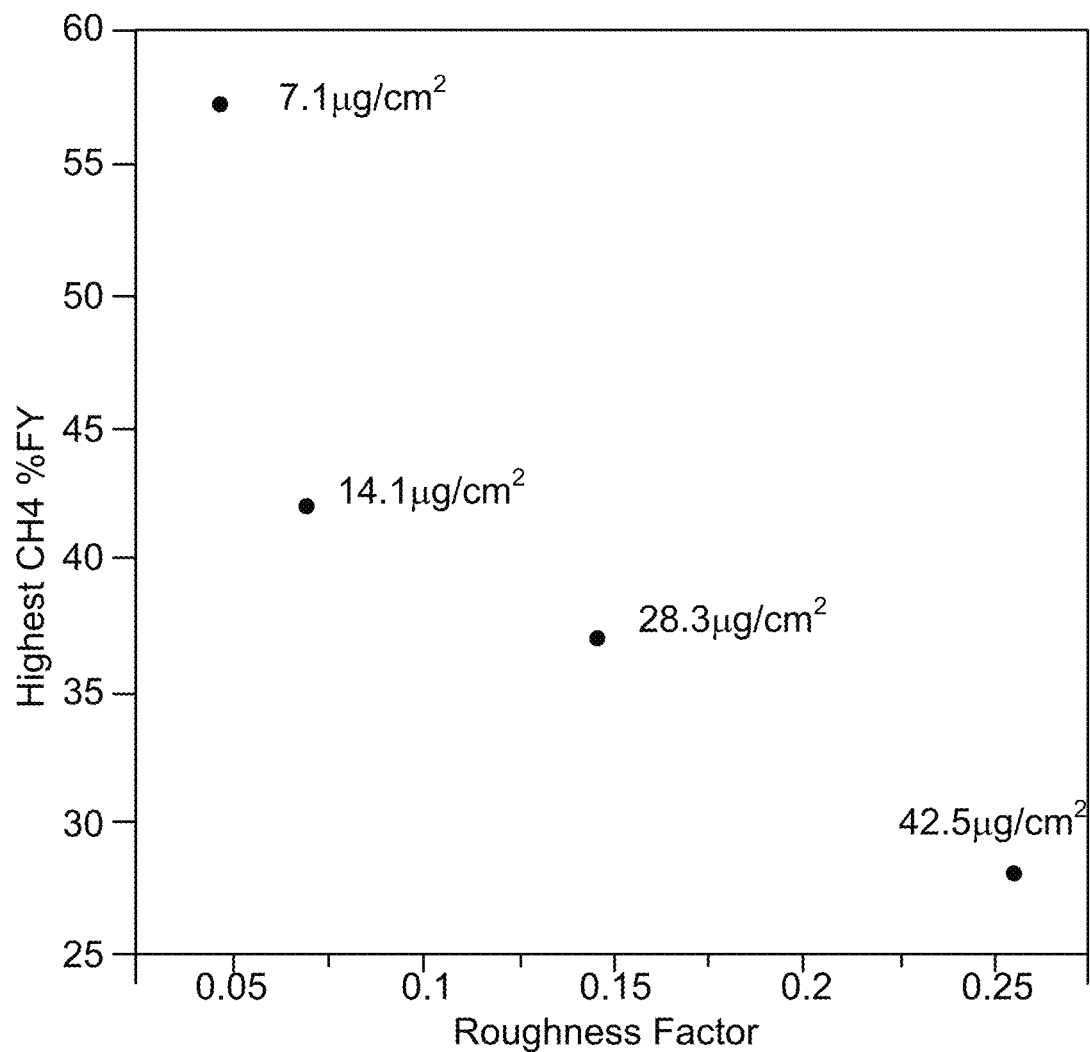
FIG. 2 is a plot illustrating the dependence of methane selectivity on catalyst roughness factor according to certain embodiments.

The catalyst layer can define a roughness factor (e.g., a ratio of the actual surface area of the catalyst material to the geometric area of the MEA). The roughness factor is preferably low (e.g., 0.02, 0.05, 0.1, 0.01-0.02, 0.02-0.05, 0.05-0.1, etc.) but can alternatively be higher (e.g., 0.15, 0.25, 0.5, 1, 0.1-0.3, 0.3-1, 1-3, greater than 3, etc.) or lower (e.g., less than 0.01), such as shown by way of example in FIG. 2. In particular, FIG. 2 shows highest $CH_4$ selectivity as a function of roughness factor, which was the ratio of actual ratio of the actual surface area of the catalyst material to the geometric area of the MEA. In the example of FIG. 2, lower roughness results in higher selectivity.

Figure 3:
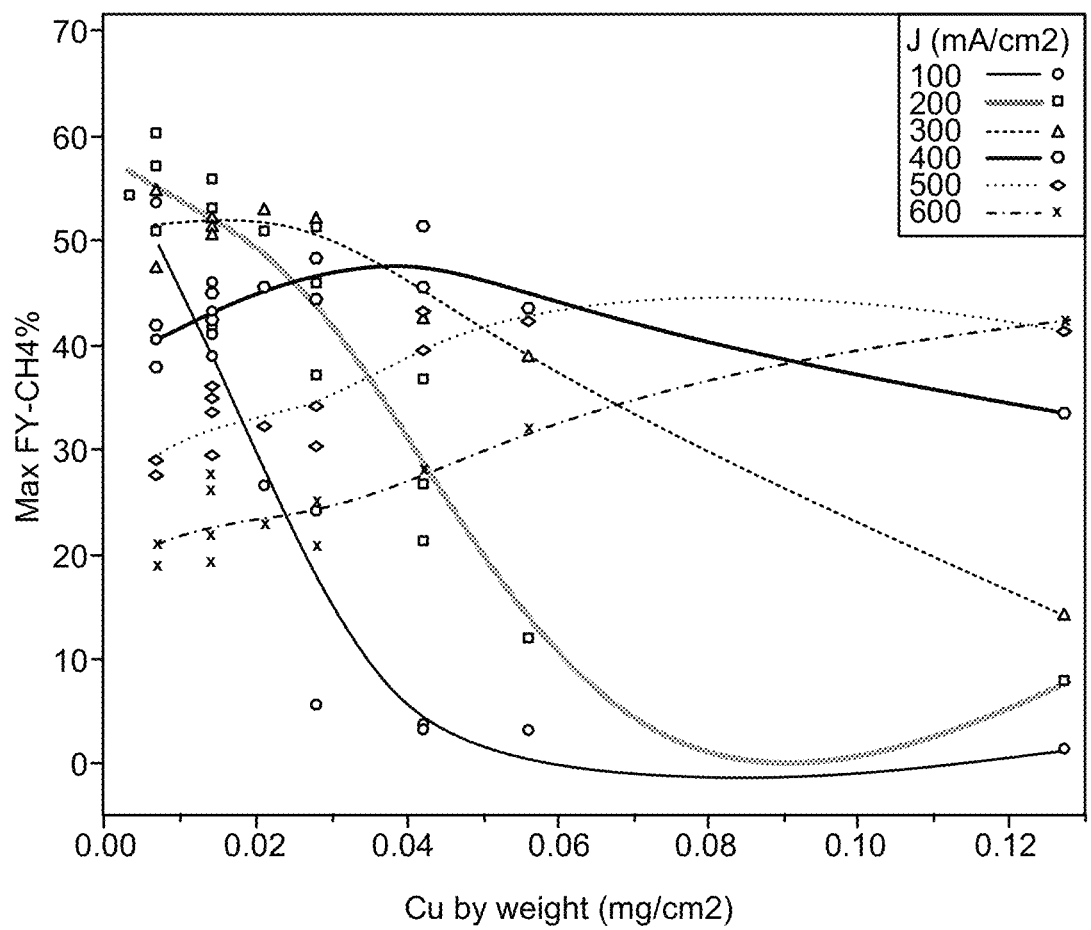
FIG. 3 is a plot showing maximum methane yield achieved at different current densities as a function of copper loading.

FIG. 3 is a plot showing maximum methane yield achieved at different current densities as a function of copper loading. Performance at lower current densities (FIG. 3: 100 $mA/cm^2$ and 200 $mA/cm^2$) was seen to be optimal at very low catalyst loading (7 $\mu g/cm2$), possibly due to a higher local current density on the thin metal catalyst layer helping achieve minimum potential needed to produce methane.

Higher current densities may be used with higher catalyst loading to overcome kinetic limitations with enough overpotential for methane production. See, e.g., the MEA with 40 $\mu g/cm^2$ Cu loading in FIG. 3, which in the example of FIG. 3, has the highest max FY $CH_4$ at 400 $mA/cm^2$, and does not perform as well at lower current densities. The results indicate that optimal loading has a small dependence on the current density. Thus, in some embodiments, the catalyst loading may be configured for a desired current density. Increasing the mass loading increases the roughness factor or real catalyst surface area available for the reaction. In some embodiments, the roughness factor may also be considered to determine an optimal catalytic surface area for a desired current density or vice versa.

In some embodiments, an MEA may be operated using a current density as shown below for a particular copper or copper-containing catalyst loading. Similarly, an MEA may be designed with a particular loading as shown below for a desired current density.

| Cu loading (mg/cm$^2$) | Current density (mA/cm$^2$) |
|---|---|
| 0.001-0.01 | 100-200 |
| 0.001-0.04 | 100-300 |
| 0.01-0.06 | 300-400 |
| 0.02-0.12 | 400-500 |
| 0.04-0.2 | 500-600 |
| 0.1-.025 | >600 |

Figure 4:
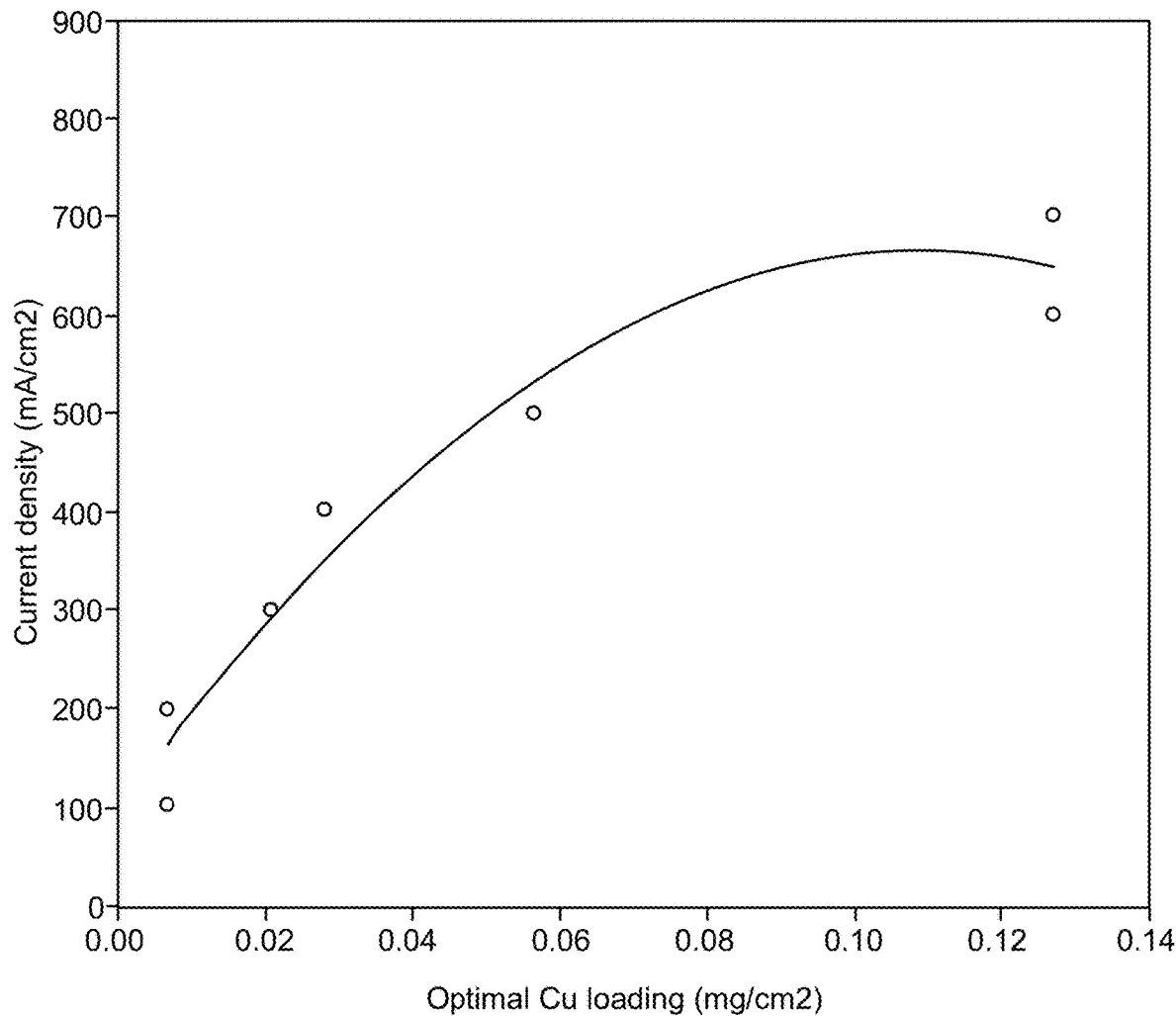
FIG. 4 is a plot showing optimal copper loading for various current densities.

FIG. 4 is a plot of optimal copper loading (to achieve the highest max FY CH4) for various current densities over a range of 100 mA/cm$^2$-700 mA/cm$^2$. It shows an increase in the optimal copper loading in an exponential trend, with the effect tailing off at higher loading in the range of 120 µg/cm$^2$ to 140 µg/cm$^2$. Catalyst loading for copper performance at considerably high current densities is still expected to remain in the 1-250 or 1-500 µg/cm$^2$ (endpoints included) range based on these results. Thus, according to various embodiments, a catalyst loading for hydrocarbon production may be less than 1000 µg/cm$^2$, such as between 0.1-250 µg/cm$^2$ or 0.1-500 µg/cm$^2$.

As indicated above, lower ranges may be used, e.g., 0.1-250 µg/cm$^2$, or 1-150 µg/cm$^2$, 1-80 µg/cm$^2$, 10-80 µg/cm$^2$, 10-20 µg/cm$^2$, 40-80 µg/cm$^2$, or 80-150 µg/cm$^2$. For MEAs designed to be operated at lower current densities (e.g., 100 mA/cm$^2$-700 mA/cm$^2$), these lower ranges may be useful.

Catalyst loadings for solid (non-aqueous) electrolyte systems as described herein are typically much higher. However, as described above, the low loadings of cathode catalyst described herein provide better selectivity for methane production over hydrogen. One theory for this phenomenon is that a threshold kinetic overpotential must be exceeded before CO$_x$ reduction to methane begins to occur preferentially over hydrogen production on the catalyst surface. Low catalyst loadings allow this threshold overpotential to be reached. There is a small dependence of the optimal loading on the current density, with lower current densities using lower catalyst loadings. At much higher current densities than the catalyst loading is designed to support, hydrogen production can again dominate over methane because of mass transport limitations. The best cell voltages may be attained with the highest catalyst loading that can be used while still maintaining high current efficiency for methane.

The catalyst layer can be fabricated using one or more fabrication techniques. In a first embodiment, the catalyst layer is fabricated using a solvent-based technique. Generally, the solvent-based techniques preferably include depositing a mixture, including a solvent and one or more materials to be deposited, onto a substrate. The solvent is often a volatile solvent but can alternatively include any other suitable solvents. The materials to be deposited include the catalyst material (e.g., nanoparticles of the catalyst material, such as copper or copper alloy nanoparticles), and can optionally include one or more polymer electrolytes and/or any other suitable materials (e.g., a carbon support, ligand, or other additives). The materials can be dissolved in the solvent, suspended in the solvent, and/or mixed with the solvent in any other suitable manner. The substrate onto which the catalyst is deposited can be the polymer electrolyte membrane, gas distribution layer GDL (e.g., carbon GDL), and/or any other suitable element of the MEA.

In a first example the catalyst layer is fabricated using ultrasonic spray deposition, in which the mixture is sprayed onto the substrate. The solvent can be an alcohol. The substrate can be the polymer electrolyte membrane but can alternatively be a GDL and/or any other suitable substrate.

In a second example, the catalyst layer is fabricated by doctor blading, in which the mixture is spread onto the substrate. The solvent can be a glycol. The substrate can be a GDL or alternatively can alternatively be the polymer membrane and/or any other suitable substrate In another example, the catalyst layer is fabricated by electron beam deposition, sputtering, or by electrodeposition. In this embodiment, one or more catalyst materials, e.g., copper, are deposited onto a substrate. A thin layer of catalyst material is deposited, such as a few nanometers (e.g., 0.3, 0.5, 1, 2, 3, 5, 10, 0.1-0.5, 0.3-1, 1-2, 2-5, 5-10, 10-30 nm, 100-500 nm, or 500 nm-1 µm, etc.). The substrate can be a gas diffusion layer (e.g., carbon GDL), but can alternatively be any other suitable substrate. In some examples of this embodiment, after electron beam deposition, the catalyst layer (on the substrate) is then pressed against the polymer electrolyte membrane, which, for example, can cause the polymer electrolyte to mix into the catalyst layer. However, the catalyst layer can additionally or alternatively be fabricated by any other suitable methods. Further description of catalyst layers is given below.

Bipolar Membrane Layer Thicknesses

In some embodiments, a MEA includes a bipolar interface with an anion-conducting polymer on the cathode side of the MEA and an interfacing cation-conducting polymer on the anode side of the MEA. As described further below, a bipolar MEA including an anion-conducting buffer layer can be useful in neutralizing protons and maintaining a neutral to high pH at the cathode. This can make the copper catalyst more prone to methane formation rather than H$_2$ formation.

In such embodiments, the thickness of the anion-conducting polymer layer and the relative thicknesses of the cation-conducting polymer layer and anion-conducting polymer layer impacts performance and stability of a hydrocarbon-producing MEA.

Figure 5:
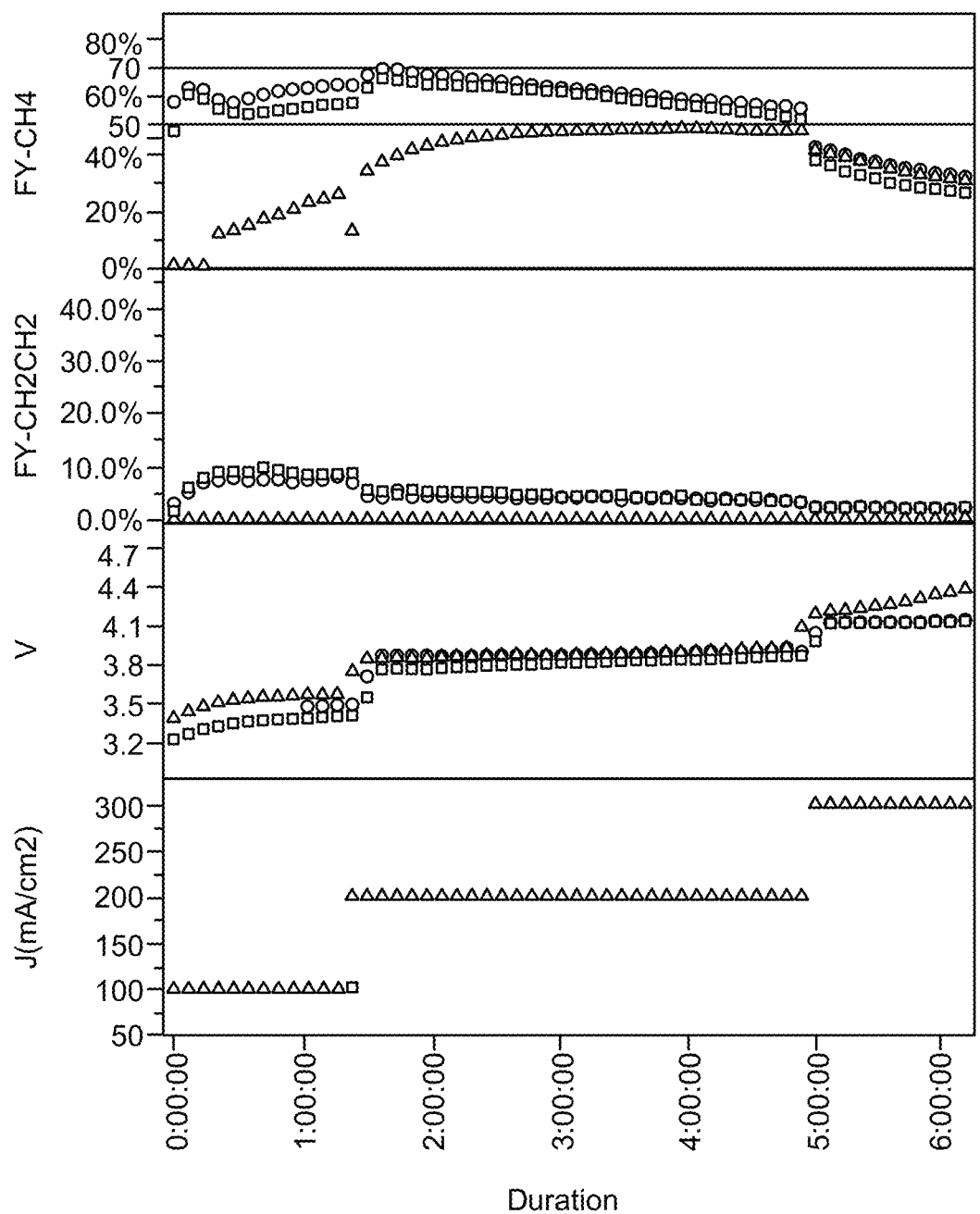
FIG. 5 is a plot illustrating the dependence of performance stability on anion-conducting polymer layer thickness for a bipolar MEA.

FIG. 5 is a plot showing the dependence of performance stability on anion-conducting polymer layer thickness for a bipolar MEA. Current density (J), voltage (V), and Faradaic yields of ethylene (FY-CH2CH2) and methane (FY-CH4) are shown for MEAs with high anion exchange layer thickness (square and circle traces) and for a thin anion exchange layer thickness (triange trace). As seen in FIG. 5, the MEAs with high anion exchange layer thickness (square and circle traces) perform at high yields from the start and reach up to 70% FY for methane but continue to decline to 50% FY within the 3.5 hr test period. The MEA with 40% thinner anion exchange layer (triangle trace) starts off at much lower yields and picks up performance to a stable 50% FY at 200 mA/cm$^2$. In some embodiments, relatively thin AEMs are used in the bipolar membrane.

In some embodiments, a thin cation-conducting PEM layer is used in an AEM/PEM bipolar membrane. (In the description of FIGS. 6-8, PEM refers to the cation-conducting layer of a bipolar membrane including the cation-conducting layer and an AEM. However, as described herein, a PEM in a MEA may elsewhere refer to the bipolar membrane itself).

Figure 6:
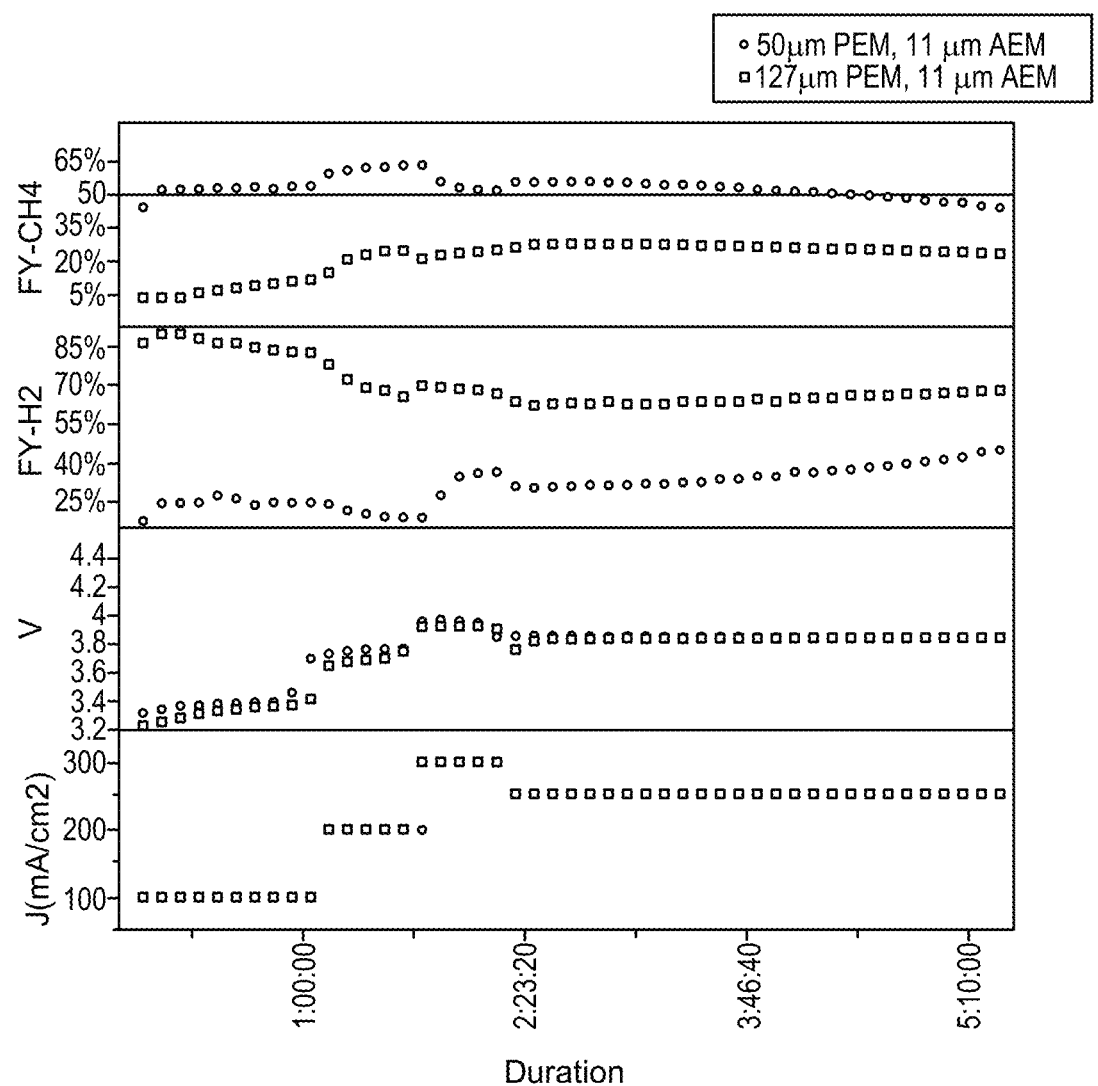
FIG. 6 is a plot illustrating the dependence of methane selectivity using a carbon-supported copper (Cu/C) catalyst on cation-conducting polymer exchange membrane (PEM) thickness of a bipolar membrane.

FIG. 6 is a plot demonstrating the influence of cation-conducting PEM thickness on methane selectivity using a Cu/C catalyst. Performance of two bipolar membranes, one with a 50 µm cation-conducting PEM/11 µm AEM and one with a 127 µm cation-conducting PEM/11 µm AEM, are compared. FIG. 6 demonstrates that at a thin AEM thickness, the thin cation-conducting PEM membrane performs with better selectivity toward methane than the thick cation-conducting PEM membrane.

Figure 7:
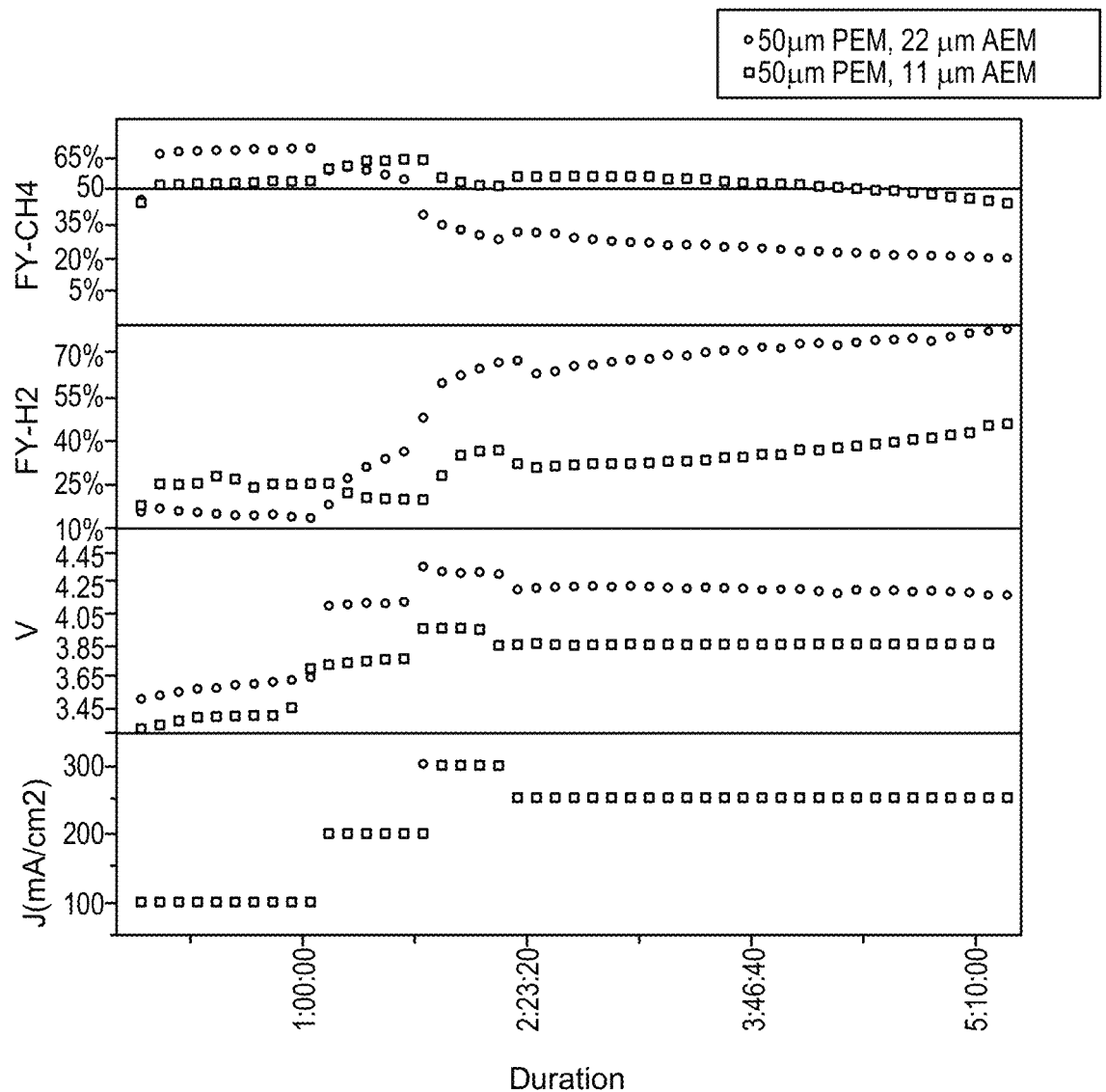
FIG. 7 is a plot illustrating the dependence of methane selectivity using a Cu/C catalyst. on anion-exchange membrane (AEM) thickness of a bipolar membrane.

FIG. 7 is a plot demonstrating the influence of AEM thickness on methane selectivity using a Cu/C catalyst. With a thin cation-conducting PEM, a thick AEM layer performs with much worse voltage than a thin AEM layer at higher current densities. Thus, a thin cation-conducting PEM membrane and a thin AEM membrane is implemented in some embodiments for improved methane selectivity and reduced membrane/layer resistance.

Figure 8:
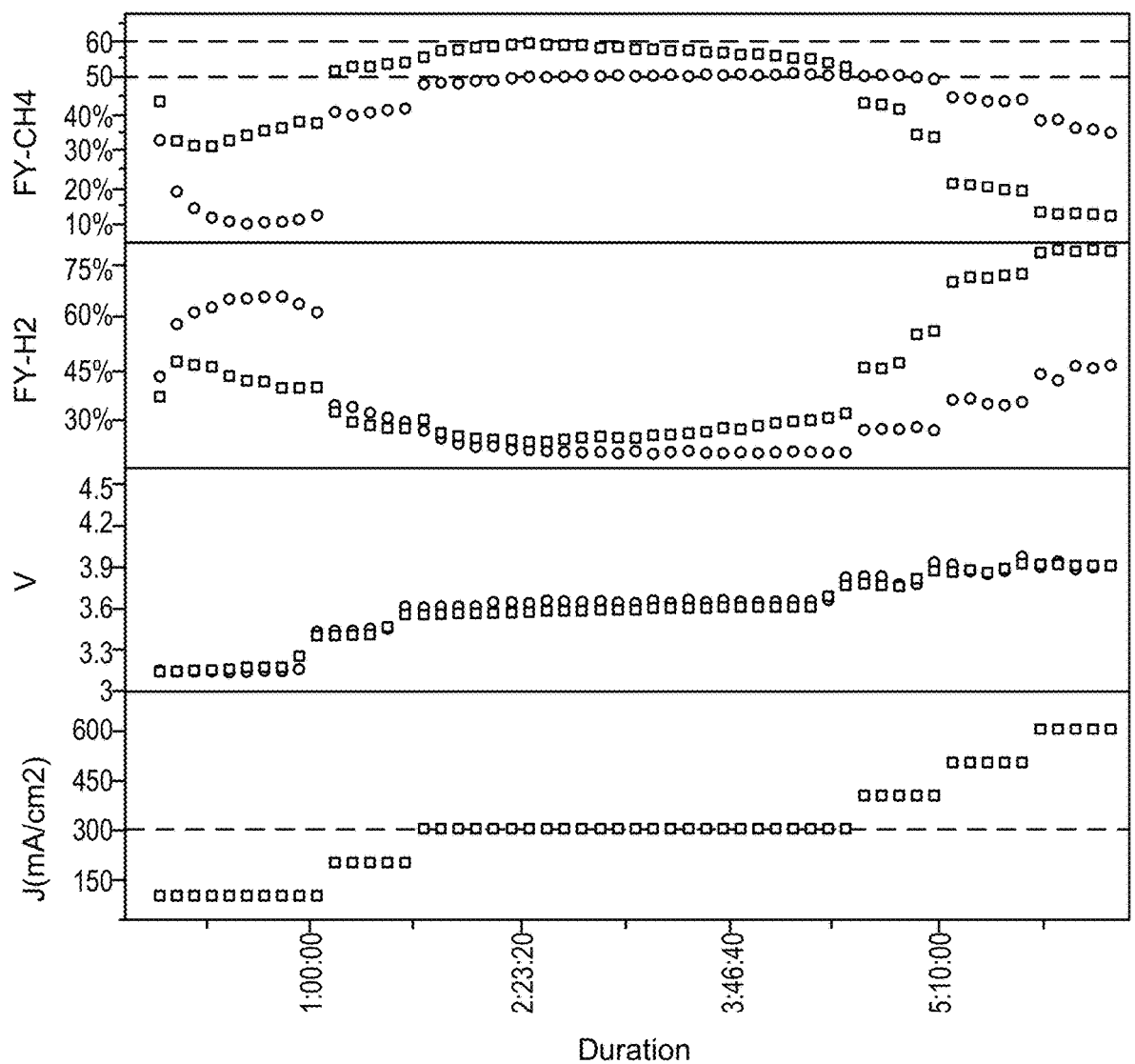
FIG. 8 is a plot showing performance of two MEAs, both with bipolar membranes having a thin AEM and a thin cation-conducting PEM.

FIG. 8 is a plot showing performance of two MEAs, both with bipolar membranes having a thin AEM and a thin cation-conducting PEM. The MEAs differ in the test setup (flow field and compression). Stable performance with a selectivity increase rate of +5.25% for methane at the end of a 3 hour hold at 300 mA/cm$^2$ was achieved (FIG. 3, circles). A less stable MEA can achieve a high of 60% FY methane at 300 mA/cm$^2$ (FIG. 3, squares). The results demonstrate the ability to achieve stability (circles trace) and the ability to achieve higher FY (square trace).

Thus, in some embodiments, a thin cation-conducting PEM is used in a bipolar MEA. Thickness may range, for example, between 20 µm and 80 µm, or between 20 µm and 60 µm, endpoints included in the range. As discussed further below with respect to FIG. 6, additional advantages to a thin cation-conducting PEM include avoiding flooding.

In the same or other embodiments, the ratio of cation-conducting PEM thickness:AEM thickness may be at least 3:1, or at least 4:1. Also, as discussed below with respect to FIG. 7, in some embodiments, a cathode buffer layer or other anion-conducting polymer layer that abuts the cation-conducting polymer electrolyte membrane is between about 5 and 20 micrometers, or between about 5 and 15 micrometers thick. Using a >99% selective polymer can allow the AEM to be reduced to between 2 and 10 microns in some embodiments.

In some cases, the ratio of thicknesses of the polymer electrolyte membrane and the adjoining anion-conducting polymer layer is between about 3:1-90:1 with the ratios at the higher end used with highly selective anion-conducting polymer layers. In some embodiments, the ratio is about 3:1-13.1, or about 7:1-13.

In contrast to water electrolyzers, where salt ions are not desirable, salt ions can have a positive impact on carbon oxide electrolyzer performance. This is described in U.S. patent application Ser. No. 16/697,066, filed Nov. 26, 2019, and incorporated by reference herein for all purposes. As described therein, cations may be introduced to the carbon oxide electrolyzer through water circulating through the anode of the electrolyzer or by incorporation into the polymer-electrolyte membrane, catalyst, or catalyst support used to make the membrane-electrode assembly. The presence of salts has been observed to decrease the MEA cell voltage, improve Faradaic yield, change the product selectivity, and/or decrease the decay rate of operating parameters (e.g., voltage efficiency) during operation of a carbon oxide reduction electrolyzer.

Various types of salt may be used in an MEA cell. Such salts may have inorganic or organic cations and anions. The salt composition may affect cell operating conditions such as overpotential, Faradaic efficiency, and/or selectivity among multiple carbon oxide reduction reactions. In certain embodiments, a potassium containing salt such as potassium bicarbonate used in an MEA cell having a copper catalyst on a cathode selectively produces ethanol and ethylene over methane during carbon dioxide reduction. By contrast, a sodium containing salt such as sodium bicarbonate when used in an MEA cell having a copper catalyst on a cathode selectively produces methane during carbon dioxide reduction. In MEA cells employing copper reduction catalysts, salts with higher atomic weight cations increase the Faradaic yield of multi-carbon products (e.g., ethylene).

In certain embodiments, a salt employed in the reactor has cations that are not ions of transition metals. In certain embodiments, the salt contains a cation that is an alkali metal on or an alkaline earth metal ion. In certain embodiments, the salt contains a lithium ion, sodium ion, potassium ion, cesium ion, and/or a rubidium ion. In certain embodiments, the salt contains no cations other than sodium, and/or potassium ions. In some implementations, the salt contains only cations that are monovalent such as alkali metal ions.

In certain embodiments, the salt contains an anion that is hydroxide, bicarbonate, carbonate, perchlorate, phosphate, or sulfate. In some cases, the salt contains an anion that is hydroxide, bicarbonate, carbonate, or sulfate. In certain embodiments, the salt contains no halide ions. In certain embodiments, the salt contains an anion that is produced from the carbon oxide reduction reaction. Examples include carboxylates such as formate, oxalate, and acetate.

In certain embodiments, the salt is selected from the group including sodium bicarbonate, potassium bicarbonate, potassium sulfate, sodium sulfate, cesium bicarbonate, cesium sulfate, and any combination thereof.

In some cases, an MEA employs multiple salts or a mixed salt. For example, the MEA may employ multiple cations (e.g., sodium and potassium ions) but only a single anion (e.g., sulfate). In another example, the MEA employs only a single cation (e.g., sodium ions) but multiple anions (e.g., bicarbonate and sulfate). In yet another example, the MEA employs at least two cations and at least two anions. In certain embodiments, the salts include a combination of sodium bicarbonate and potassium bicarbonate. In certain embodiments, the salts include a combination of potassium bicarbonate and potassium phosphate. An MEA cathode catalyst described as containing copper or other transition metal is understood to include alloys, doped metals, and other variants of copper or other transition metals.

A salt may be delivered to the cell in various ways. In one example, a salt is provided with an MEA as fabricated and/or is provided with a reconstituted MEA. In another example, a salt is provided with a feedstock (a reactant containing composition) to the anode or cathode. In some implementations, water is a reactant at the anode and a salt is provided with the anode reactant. Water supplied to the anode is sometimes termed "anode water." The anode water may be an aqueous solution that, during operation, is flowed to the anode. In some embodiments, the anode reaction is oxidation of water to produce oxygen. In some embodiments, liquid water containing a salt is delivered to the cathode in any of various ways. For example, the salt may be delivered via flowing a liquid solution to the cathode during operation. The liquid may contain dissolved carbon dioxide or dissolved carbon monoxide. In some cases, aqueous solutions of salt are delivered to the cathode as a mixture of liquid and gas. For example, a salt solution may be sprayed on the MEA.

Salt-containing solution provided to the MEA directly or via anode water during operation may be prepared in various ways. In some cases, salt-containing solutions are made by dissolving salt directly in water. In some cases, salt-containing solutions are made by passing water through a resin (optionally in a column) that releases salt into the water.

In embodiments where salt is provided to the MEA by way of liquid water such as anode water, the salt may be provided at a set concentration. The salt concentration may vary depending upon the MEA configuration and the particular cathode catalyst employed, as well as the associated carbon oxide reduction reaction.

In some embodiments employing a bipolar membrane MEA, the salt is provided in an aqueous solution at a concentration of about 1 mM to about 30 mM or at a concentration of about 3 mM to about 30 mM. In some embodiments employing a bipolar membrane MEA, the salt is provided at a concentration of about 2 mM to about 15 mM. In some embodiments employing a bipolar membrane MEA, the salt is provided at a concentration of about 0.1 mM to about 30 mM, or about 5 mM to about 10 mM.

In some embodiments employing a bipolar membrane MEA configured for hydrocarbon production from carbon dioxide, the salt is provided in anode water or other source at a concentration of about 2 mM to about 50 mM. In some MEAs employed in cells configured for methane production from carbon dioxide, the salt is provided in a concentration of about 10 mM to 30 mM. In various implementations, such cells employ a copper catalyst and a salt selected from the group including sodium bicarbonate, potassium bicarbonate, potassium sulfate, sodium sulfate, cesium bicarbonate, cesium sulfate, and any combination thereof. In various embodiments, the salt employed for methane selectivity is sodium bicarbonate, which has been shown to enhance methane to ethylene ratio by at least about 20:1.

In certain embodiments employing a bipolar membrane MEA configured for hydrocarbon product generation from a carbon oxide, and particularly carbon dioxide, the salt is provided at a concentration of about 2 mM to 1 M. In some implementations, the salt is potassium bicarbonate, which has been shown to enhance C2-C3 product selectivity over methane by a ratio of about 5:1 compared to sodium bicarbonate, is provided at a concentration of about 100 mM to about 500 mM. In certain embodiments, where the MEA is configured with a copper catalyst as cathode to reduce carbon dioxide to ethylene, the potassium bicarbonate concentration is about 1 mM to 5 mM. In certain embodiments, where the MEA is configured to reduce carbon monoxide to ethylene, the salt concentration, particularly potassium bicarbonate, is about 150 mM to about 250 mM.

In some embodiments employing an MEA containing only anion-conducting polymer(s), the salt is provided in an aqueous solution at a concentration of about 1 mM to 10 molar. In some embodiments employing an MEA containing only anion-conducting polymer, the salt is provided in a concentration of about 100 mM to 5 molar. In certain embodiments employing potassium hydroxide as a salt, the salt concentration is about 50 to 150 mM. In certain embodiments employing potassium bicarbonate as a salt, the salt concentration is about 4 to 10 mM.

The following concentration ranges are useful for anion conducting polymer only and bipolar cells employing anode water with potassium hydroxide and/or potassium bicarbonate. In certain MEA cells employing potassium hydroxide, the salt concentration is about 10 mM to 15 M. In some MEA cells employing potassium hydroxide, the salt concentration is about 50 to 500 mM. In some MEA cells employing potassium hydroxide, the salt concentration is about 0.5M to ~15M. In certain MEA cells employing potassium bicarbonate, the salt concentration is about 1 mM to 1M. In some MEA cells employing potassium bicarbonate, the salt concentration is about 1 to 50 mM. In some MEA cells employing potassium bicarbonate, the salt concentration is about 100 mM to 500 mM.

The following salt concentration ranges are used, in certain embodiments, employing carbon dioxide as a reactant in an MEA cell:

Bipolar membrane for methane production (e.g., copper-containing catalyst): The salt concentration in anode water is about 1 mM-40 mM, or about 10 mM-30 mM, or about 3 mM-20 mM. In certain embodiments, any of these concentration ranges is used when the salt is sodium bicarbonate. In certain embodiments, any of these concentration ranges is used for MEA cells having cathode surface areas of about 25 cm$^2$.

Bipolar membrane for ethylene production (e.g., copper-containing catalyst): The salt concentration in anode water is about 100 um to 20 mM, or about 1 mM-10 mM, or about 1 mM-5 mM, or about 2 mM-5 mM. In certain embodiments, any of these concentration ranges is used when the salt is potassium bicarbonate. In certain embodiments, any of these concentration ranges is used for MEA cells having cathode surface areas of about 25 cm$^2$.

Anion conducting polymer only MEA for ethylene production (e.g., copper-containing catalyst): The salt concentration in anode water is about 0.05M-5M, or about 0.05M-1M, or about 0.5M-1M, or about 0.05M-0.5M. In certain embodiments, any of these concentration ranges is used when the salt is potassium hydroxide. In certain embodiments, any of these concentration ranges is used for MEA cells having cathode surface areas of about 25 cm$^2$.

The following salt concentration ranges are used, in certain embodiments, employing carbon monoxide as a reactant in an MEA cell:

Anion conducting polymer only MEA for ethylene production (e.g., copper-containing catalyst): The salt concentration in anode water is about 0.05M-5M, or about 0.05M-1M, or about 0.5M-1M, or about 0.05M-0.5M, or about 0.5M-10M. In certain embodiments, any of these concentration ranges is used when the salt is potassium hydroxide. In certain embodiments, any of these concentration ranges is used for MEA cells having cathode surface areas of about 25 cm$^2$.

Anion conducting polymer only MEA for methane production (e.g., copper-containing catalyst): The salt concentration in anode water is about 0.05M-10M, or about 0.05M-1M, or about 0.05M-0.5M, or about 0.5M-10M or about 0.5M-1M. In certain embodiments, any of these concentration ranges is used when the salt is potassium hydroxide or sodium hydroxide. In certain embodiments, any of these concentration ranges is used for MEA cells having cathode surface areas of about 25 cm$^2$.

Bipolar MEA for ethylene production (e.g., copper-containing catalyst): The salt concentration in anode water is about 20 mM-2M, or about 50 mM-500 mM, or about 50 mM-250 mM, or about 100 mM-500 mM. In certain embodiments, any of these concentration ranges is used when the salt is potassium bicarbonate. In certain embodiments, any of these concentration ranges is used for MEA cells having cathode surface areas of about 25 cm$^2$.

While the salt concentrations provided herein may be appropriate for MEAs of any size, in certain embodiments, they are appropriate for cells employing MEAs having a surface area of about 25 cm$^2$ and the listed ranges may be scaled for cells with MEAs having larger surface areas. For example, in some embodiments, the salt concentrations increase with MEA area increases by a ratio of about 3:4. So, for example, if a salt concentration of 2 mM is appropriate for a cell having an MEA area of 25 cm$^2$, the concentration may be increased to 6 mM for a cell having an MEA area of 100 cm$^2$. As used herein, the area of an MEA is the area of a geometric plane at the MEA surface; it does account for pores or other deviations from planarity at the MEA surface.

In certain embodiments, the concentration of salt in an MEA, in moles of salt per mass of polymer electrolyte, is between about 1 and 3 mM/g. In certain embodiments, the concentration of salt in the polymer is estimate using conductivity measurements.

In some implementations, the concentration of any impurity other than introduced salt in anode or cathode water is very low; e.g., on the order of parts per million. This is particularly true of anions that are oxidizable at the anode and cations that are reducible at the cathode. In certain embodiments, the water containing one or more introduced salts has substantially no other ions other than those of the salt. For example, the water may contain no more than about 100 ppb of any transition metal ion other than any transition metal in the introduced salt. In some cases, the concentration of reducible transition metal ion is no greater than 10 ppb, or no greater than 1 ppb, or no greater than 0.1 ppb. In another example, the water contains no more than about 10 ppm of any halide ion. In another example, the water contains no more than about 10 ppm of any cation other than alkali metal ions and/or alkaline earth metal ions. In another example, the water contains no more than about 10 ppm of any cation other than alkali metal ions. In certain embodiments, the salt-containing water contains no more than about 100 ppm of unintentionally provided ion. In some cases, the salt-containing water contains no more than about 10 ppm of unintentionally provided ion, or no more than about 1 ppm of unintentionally provided ion, or no more than about 0.1 ppm of unintentionally provided ion.

In certain embodiments, unwanted ions and/or other impurities are removed from water prior to delivery of the water to a carbon dioxide reducing cell. This may be accomplished by purifying water upstream of the anode and/or cathode to which it is delivered. The water may be purified by any of various techniques such as passing the water through a resin column containing a chelating-type resin such as CR11 available from Sigma-Aldrich. Examples of techniques to achieve ultra-high purity water include gross filtration for large particulates, carbon filtration, water softening, reverse osmosis, exposure to ultraviolet (UV) light for TOC and/or bacterial static control, polishing using either ion exchange resins or electrodeionization (EDI) and filtration or ultrafiltration. The specific steps are affected by the starting quality of the water. With certain combinations of steps, it is possible to purify water to the point where it has a resistance of greater than about 18 MOhms. In certain embodiments, a resistance of only about 10 MOhm prior to the deliberate addition of salt is sufficient water purification for $CO_2$ electrolysis.

The salt concentration values presented herein may define salt concentration in an aqueous solution supplied to an MEA cell. Such solutions include anode water supplied during cell operation, a solution in which an MEA is soaked or otherwise contacted to infuse salt, and the like. The salt concentration may be different in an MEA than in a solution that supplies salt to the MEA. Typically, salt ions will penetrate the MEA from the solution and then move through the MEA via one or more transport mechanisms. In one mechanism, salt ions pass into the MEA via the supply solution. This may be the case when the solution permeates the MEA via pores or other openings in the MEA. Once in the MEA, the solution may move under a pressure gradient. The moving solution carries the salt ions along with it. While the salt ions are carried in the supply solution, their overall concentration in the MEA may be reduced because they occupy a greater volume: they occupy the volume of the supply solution in addition to the volume of the MEA polymers.

Salt ions in the solution may move independently of the bulk solution under the influence of a salt concentration gradient (diffusion or osmosis) or under the influence of an electric field (migration). These transport phenomena may also modify the salt concentration within the MEA. Independently of movement within the supply solution, salt ions may move by ionic conduction through the conductive polymers of the MEA. For example, salt cations may move by ionic conduction in the polymer matrix of a cation exchange membrane such as a sulfonated tetrafluoroethylene. And salt anions may move by ionic conduction through the matrix of an anion exchange membrane. The movement of salt ions in such polymer matrixes is sometimes referred to hopping, with the salt ions hopping between adjacent charged sites within a polymer matrix. During operation of an MEA cell, the salt ions within the polymer matrixes have their own concentrations that contribute to the overall salt or salt ion concentration in the MEA.

Due to the above factors and possibly other factors, the salt concentration in the MEA may be different from the salt concentration in the supply solution. While the salt concentration values presented herein typically represent the salt concentrations within the supply solution, before it penetrates the MEA, the values may also represent the concentration within an MEA. To the extent that the values represent concentrations within an MEA, they should be considered average values throughout the MEA. Note that salt ions may have different molar concentrations than their source salts. For example, a 1M solution of sodium sulfate may, when fully dissociated, be viewed as providing a 2M solution of sodium ions.

System

Figure 9:
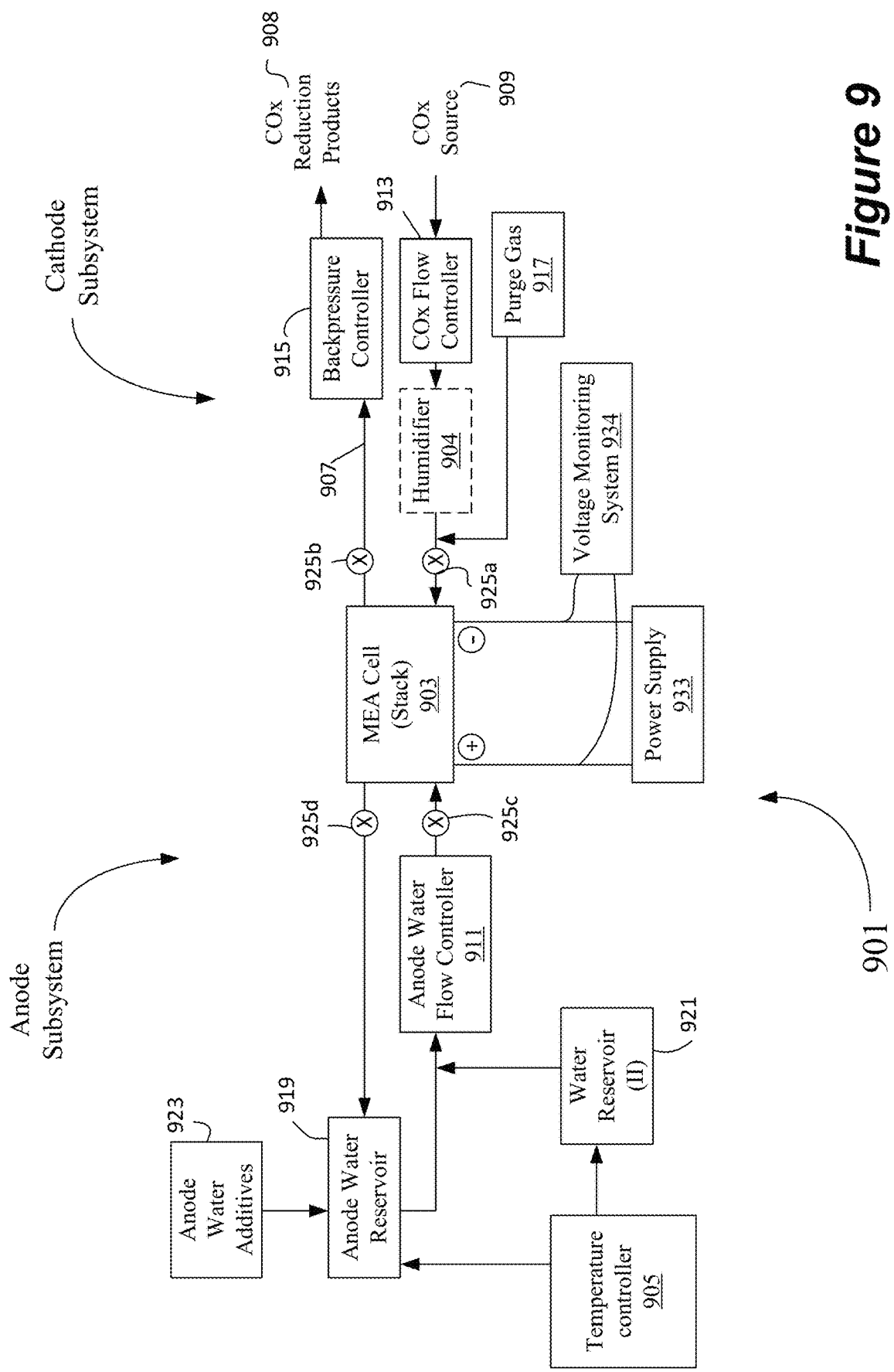
FIG. 9 is an illustration of an example of an electrolytic carbon oxide (CO$_x$) reduction system according to various embodiments of the disclosure.

FIG. 9 depicts a system 901 for controlling the operation of a carbon oxide reduction reactor 903 that may include a cell comprising a MEA such as any one or more of those described herein. The reactor may contain multiple cells or MEAs arranged in a stack. System 901 includes an anode subsystem that interfaces with an anode of reduction reactor 903 and a cathode subsystem that interfaces with a cathode of reduction reactor 903.

As depicted, the cathode subsystem includes a carbon oxide source 909 configured to provide a feed stream of carbon oxide to the cathode of reduction reactor 903, which, during operation, may generate an output stream that includes product(s) of a reduction reaction at the cathode. The product stream may also include unreacted carbon oxide and/or hydrogen. See 908.

The carbon oxide source 909 is coupled to a carbon oxide flow controller 913 configured to control the volumetric or mass flow rate of carbon oxide to reduction reactor 903. One or more other components may be disposed on a flow path from flow carbon oxide source 909 to the cathode of reduction reactor 903. For example, an optional humidifier 904 may be provided on the path and configured to humidify the carbon oxide feed stream. Humidified carbon oxide may moisten one or more polymer layers of an MEA and thereby avoid drying such layers. Another component that may be disposed on the flow path is a purge gas inlet coupled to a purge gas source 917. In certain embodiments, purge gas source 917 is configured to provide purge gas during periods when current is paused to the cell(s) of reduction reactor 903. In some implementations, flowing a purge gas over an MEA cathode facilitates recovery of catalyst activity and/or selectivity. This may be due, at least in part, to flushing certain reaction intermediates off catalyst active sites and/or remove water from the cathode. Examples of purge gases include carbon dioxide, carbon monoxide, hydrogen, nitrogen, argon, helium, oxygen, and mixtures of any two or more of these.

During operation, the output stream from the cathode flows via a conduit 907 that connects to a backpressure controller 915 configured to maintain pressure at the cathode side of the cell within a defined range (e.g., about 50 to 800 psig, depending on the system configuration). The output stream may provide the reaction products 908 to one or more components (not shown) for separation and/or concentration.

In certain embodiments, the cathode subsystem is configured to controllably recycle unreacted carbon oxide from the outlet stream back to the cathode of reduction reactor 903. In some implementations, the output stream is processed to remove reduction product(s) and/or hydrogen before recycling the carbon oxide. Depending upon the MEA configuration and operating parameters, the reduction product(s) may be carbon monoxide, hydrogen, hydrocarbons such as methane and/or ethylene, oxygen-containing organic compounds such as formic acid, acetic acid, and any combinations thereof. In certain embodiments, one or more components, not shown, for removing water from the product stream are disposed downstream form the cathode outlet. Examples of such components include a phase separator configured to remove liquid water from the product gas stream and/or a condenser configured to cool the product stream gas and thereby provide a dry gas to, e.g., a downstream process when needed. In some implementations, recycled carbon oxide may mix with fresh carbon oxide from source 909 upstream of the cathode.

As depicted in Figure M, an anode subsystem is configured to provide an anode feed stream to an anode side of the carbon oxide reduction reactor 903. In certain embodiments, the anode subsystem includes an anode water source, not shown, configured to provide fresh anode water to a recirculation loop that includes an anode water reservoir 919 and an anode water flow controller 911. The anode water flow controller 911 is configured to control the flow rate of anode water to or from the anode of reduction reactor 903. In the depicted embodiment, the anode water recirculation loop is coupled to components for adjusting the composition of the anode water. These may include a water reservoir 921 and/or an anode water additives source 923. Water reservoir 921 is configured to supply water having a composition that is different from that in anode water reservoir 919 (and circulating in the anode water recirculation loop). In one example, the water in water reservoir 921 is pure water that can dilute solutes or other components in the circulating anode water. Pure water may be conventional deionized water even ultrapure water having a resistivity of, e.g., at least about 15 MOhm-cm or over 18.0 MOhm-cm. Anode water additives source 923 is configured to supply solutes such as salts and/or other components to the circulating anode water.

During operation, the anode subsystem may provide water or other reactant to the anode of reactor 903, where it at least partially reacts to produce an oxidation product such as oxygen. The product along with unreacted anode feed material is provided in a reduction reactor outlet stream. Not shown in FIG. 9 is an optional separation component that may be provided on the path of the anode outlet stream and configured to concentrate or separate the oxidation product from the anode product stream.

Other control features may be included in system 901. For example, a temperature controller may be configured to heat and/or cool the carbon oxide reduction reactor 903 at appropriate points during its operation. In the depicted embodiment, a temperature controller 905 is configured to heat and/or cool anode water provided to the anode water recirculation loop. For example, the temperature controller 905 may include or be coupled to a heater and/or cooler that may heat or cool water in anode water reservoir 919 and/or water in reservoir 921. In some embodiments, system 901 includes a temperature controller configured to directly heat and/or cool a component other than an anode water component. Examples of such other components in the cell or stack and the carbon oxide flowing to the cathode.

Depending upon the phase of the electrochemical operation, including whether current is paused to carbon oxide reduction reactor 903, certain components of system 901 may operate to control non-electrical operations. For example, system 901 may be configured to adjust the flow rate of carbon oxide to the cathode and/or the flow rate of anode feed material to the anode of reactor 903. Components that may be controlled for this purpose may include carbon oxide flow controller 913 and anode water controller 911.

In addition, depending upon the phase of the electrochemical operation including whether current is paused, certain components of system 901 may operate to control the composition of the carbon oxide feed stream and/or the anode feed stream. For example, water reservoir 921 and/or anode water additives source 923 may be controlled to adjust the composition of the anode feed stream. In some cases, additives source 923 may be configured to adjust the concentration of one or more solutes such as one or more salts in an aqueous anode feed stream.

In some cases, a temperature controller such controller 905 is configured to adjust the temperature of one or more components of system 901 based on a phase of operation. For example, the temperature of a cell of reactor 903 may be increased or decreased during break-in, a current pause in normal operation, and/or storage.

In some embodiments, a carbon oxide electrolytic reduction system is configured to facilitate removal of a reduction cell from other system components. This may be useful if the cell needs to be removed for storage, maintenance, refurbishment, etc. In the depicted embodiments, isolation valves 925a and 925b are configured to block fluidic communication of cell 903 to a source of carbon oxide to the cathode and backpressure controller 915, respectively. Additionally, isolation valves 925c and 925d are configured to block fluidic communication of reactor 903 to anode water inlet and outlet, respectively.

The carbon oxide reduction reactor 903 may also operate under the control of one or more electrical power sources and associated controllers. See, block 933. Electrical power source and controller 933 may be programmed or otherwise configured to control current supplied to and/or to control voltage applied to the electrodes in reduction reactor 903. The current and/or voltage may be controlled to apply a current at a desired current density. A system operator or other responsible individual may act in conjunction with electrical power source and controller 933 to fully define profiles of current applied to reduction reactor 903.

In certain embodiments, the electrical power source and controller acts in concert with one or more other controllers or control mechanisms associated with other components of system 901. For example, electrical power source and controller 933 may act in concert with controllers for controlling the delivery of carbon oxide to the cathode, the delivery of anode water to the anode, the addition of pure water or additives to the anode water, and any combination of these features. In some implementations, one or more controllers are configured to control or operate in concert to control any combination of the following functions: applying current and/or voltage to reduction reactor 903, controlling backpressure (e.g., via backpressure controller 915), supplying purge gas (e.g., using purge gas component 917), delivering carbon oxide (e.g., via carbon oxide flow controller 913), humidifying carbon oxide in a cathode feed stream (e.g., via humidifier 904), flow of anode water to and/or from the anode (e.g., via anode water flow controller 911), and anode water composition (e.g., via anode water reservoir 919, pure water reservoir 921, and/or anode water additives component 923).

In the depicted embodiment, a voltage monitoring system 934 is employed to determine the voltage across an anode and cathode of an MEA cell or across any two electrodes of a cell stack, e.g., determining the voltage across all cells in a multi-cell stack.

An electrolytic carbon oxide reduction system such as that depicted in FIG. 9 may employ a control system that includes one or more controllers and one or more controllable components such as pumps, sensors, dispensers, valves, and power supplies. Examples of sensors include pressure sensors, temperature sensors, flow sensors, conductivity sensors, voltmeters, ammeters, electrolyte composition sensors including electrochemical instrumentation, chromatography systems, optical sensors such as absorbance measuring tools, and the like. Such sensors may be coupled to inlets and/or outlets of an MEA cell (e.g., in a flow field), in a reservoir for holding anode water, pure water, salt solution, etc., and/or other components of an electrolytic carbon oxide reduction system.

Among the various functions that may be controlled by one or more controllers are: applying current and/or voltage to a carbon oxide reduction cell, controlling backpressure on an outlet from a cathode on such cell, supplying purge gas to a cathode inlet, delivering carbon oxide to the cathode inlet, humidifying carbon oxide in a cathode feed stream, flowing anode water to and/or from the anode, and controller anode feed composition. Any one or more of these functions may have a dedicated controller for controlling its function alone. Any two or more of these functions may share a controller. In some embodiments, a hierarchy of controllers is employed, with at least one master controller providing instructions to two or more component controllers. For example, a system may comprise a master controller configured to provide high level control instructions to (i) a power supply to a carbon oxide reduction cell, (ii) a cathode feed stream flow controller, and (iii) an anode feed stream flow controller. For example, a programmable logic controller (PLC) may be used to control individual components of the system.

In certain embodiments, a control system is configured to apply current to a carbon oxide reduction cell comprising an MEA in accordance with a set current as described herein. In certain embodiments, a control system is configured to control the flow rate of one or more feed streams (e.g., a cathode feed stream such as a carbon oxide flow and an anode feed stream) in concert with a current schedule. In some embodiments, current and/or voltage may be regulated to be regularly paused as described in U.S. patent application Ser. No. 16/719,359, filed on Dec. 18, 2019, and incorporated by reference herein for all purposes.

In certain embodiments, a control system may maintain salt concentration at defined levels and/or recover and recirculate anode water. In certain embodiments, the salt concentration is adjusted in concert with a schedule of applied current pauses to an MEA cell. Under control of the control system, the system may, for example, (a) recirculate anode water flowing out of an anode, (b) adjust the composition and/or flow rate of anode water into the anode, (c) move water from cathode outflow back to anode water, and/or (d) adjust the composition and/or flow rate of water recovered from the cathode stream, before returning to the anode. Note that the (d) may account for carbon oxide reduction products in recovered water from the cathode. However, in some implementations, this need not be considered as some reduction products may subsequently oxidize to harmless products at the anode.

A controller may include any number of processors and/or memory devices. The controller may contain control logic such software or firmware and/or may execute instructions provided from another source. A controller may be integrated with electronics for controlling operation the electrolytic cell before, during, and after reducing a carbon oxide. The controller may control various components or subparts of one or multiple electrolytic carbon oxide reduction systems. The controller, depending on the processing requirements and/or the type of system, may be programmed to control any of the processes disclosed herein, such as delivery of gases, temperature settings (e.g., heating and/or cooling), pressure settings, power settings (e.g., electrical voltage and/or current delivered to electrodes of an MEA cell), liquid flow rate settings, fluid delivery settings, and dosing of purified water and/or salt solution. These controlled processes may be connected to or interfaced with one or more systems that work in concert with the electrolytic carbon oxide reduction system.

In various embodiments, a controller comprises electronics having various integrated circuits, logic, memory, and/or software that receive instructions, issue instructions, control operations described herein. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a process on one or more components of an electrolytic carbon oxide reduction system. The operational parameters may, in some embodiments, be part of a recipe defined by process engineers to accomplish one or more processing steps during generation of a particular reduction product such as carbon monoxide, hydrocarbons, and/or other organic compounds.

The controller, in some implementations, may be a part of or coupled to a computer that is integrated with, coupled to the system, otherwise networked to the system, or a combination thereof. For example, the controller may utilize instructions stored remotely (e.g., in the "cloud") and/or execute remotely. The computer may enable remote access to the system to monitor current progress of electrolysis operations, examine a history of past electrolysis operations, examine trends or performance metrics from a plurality of electrolysis operations, to change parameters of current processing, to set processing steps to follow a current processing, or to start a new process. In some examples, a remote computer (e.g. a server) can provide process recipes to a system over a network, which may include a local network or the internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations.

The controller may be distributed, such as by comprising one or more discrete controllers that are networked together and working towards a common purpose, such as applying current to an MEA cell and other process controls described herein. An example of a distributed control system for such purposes includes one or more processors on a system for electrolytically reducing a carbon oxide and one or more processors located remotely (such as at the platform level or as part of a remote computer) that combine to control a process.

In certain embodiments, an electrolytic carbon oxide reduction system is configured and controlled to avoid precipitating salt within an MEA. Precipitated salt can block channels and/or have other impacts that degrade an MEA cell's performance. In some cases, a cell may become too dry, e.g., at the cathode side, because dry gaseous reactant removes too much water from the MEA, particularly on the cathode side. This issue, which may cause salt precipitation, may be addressed by controlling the water partial pressure in the gas inlet stream (e.g., by humidifying the gaseous carbon oxide source gas). In some cases, a salt concentration in anode water is sufficiently high that it promotes salt precipitation in the MEA. This issue may be addressed by flushing the MEA with pure water during a current pause.

MEA Design Embodiments

MEA Overview

In various embodiments, an MEA contains an anode layer, a cathode layer, electrolyte, and optionally one or more other layers. The layers may be solids and/or gels. The layers may include polymers such as ion-conducting polymers.

When in use, the cathode of an MEA promotes electrochemical reduction of $CO_x$ by combining three inputs: $CO_x$, ions (e.g., protons) that chemically react with $CO_x$, and electrons. The reduction reaction may produce CO, hydrocarbons, and/or oxygen and hydrogen containing organic compounds such as methanol, ethanol, and acetic acid. When in use, the anode of an MEA promotes an electrochemical oxidation reaction such as electrolysis of water to produce elemental oxygen and protons. The cathode and anode may each contain catalysts to facilitate their respective reactions.

The compositions and arrangements of layers in the MEA may promote high yield of a $CO_x$ reduction products. To this end, the MEA may facilitate any one or more of the following conditions: (a) minimal parasitic reduction reactions (non-$CO_x$ reduction reactions) at the cathode; (b) low loss of $CO_x$ reactants at anode or elsewhere in the MEA; (c) maintain physical integrity of the MEA during the reaction (e.g., prevent delamination of the MEA layers); (d) prevent $CO_x$ reduction product cross-over; (e) prevent oxidation production (e.g., $O_2$) cross-over; (f) maintain a suitable environment at the cathode for oxidation; (g) provide pathway for desired ions to travel between cathode and anode while blocking undesired ions; and (h) minimize voltage losses. As explained herein, the presence of salts or salt ions in the MEA can facilitate some of all of these conditions.

COx Reduction Considerations

Polymer-based membrane assemblies such as MEAS have been used in various electrolytic systems such as water electrolyzers and in various galvanic systems such as fuel cells. However, $CO_x$ reduction presents problems not encountered, or encountered to a lesser extent, in water electrolyzers and fuel cells.

For example, for many applications, an MEA for $CO_x$ reduction requires a lifetime on the order of about 50,000 hours or longer (approximately five years of continuous operation), which is significantly longer than the expected lifespan of a fuel cell for automotive applications; e.g., on the order of 5,000 hours. And for various applications, an MEA for $CO_x$ reduction employs electrodes having a relatively large surface area by comparison to MEAs used for fuel cells in automotive applications. For example, MEAs for $CO_x$ reduction may employ electrodes having surface areas (without considering pores and other nonplanar features) of at least about 500 cm$^2$.

$CO_x$ reduction reactions may be implemented in operating environments that facilitate mass transport of particular reactant and product species, as well as to suppress parasitic reactions. Fuel cell and water electrolyzer MEAs often cannot produce such operating environments. For example, such MEAs may promote undesirable parasitic reactions such as gaseous hydrogen evolution at the cathode and/or gaseous $CO_2$ production at the anode.

In some systems, the rate of a $CO_x$ reduction reaction is limited by the availability of gaseous $CO_x$ reactant at the cathode. By contrast, the rate of water electrolysis is not significantly limited by the availability of reactant: liquid water tends to be easily accessible to the cathode and anode, and electrolyzers can operate close to the highest current density possible.

MEA Configurations

In certain embodiments, an MEA has a cathode layer, an anode layer, and a polymer electrolyte membrane (PEM) between the anode layer and the cathode layer. The polymer electrolyte membrane provides ionic communication between the anode layer and the cathode layer, while preventing electronic communication, which would produce a short circuit. The cathode layer includes a reduction catalyst and a first ion-conducting polymer. The cathode layer may also include an ion conductor and/or an electron conductor. The anode layer includes an oxidation catalyst and a second ion-conducting polymer. The anode layer may also include an ion conductor and/or an electron conductor. The PEM includes a third ion-conducting polymer.

In certain embodiments, the MEA has a cathode buffer layer between the cathode layer and the polymer electrolyte membrane. The cathode buffer includes a fourth ion-conducting polymer.

In certain embodiments, the MEA has an anode buffer layer between the anode layer and the polymer electrolyte membrane. The anode buffer includes a fifth ion-conducting polymer.

In connection with certain MEA designs, there are three available classes of ion-conducting polymers: anion-conductors, cation-conductors, and mixed cation-and-anion-conductors. In certain embodiments, at least two of the first, second, third, fourth, and fifth ion-conducting polymers are from different classes of ion-conducting polymers.

Conductivity and Selectivity of Ion-Conducting Polymers for MEA Layers

The term "ion-conducting polymer" is used herein to describe a polymer electrolyte having greater than about 1 mS/cm specific conductivity for anions and/or cations. The term "anion-conductor" describes an ion-conducting polymer that conducts anions primarily (although there will still be some small amount of cation conduction) and has a transference number for anions greater than about 0.85 at around 100 micron thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at around 100 micron thickness. For an ion-conducting polymer that is described as conducting both anions and cations (a "cation-and-anion-conductor"), neither the anions nor the cations has a transference number greater than approximately 0.85 or less than approximately 0.15 at around 100 micron thickness. To say a material conducts ions (anions and/or cations) is to say that the material is an ion-conducting material or ionomer. Examples of ion-conducting polymers of each class are provided in the below Table.

mer on the anode side of the MEA. In some implementations, the cathode contains a first catalyst and an anion-conducting polymer. In certain embodiments, the anode contains a second catalyst and a cation-conducting polymer. In some implementations, a cathode buffer layer, located between the cathode and PEM, contains an anion-conducting polymer. In some embodiments, an anode buffer layer, located between the anode and PEM, contains a cation-conducting polymer.

During operation, an MEA with a bipolar interface moves ions through a polymer-electrolyte, moves electrons through metal and/or carbon in the cathode and anode layers, and moves liquids and gas through pores in the layers.

In embodiments employing an anion-conducting polymer in the cathode and/or in a cathode buffer layer, the MEA can decrease or block unwanted reactions that produce undesired products and decrease the overall efficiency of the cell. In embodiments employing a cation-conducting polymer in the anode and/or in an anode buffer layer can decrease or block

| Ion-Conducting Polymers | | | |
| --- | --- | --- | --- |
| Class | Description | Common Features | Examples |
| A. Anion-conducting | Greater than approximately 1 mS/cm specific conductivity for anions, which have a transference number greater than approximately 0.85 at around 100 micron thickness | Positively charged functional groups are covalently bound to the polymer backbone | aminated tetramethyl polyphenylene; poly(ethylene-co-tetrafluoroethylene)-based quaternary ammonium polymer; quaternized polysulfone |
| B. Conducts both anions and cations | Greater than approximately 1 mS/cm conductivity for ions (including both cations and anions), which have a transference number between approximately 0.15 and 0.85 at around 100 micron thickness | Salt is soluble in the polymer and the salt ions can move through the polymer material | polyethylene oxide; polyethylene glycol; poly(vinylidene fluoride); polyurethane |
| C. Cation-conducting | Greater than approximately 1 mS/cm specific conductivity for cations, which have a transference number greater than approximately 0.85 at around 100 micron thickness | Negatively charged functional groups are covalently bound to the polymer backbone | perfluorosulfonic acid polytetrafluoroethylene co-polymer; sulfonated poly(ether ether ketone); poly(styrene sulfonic acid- co-maleic acid) |

Some Class A ion-conducting polymers are known by tradenames such as 2259-60 (Pall RAI), AHA by Tokuyama Co, Fumasep® FAA-(fumatech GbbH), Sustanion®, Morgane ADP by Solvay, or Tosflex® SF-17 by Tosoh anion exchange membrane material. Further class A ion-conducting polymers include HNN5/HNN8 by Ionomr, FumaSep® by Fumatech, TM1 by Orion, and PAP-TP by W7energy. Some Class C ion-conducting polymers are known by tradenames such as various formulations of Nafion® (Dupont™), GORE-SELECT® (Gore), FumaPEM® (fumatech GmbH), and Aquivion® PFSA (Solvay).

Bipolar MEA for COx Reduction

In certain embodiments, the MEA includes a bipolar interface with an anion-conducting polymer on the cathode side of the MEA and an interfacing cation-conducting poly-unwanted reactions that reduce desired product production and reduce the overall efficiency of the cell.

For example, at levels of electrical potential used for cathodic reduction of $CO_2$, hydrogen ions may be reduced to hydrogen gas. This is a parasitic reaction; current that could be used to reduce $CO_2$ is used instead to reduce hydrogen ions. Hydrogen ions may be produced by various oxidation reactions performed at the anode in a $CO_2$ reduction reactor and may move across the MEA and reach the cathode where they can be reduced to produce hydrogen gas. The extent to which this parasitic reaction can proceed is a function of the concentration of hydrogen ions present at the cathode. Therefore, an MEA may employ an anion-conducting material in the cathode layer and/or in a cathode buffer layer. The anion-conducting material at least partially blocks hydrogen ions from reaching catalytic sites on the cathode. As a result, parasitic production of hydrogen gas generation is decreased and the rate of CO or other product production and the overall efficiency of the process are increased.

Another reaction that may be avoided is reaction of carbonate or bicarbonate ions at the anode to produce $CO_2$. Aqueous carbonate or bicarbonate ions may be produced from $CO_2$ at the cathode. If such ions reach the anode, they may react with hydrogen ions to produce and release gaseous $CO_2$. The result is net movement of $CO_2$ from the cathode to the anode, where it does not react and is lost with oxidation products. To prevent the carbonate and bicarbonate ion produced at the cathode from reaching the anode, the anode and/or an anode buffer layer may include a cation-conducting polymer, which at least partially blocks the transport of negative ions such as bicarbonate ions to the anode.

Thus, in some designs, a bipolar membrane structure raises the pH at the cathode to facilitate $CO_2$ reduction while a cation-conducting polymer such as a proton-exchange layer prevents the passage of significant amounts of $CO_2$ and $CO_2$ reduction products (e.g., bicarbonate) to the anode side of the cell.

Figure 10:
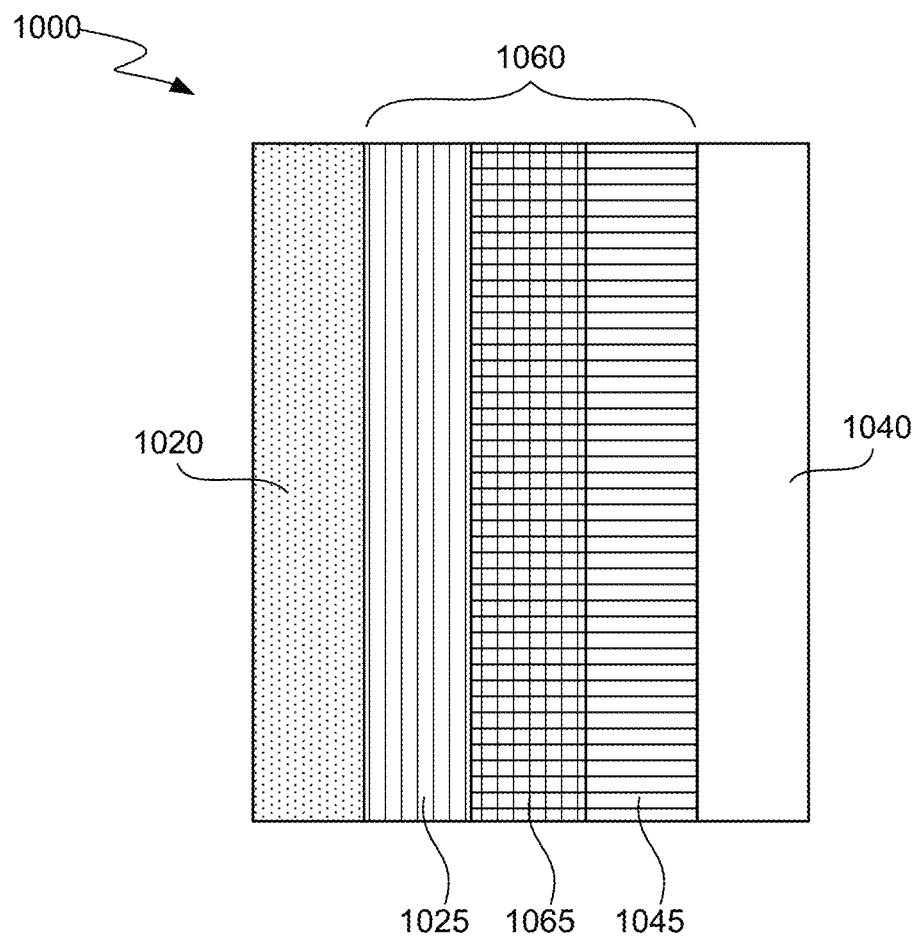
FIG. 10 is a schematic illustration of a membrane electrode assembly for use in CO$_x$ reduction according to various embodiments of the disclosure.

An example MEA 1000 for use in $CO_x$ reduction is shown in FIG. 10. The MEA 1000 has a cathode layer 1020 and an anode layer 1040 separated by an ion-conducting polymer layer 1060 that provides a path for ions to travel between the cathode layer 1020 and the anode layer 1040. In certain embodiments, the cathode layer 1020 includes an anion-conducting polymer and/or the anode layer 1040 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 1060 may include two or three sublayers: a polymer electrolyte membrane (PEM) 1065, an optional cathode buffer layer 1025, and/or an optional anode buffer layer 1045. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 1065 is nonporous. Example characteristics of anode buffer layers and cathode buffer layers are provided elsewhere herein. In certain embodiments, the ion-conducting layer includes only a single layer or two sublayers.

Figure 11:
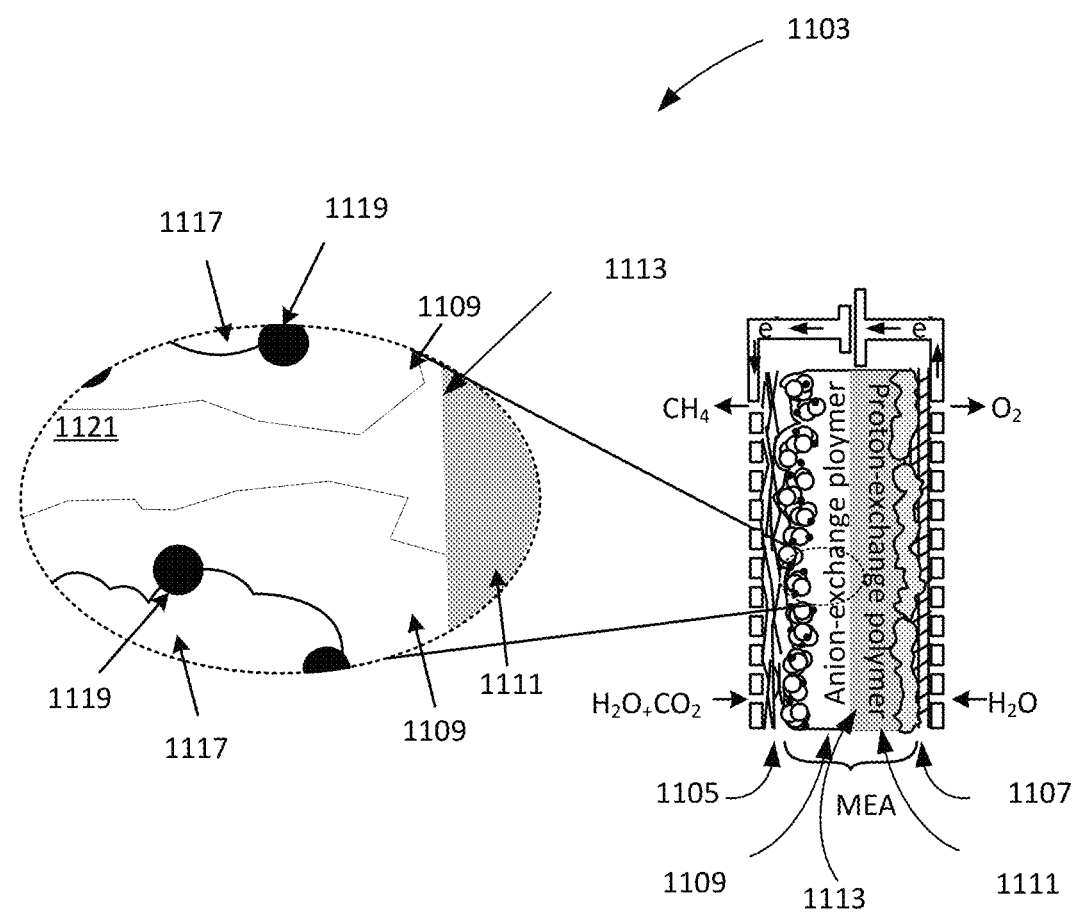
FIG. 11 is an illustration of a bipolar MEA.

FIG. 11 shows $CO_2$ electrolyzer 1103 configured to receive water and $CO_2$ (e.g., humidified or dry gaseous $CO_2$) as a reactant at a cathode 1105 and expel $CH_4$ as a product. Electrolyzer 1103 is also configured to receive water as a reactant at an anode 1107 and expel gaseous oxygen. Electrolyzer 1103 includes bipolar layers having an anion-conducting polymer 1109 adjacent to cathode 1105 and a cation-conducting polymer 1111 (illustrated as a proton-exchange membrane) adjacent to anode 1107.

As illustrated in the magnification inset of a bipolar interface 1113 in electrolyzer 1103, the cathode 1105 includes an anion exchange polymer (which in this example is the same anion-conducting polymer 1109 that is in the bipolar layers) electronically conducting carbon support particles 1117, and metal nanoparticles 1119 supported on the support particles. $CO_2$ and water are transported via pores such as pore 1121 and reach metal nanoparticles 1119 where they react, in this case with hydroxide ions, to produce bicarbonate ions and reduction reaction products (not shown). $CO_2$ may also reach metal nanoparticles 1119 by transport within anion exchange polymer 1115.

Hydrogen ions are transported from anode 1107, and through the cation-conducting polymer 1111, until they reach bipolar interface 1113, where they are hindered from further transport toward the cathode by anion exchange polymer 1109. At interface 1113, the hydrogen ions may react with bicarbonate or carbonate ions to produce carbonic acid ($H_2CO_3$), which may decompose to produce $CO_2$ and water. As explained herein, the resulting $CO_2$ may be provided in gas phase and should be provided with a route in the MEA back to the cathode 1105 where it can be reduced. The cation-conducting polymer 1111 hinders transport of anions such as bicarbonate ions to the anode where they could react with protons and release $CO_2$, which would be unavailable to participate in a reduction reaction at the cathode.

As illustrated, a cathode buffer layer having an anion-conducting polymer may work in concert with the cathode and its anion-conductive polymer to block transport of protons to the cathode. While MEAs employing ion conducting polymers of appropriate conductivity types in the cathode, the anode, cathode buffer layer, and if present, an anode buffer layer may hinder transport of cations to the cathode and anions to the anode, cations and anions may still come in contact in the MEA's interior regions, such as in the membrane layer.

Bicarbonate and/or carbonate ions combine with hydrogen ions between the cathode layer and the anode layer to form carbonic acid, which may decompose to form gaseous $CO_2$. It has been observed that MEAs sometime delaminate, possibly due to this production of gaseous $CO_2$, which does not have an easy egress path.

The delamination problem can be addressed by employing a cathode buffer layer having inert filler and associated pores. One possible explanation of its effectiveness is that the pores create paths for the gaseous carbon dioxide to escape back to the cathode where it can be reduced. In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode. The porosity of various layers in an MEA is described further at other locations herein.

Examples of Bipolar MEAs

As an example, an MEA includes a cathode layer including a reduction catalyst and a first anion-conducting polymer (e.g., Sustainion®, FumaSep® FAA-3, Tokuyama anion exchange polymer), an anode layer including an oxidation catalyst and a first cation-conducting polymer (e.g., PFSA polymer), a membrane layer including a second cation-conducting polymer and arranged between the cathode layer and the anode layer to conductively connect the cathode layer and the anode layer, and a cathode buffer layer including a second anion-conducting polymer (e.g., Sustainion®, FumaSep® FAA-3, Tokuyama anion exchange polymer) and arranged between the cathode layer and the membrane layer to conductively connect the cathode layer and the membrane layer. In this example, the cathode buffer layer can have a porosity between about 1 and 90 percent by volume, but can additionally or alternatively have any suitable porosity (including, e.g., no porosity). In other examples the cathode buffer layer can have any suitable porosity (e.g., between 0.01-95%, 0.1-95%, 0.01-75%, 1-95%, 1-90%, etc.).

Too much porosity can lower the ionic conductivity of the buffer layer. In some embodiments, the porosity is 20% or below, and in particular embodiments, between 0.1-20%, 1-10%, or 5-10%. Porosity in these ranges can be sufficient to allow movement of water and/or $CO_2$ without losing ionic conductivity. Porosity may be measured as described further below.

In a related example, the membrane electrode assembly can include an anode buffer layer that includes a third cation-conducting polymer, and is arranged between the membrane layer and the anode layer to conductively connect the membrane layer and the anode layer. The anode buffer layer preferably has a porosity between about 1 and 90 percent by volume, but can additionally or alternatively have any suitable porosity (including, e.g., no porosity). However, in other arrangements and examples, the anode buffer layer can have any suitable porosity (e.g., between 0.01-95%, 0.1-95%, 0.01-75%, 1-95%, 1-90%). As with the cathode buffer layer, in some embodiments, the porosity is 20% or below, e.g. 0.1-20%, 1-10%, or 5-10%

In an example, an anode buffer layer may be used in a MEA having a cathode catalyst layer with anion exchange polymer, a cathode buffer layer with anion-exchange polymer, a membrane with cation-exchange polymer, and an anode buffer layer with anion-exchange polymer. In such a structure, the anode buffer layer may porous to facilitate water transport to the membrane/anode buffer layer interface. Water will be split at this interface to make protons that travel through the membrane and hydroxide that travels to the anode catalyst layer. One advantage of this structure is the potential use of low cost water oxidation catalysts (e.g., $NiFeO_x$) that are only stable in basic conditions.

In another specific example, the membrane electrode assembly includes a cathode layer including a reduction catalyst and a first anion-conducting polymer (e.g., Sustainion®, FumaSep® FAA-3, Tokuyama anion exchange polymer), an anode layer including an oxidation catalyst and a first cation-conducting polymer, a membrane layer including a second anion-conducting polymer (e.g., Sustainion®, FumaSep® FAA-3, Tokuyama anion exchange polymer) and arranged between the cathode layer and the anode layer to conductively connect the cathode layer and the anode layer, and an anode buffer layer including a second cation-conducting polymer and arranged between the anode layer and the membrane layer to conductively connect the anode layer and the membrane layer.

An MEA containing an anion-exchange polymer membrane and an anode buffer layer containing cation-exchange polymer may be used for CO reduction. In this case, water would form at the membrane/anode buffer layer interface. Pores in the anode buffer layer could facilitate water removal. One advantage of this structure would be the use of an acid stable (e.g., $IrO_x$) water oxidation catalyst.

In a related example, the membrane electrode assembly can include a cathode buffer layer that includes a third anion-conducting polymer, and is arranged between the cathode layer and the membrane layer to conductively connect the cathode layer and the membrane layer. The third anion-conducting polymer can be the same or different from the first and/or second anion-conducting polymer. The cathode buffer layer preferably has a porosity between about 1 and 90 percent by volume, but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%). In some embodiments, the porosity is 20% or below, and in particular embodiments, between 0.1-20%, 1-10%, or 5-10%.

In an example, a cathode catalyst layer composed of Au nanoparticles 4 nm in diameter supported on Vulcan XC72R carbon and mixed with TM1 (mTPN-1) anion exchange polymer electrolyte (from Orion). Layer is ~15 um thick, Au/(Au+C)=20 wt %, TM1 to catalyst mass ratio of 0.32, mass loading of 1.4-1.6 mg/cm$^2$ (total Au+C), estimated porosity of 0.56. Anion-exchange polymer layer composed of TM1 and PTFE particles. PTFE is approximately 200 nm in diameter. TM1 molecular weight is 30 k-45 k. Thickness of the layer is ~15 um. PTFE may introduce porosity of about 8%. Proton-exchange membrane layer composed of perfluorosulfonic acid polymer (e.g., Nafion® 117). Thickness is approximately 125 um. Membrane forms a continuous layer that prevents significant movement of gas ($CO_2$, CO, $H_2$) through the layer. Anode catalyst layer composed of Ir or $IrO_x$ nanoparticles (100-200 nm aggregates) that is 10 um thick.

Anion Exchange Membrane-Only MEA for $CO_x$ Reduction

In some embodiments, an MEA does not contain a cation-conducting polymer layer. In such embodiments, the electrolyte is not a cation-conducting polymer and the anode, if it includes an ion-conducting polymer, does not contain a cation-conducting polymer. Examples are provided herein.

An AEM-only MEA allows conduction of anions across the MEA. In embodiments in which none of the MEA layers has significant conductivity for cations, hydrogen ions have limited mobility in the MEA. In some implementations, an AEM-only membrane provides a high pH environment (e.g., at least about pH 7) and may facilitate $CO_2$ and/or CO reduction by suppressing the hydrogen evolution parasitic reaction at the cathode. As with other MEA designs, the AEM-only MEA allows ions, notably anions such as hydroxide ions, to move through polymer-electrolyte. The pH may be lower in some embodiments; a pH of 4 or greater may be high enough to suppress hydrogen evolution. The AEM-only MEA also permits electrons to move to and through metal and carbon in catalyst layers. In embodiments, having pores in the anode layer, the cathode layer, and/or the PEM, the AEM-only MEA permits liquids and gas to move through pores.

In certain embodiments, the AEM-only MEA comprises an anion-exchange polymer electrolyte membrane with an electrocatalyst layer on either side: a cathode and an anode. In some embodiments, one or both electrocatalyst layers also contain anion-exchange polymer-electrolyte.

In certain embodiments, an AEM-only MEA is formed by depositing cathode and anode electrocatalyst layers onto porous conductive supports such as gas diffusion layers to form gas diffusion electrodes (GDEs), and sandwiching an anion-exchange membrane between the gas diffusion electrodes.

In certain embodiments, an AEM-only MEA is used for $CO_2$ reduction. The use of an anion-exchange polymer electrolyte avoids low pH environment that disfavors $CO_2$ reduction. Further, water is transported away from the cathode catalyst layer when an AEM is used, thereby preventing water build up (flooding) which can block reactant gas transport in the cathode of the cell.

Water transport in the MEA occurs through a variety of mechanisms, including diffusion and electro-osmotic drag. In some embodiments, at current densities of the $CO_2$ electrolyzers described herein, electro-osmotic drag is the dominant mechanism. Water is dragged along with ions as they move through the polymer electrolyte. For a cation-exchange membrane such as Nafion® membrane, the amount of water transport is well characterized and understood to rely on the pre-treatment/hydration of the membrane. Protons move from positive to negative potential (anode to cathode) with. each carrying 2-4 water molecules with it, depending on pretreatment. In anion-exchange polymers, the same type of effect occurs. Hydroxide, bicarbonate, or carbonate ions moving through the polymer electrolyte will 'drag' water molecules with them. In the anion-exchange MEAs, the ions travel from negative to positive voltage, so from cathode to anode, and they carry water molecules with them, moving water from the cathode to the anode in the process.

In certain embodiments, an AEM-only MEA is employed in CO reduction reactions. Unlike the $CO_2$ reduction reaction, CO reduction does not produce carbonate or bicarbonate anions that could transport to the anode and release valuable reactant.

Figure 12:
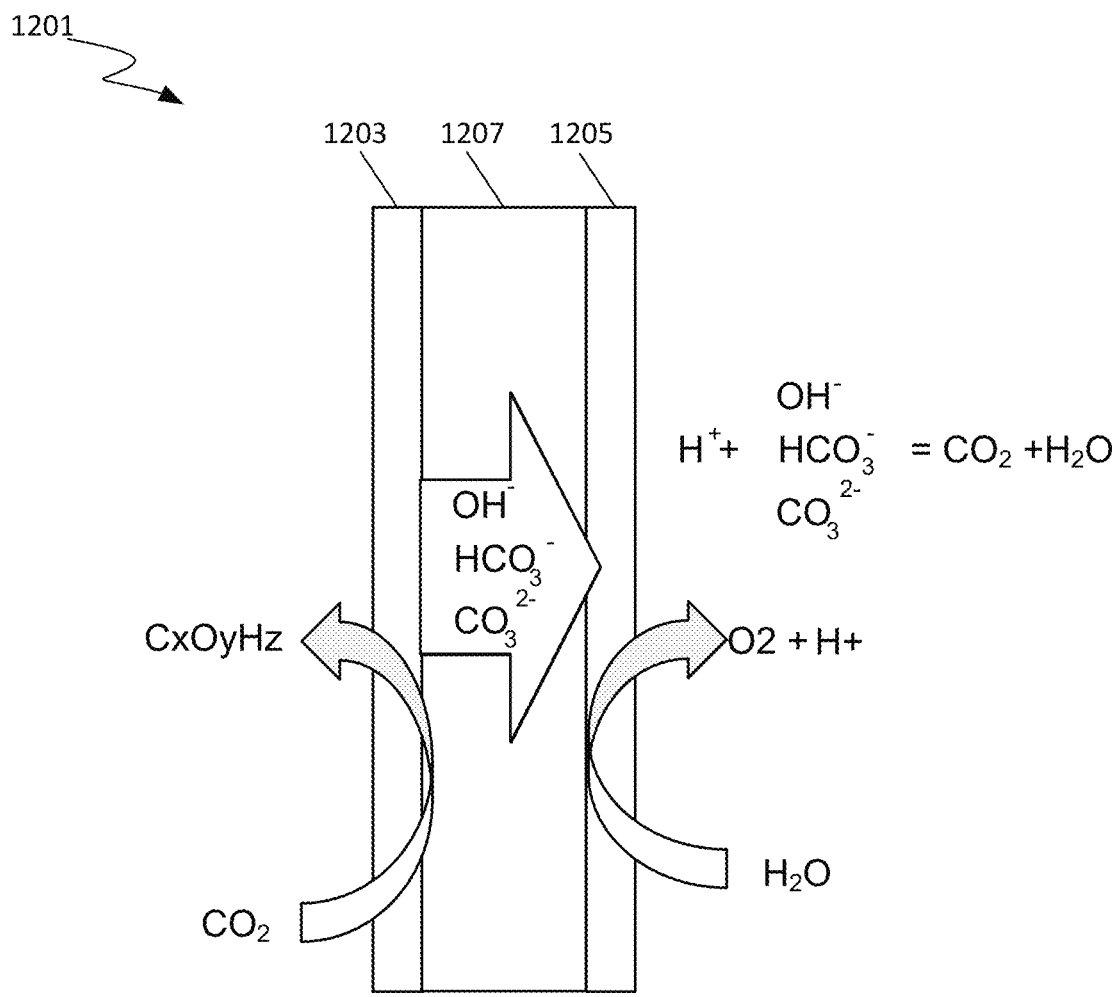
FIG. 12 is an illustration of an MEA in which CO$_2$ gas is provided to a cathode catalyst layer.

FIG. 12 illustrates an example construction of a $CO_2$ reduction MEA 1201 having a cathode catalyst layer 1203, an anode catalyst layer 1205, and an anion-conducting PEM 1207. In certain embodiments, cathode catalyst layer 1203 includes metal catalyst particles (e.g., nanoparticles) that are unsupported or supported on a conductive substrate such as carbon particles. In some implementations, cathode catalyst layer 1203 additionally includes an anion-conducting polymer. The metal catalyst particles may catalyze $CO_2$ reduction, particularly at pH greater than 7. In certain embodiments, anode catalyst layer 1205 includes metal oxide catalyst particles (e.g., nanoparticles) that are unsupported or supported on a conductive substrate such as carbon particles. In some implementations, anode catalyst layer 1203 additionally includes an anion-conducting polymer. Examples of metal oxide catalyst particles for anode catalyst layer 1205 include iridium oxide, nickel oxide, nickel iron oxide, iridium ruthenium oxide, platinum oxide, and the like. Anion-conducting PEM 1207 may comprise any of various anion-conducting polymers such as, for example, HNN5/HNN8 by Ionomr, FumaSep® by Fumatech, TM1 by Orion, PAP-TP by W7energy, Sustainion by Dioxide Materials, and the like. These and other anion-conducting polymer that have an ion exchange capacity (IEC) ranging from 1.1 to 2.6, working pH ranges from 0-14, bearable solubility in some organic solvents, reasonable thermal stability and mechanical stability, good ionic conductivity/ASR and acceptable water uptake/swelling ratio may be used. The polymers may be chemically exchanged to certain anions instead of halogen anions prior to use.

As illustrated in FIG. 12, $CO_2$ such as $CO_2$ gas may be provided to cathode catalyst layer 1203. In certain embodiments, the $CO_2$ may be provided via a gas diffusion electrode. At the cathode catalyst layer 1203, the $CO_2$ reacts to produce reduction product indicated generically as $C_xO_yH_z$. Anions produced at the cathode catalyst layer 1203 may include hydroxide, carbonate, and/or bicarbonate. These may diffuse, migrate, or otherwise move to the anode catalyst layer 405. At the anode catalyst layer 1205, an oxidation reaction may occur such as oxidation of water to produce diatomic oxygen and hydrogen ions. In some applications, the hydrogen ions may react with hydroxide, carbonate, and/or bicarbonate to produce water, carbonic acid, and/or $CO_2$. Fewer interfaces give lower resistance. In some embodiments, a highly basic environment is maintained for C2 and C3 hydrocarbon synthesis.

Figure 13:
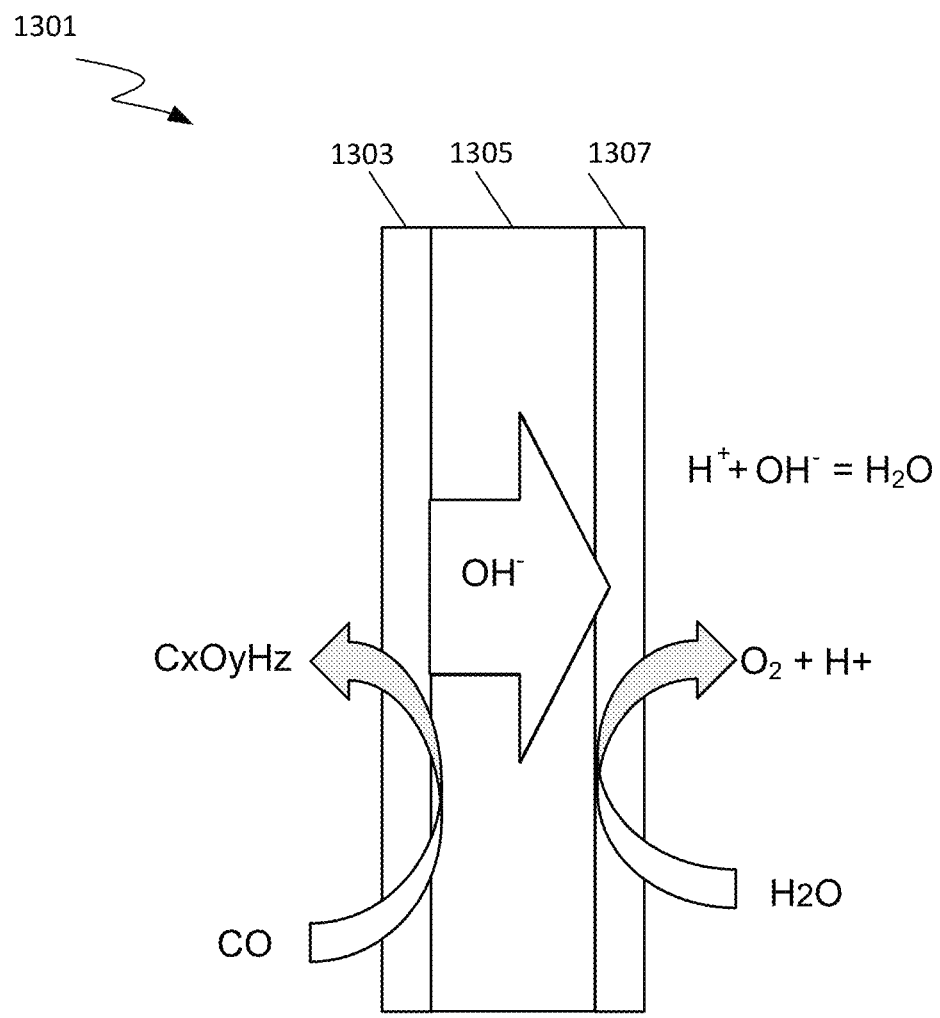
FIG. 13 is an illustration of an MEA having a cathode catalyst layer, an anode catalyst layer, and an anion-conducting PEM configured to promote a CO reduction reaction.

FIG. 13 illustrates an example construction of a CO reduction MEA 1301 having a cathode catalyst layer 1303, an anode catalyst layer 1305, and an anion-conducting PEM 1307. Overall, the constructions of MEA 1301 may be similar to that of MEA 1201 in FIG. 12. However, the cathode catalyst may be chosen to promote a CO reduction reaction, which means that different reduction catalysts would be used in CO and $CO_2$ reduction embodiments.

In some embodiments, an AEM-only MEA may be advantageous for CO reduction. The water uptake number of the AEM material can be selected to help regulate moisture at the catalyst interface, thereby improving CO availability to the catalyst. AEM-only membranes can be favorable for CO reduction due to this reason. Bipolar membranes can be more favorable for $CO_2$ reduction due to better resistance to $CO_2$ dissolving and crossover in basic anolyte media.

In various embodiments, cathode catalyst layer 1303 includes metal catalyst particles (e.g., nanoparticles) that are unsupported or supported on a conductive substrate such as carbon particles. In some implementations, cathode catalyst layer 1303 additionally includes an anion-conducting polymer. In certain embodiments, anode catalyst layer 1305 includes metal oxide catalyst particles (e.g., nanoparticles) that are unsupported or supported on a conductive substrate such as carbon particles. In some implementations, anode catalyst layer 1303 additionally includes an anion-conducting polymer. Examples of metal oxide catalyst particles for anode catalyst layer 1305 may include those identified for the anode catalyst layer 1205 of FIG. 12. Anion-conducting PEM 1307 may comprise any of various anion-conducting polymer such as, for example, those identified for the PEM 1207 of FIG. 12.

As illustrated in FIG. 13, CO gas may be provided to cathode catalyst layer 1303. In certain embodiments, the CO may be provided via a gas diffusion electrode. At the cathode catalyst layer 1303, the CO reacts to produce reduction product indicated generically as $C_xO_yH_z$.

Anions produced at the cathode catalyst layer 1303 may include hydroxide ions. These may diffuse, migrate, or otherwise move to the anode catalyst layer 1305. At the anode catalyst layer 1305, an oxidation reaction may occur such as oxidation of water to produce diatomic oxygen and hydrogen ions. In some applications, the hydrogen ions may react with hydroxide ions to produce water.

While the general configuration of the MEA 1301 is similar to that of MEA 1201, there are certain differences in the MEAs. First, MEAs may be wetter for CO reduction, helping the catalyst surface to have more —H. Also, for $CO_2$ reduction, a significant amount of $CO_2$ may be dissolved and then transferred to the anode for an AEM-only MEA such as shown in FIG. 4. For CO reduction, there is less likely to be significant CO gas crossover. In this case, the reaction environment could be very basic. MEA materials, including the catalyst, may be selected to have good stability in high pH environment. In some embodiments, a thinner membrane may be used for CO reduction than for $CO_2$ reduction.

In certain embodiments, an AEM-only MEA may be provided with a liquid buffer between the AEM and the cathode. An example is illustrated at 103 of FIG. 1A. In such embodiments, the anode and AEM may be used as described for AEM-only MEAs without a liquid buffer. A thin liquid layer is provided between the AEM and the cathode catalyst layer supported on a porous carbon gas diffusion layer. The liquid layer may be an aqueous salt solution, e.g., mM-M solutions of NaOH, KOH, $NaHCO_3$, or $KHCO_3$ aqueous solutions. Concentration ranges as described for providing salts to the MEA (e.g., as part of the anode water) may be employed for the liquid buffer.

Example of AEM-Only MEA

1. Copper metal (USRN 40 nm thick Cu, ~0.05 mg/cm$^2$) was deposited onto a porous carbon sheet (Sigracet 39BC gas diffusion layer) via electron beam deposition. Ir metal nanoparticles were deposited onto a porous titanium sheet at a loading of 3 mg/cm$^2$ via drop casting. An anion-exchange membrane from Ionomr (25-50 μm, 80 mS/cm$^2$ OH— conductivity, 2-3 mS/cm$^2$ HCO$_3^-$ conductivity, 33-37% water uptake) was sandwiched between the porous carbon and titanium sheets with the electrocatalyst layers facing the membrane.

2. Sigma Aldrich 80 nm spherical Cu nanoparticles, mixed with FAA-3 anion exchange solid polymer electrolyte from Fumatech, FAA-3 to catalyst mass ratio of 0.10, setup as described above.

US Patent Application Publication No. US 2017/0321334, published Nov. 9, 2017 and US Patent Application Publication No. 20190226103, published Jul. 25, 2019, which describe various features and examples of MEAS, are incorporated herein by reference in their entireties. All publications referred to herein are incorporated by reference in their entireties as if fully set forth herein.

Cathode Catalyst Layer—General Structure

As indicated above, the cathode of the MEA, which is also referred to as the cathode layer or cathode catalyst layer, facilitates CO$_x$ conversion. It is a porous layer containing catalysts for CO$_x$ reduction reactions.

In some embodiments, the cathode catalyst layer contains a blend of reduction catalyst particles, electronically-conductive support particles that provide support for the reduction catalyst particles, and a cathode ion-conducting polymer. In some embodiments, the reduction catalyst particles are blended with the cathode ion-conducting polymer without a support.

Examples of materials that can be used for the reduction catalyst particles include, but are not limited to transition metals such as V, Cr, Mn, Fe, Co, Ni, Cu, Zr, Nb, Mo, Au, Ru, Rh, Pd, Ag, Cd, Hf, Ta, W, Re, Ir, Pt, and Hg, and combinations thereof, and/or any other suitable materials. Other catalyst materials can include alkali metals, alkaline earth metals, lanthanides, actinides, and post transition metals, such as Sn, Si, Ga, Pb, Al, Tl, Sb, Te, Bi, Sm, Tb, Ce, Nd and In or combinations thereof, and/or any other suitable catalyst materials. The choice of catalyst depends on the particular reaction performed at the cathode of the CRR.

Catalysts can be in the form of nanoparticles that range in size from approximately 1 to 100 nm or particles that range in size from approximately 0.2 to 10 nm or particles in the size range of approximately 1-1000 nm or any other suitable range. In addition to nanoparticles and larger particles, films and nanostructured surfaces may be used.

If used, the electronically-conductive support particles in the cathode can be carbon particles in various forms. Other possible conductive support particles include boron-doped diamond or fluorine-doped tin oxide. In one arrangement, the conductive support particles are Vulcan carbon. The conductive support particles can be nanoparticles. The size range of the conductive support particles is between approximately 20 nm and 1000 nm or any other suitable range. It is especially useful if the conductive support particles are compatible with the chemicals that are present in the cathode when the CRR is operating, are reductively stable, and have a high hydrogen production overpotential so that they do not participate in any electrochemical reactions.

For composite catalysts such as Au/C, example metal nanoparticle sizes may range from about 2 nm-20 nm and the carbon size may be from about 20-200 nm as supporting materials. For pure metal catalyst such as Ag or Cu, the particles have a broad range from 2 nm to 500 nm in term of crystal grain size. The agglomeration could be even larger to micrometer range.

Figure 14:
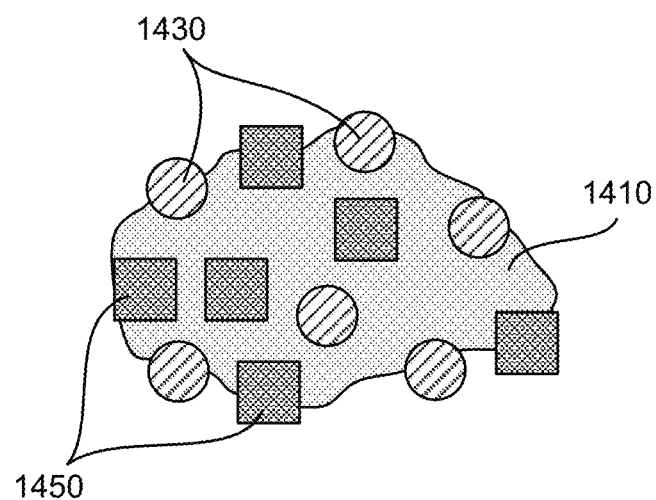
FIG. 14 is a schematic drawing showing an example morphology of cathode particles having catalysts supported on a catalyst support particle.

In general, such conductive support particles are larger than the reduction catalyst particles, and each conductive support particle can support many reduction catalyst particles. FIG. 14 is a schematic drawing that shows a possible morphology for two different kinds of catalysts supported on a catalyst support particle 1410, such as a carbon particle. Catalyst particles 1430 of a first type and second catalyst particles 1450 of a second type are attached to the catalyst support particle 1410. In various arrangements, there is only one type of catalyst particle or there are more than two types of catalyst particles attached to the catalyst support particle 1410.

Using two types of catalysts may be useful in certain embodiments. For example, one catalyst may be good at one reaction (e.g., CO$_2$→CO) and the second good at another reaction (e.g., CO→CH$_4$). Overall, the catalyst layer would perform the transformation of CO$_2$ to CH$_4$, but different steps in the reaction would take place on different catalysts. This may be accomplished by mixing two types of catalysts together in a single layer of the MEA (e.g., as in FIG. 14), by having two different catalyst layers in an MEA (e.g., two adjacent layers with different catalysts), by having two separate areas of the MEA (e.g., one where CO$_2$→CO happens, and one where CO→CH$_4$ happens), or by having two MEAs in a cell stack or separate cell stacks (e.g., one where CO$_2$→CO happens, and one where CO→CH$_4$ happens).

The electronically-conductive support may also be in forms other than particles, including tubes (e.g., carbon nanotubes) and sheets (e.g., graphene). Structures having high surface area to volume are useful to provide sites for catalyst particles to attach.

In addition to reduction catalyst particles and electronically-conductive support particles, the cathode catalyst layer may include an ion conducting polymer. There are tradeoffs in choosing the amount of cathode ion-conducting polymer in the cathode. It can be important to include enough cathode ion-conducting polymer to provide sufficient ionic conductivity. But it is also important for the cathode to be porous so that reactants and products can move through it easily and to maximize the amount of catalyst surface area that is available for reaction. In various arrangements, the cathode ion-conducting polymer makes up somewhere in the range between 30 and 70 wt %, between 20 and 80 wt %, or between 10 and 90 wt %, of the material in the cathode layer, or any other suitable range. The wt % of ion-conducting polymer in the cathode is selected to result in the cathode layer porosity and ion-conductivity that gives the highest current density for CO$_x$ reduction. In some embodiments, it may be between 20 and 60 wt. % or between 20 and 50 wt. %. Example thicknesses of the cathode catalyst layer range from about 80 nm-300 μm.

In addition to the reduction catalyst particles, cathode ion conducting polymer, and if present, the electronically-conductive support, the cathode catalyst layer may include other additives such as PTFE.

In addition to polymer:catalyst mass ratios, the catalyst layer may be characterized by mass loading (mg/cm$^2$), and porosity. Porosity may be determined by various manners. In one method, the loading of each component (e.g., catalyst, support, and polymer) is multiplied by its respective density. These are added together to determine the thickness the components take up in the material. This is then divided by the total known thickness to obtain the percentage of the layer that is filled in by the material. The resulting percentage is then subtracted from 1 to obtain the percentage of the layer assumed to be filled with air, which is the porosity. Methods such as mercury porosimetry or image processing on TEM images may be used as well.

Examples of cathode catalyst layers for CO, methane, and ethylene/ethanol productions are given below.

CO production: Au nanoparticles 4 nm in diameter supported on Vulcan XC72R carbon and mixed with TM1 anion exchange polymer electrolyte from Orion. Layer is about 15 μm thick, Au/(Au+C)=30%, TM1 to catalyst mass ratio of 0.32, mass loading of 1.4-1.6 mg/cm$^2$, estimated porosity of 0.47

Methane production: Cu nanoparticles of 20-30 nm size supported on Vulcan XC72R carbon, mixed with FAA-3 anion exchange solid polymer electrolyte from Fumatech. FAA-3 to catalyst mass ratio of 0.18. Estimated Cu nanoparticle loading of ~7.1 μg/cm$^2$, within a wider range of 1-100 μg/cm$^2$ Ethylene/ethanol production: Cu nanoparticles of 25-80 nm size, mixed with FAA-3 anion exchange solid polymer electrolyte from Fumatech. FAA-3 to catalyst mass ratio of 0.10. Deposited either on Sigracet 39BC GDE for pure AEM or on MEA electrode assembly. Estimated Cu nanoparticle loading of 270 μg/cm$^2$.

In some embodiments, multiple cathode catalyst layers may be used for different products in the same MEA or in different MEAs of the same stack. For example, a catalyst layer for CO production and a catalyst layer for methane production layer as described above may form a bilayer. In another example, a single catalyst layer may have one area dedicated to CO production and another area dedicated to methane production, with the appropriate catalyst layer in each area. In another example, two separate MEAs, one dedicated to CO production and another to methane production, may form part of the same cell stack or separate cell stacks that are connected in series. In some embodiments, the product of one layer/area/MEA (e.g., CO) may be an input to another layer/area/MEA.

The functions, materials, and structures of the components of the cathode catalyst layer are described further below.

Water Management (Cathode Catalyst Layer)

The cathode catalyst layer may facilitate movement of water to prevent it from being trapped in the cathode catalyst layer. Trapped water can hinder access of CO$_x$ to the catalyst and/or hinder movement of reaction product out of the cathode catalyst layer.

Water management challenges are in many respects unique to CRRs. For example, compared to a PEM fuel cell's oxygen electrode, a CRR uses a much lower gas flow rate. Vapor phase water removal is determined by the volumetric gas flow, thus much less vapor phase water removal is carried out in a CRR. A CRR may also operate at higher pressure (e.g., 100 psi-450 psi) than a fuel cell; at higher pressure the same molar flow results in lower volumetric flow and lower vapor phase water removal. As a result, liquid water in MEA of a CRR is present to be removed. For some MEAs, the ability to remove vapor phase water is further limited by temperature limits not present in fuel cells. For example, $CO_2$ to CO reduction may be performed at about 50° C. and ethylene and methane production may be performed at 20° C.-25° C. This is compared to typical operating temperatures of 80° C. to 120° C. for fuel cells. As a result, there is more liquid phase water to remove.

Properties that affect ability of the cathode catalyst layer to remove water include porosity; pore size; distribution of pore sizes; hydrophobicity; the relative amounts of ion conducting polymer, metal catalyst particles, and electronically-conductive support; the thickness of the layer; the distribution of the catalyst throughout the layer; and the distribution of the ion conducting polymer through the layer and around the catalyst.

A porous layer allows an egress path for water. In some embodiments, the cathode catalyst layer has a pore size distribution that includes pores having sizes of 1 nm-100 nm and pores having sizes of at least 1 micron. This size distribution can aid in water removal. The porous structures could be formed by one or more of: pores within the carbon supporting materials; stacking pores between stacked spherical carbon nanoparticles; secondary stacking pores between agglomerated carbon spheres (micrometer scale); or inert filler (e.g., PTFE) introduced porous with the interface between the PTFE and carbon also creating irregular pores ranging from hundreds of nm to micrometers.

The cathode catalyst layer may have a thickness that contributes to water management. Using a thicker layer allows the catalyst and thus the reaction to be distributed in a larger volume. This spreads out the water distribution and makes it easier to manage.

Ion-conducting polymers having non-polar, hydrophobic backbones may be used in the cathode catalyst layer. In some embodiments, the cathode catalyst layer may include a hydrophobic polymer such as PTFE in addition to the ion-conducting polymer. In some embodiments, the ion-conducting polymer may be a component of a co-polymer that also includes a hydrophobic polymer.

Gas Transport (Cathode Catalyst Layer)

The cathode catalyst layer may be structured for gas transport. Specifically, CO$_x$ is transported to the catalyst and gas phase reaction products (e.g., CO, ethylene, methane, etc.) is transported out of the catalyst layer.

Certain challenges associated with gas transport are unique to CRRs. Gas is transported both in and out of the cathode catalyst layer—CO$_x$ in and products such as CO, ethylene, and methane out. In a PEM fuel cell, gas ($O_2$ or $H_2$) is transported in but nothing or product water comes out. And in a PEM water electrolyzer, water is the reactant with $O_2$ and $H_2$ gas products.

Operating conditions including pressures, temperature, and flow rate through the reactor affect the gas transport. Properties of the cathode catalyst layer that affect gas transport include porosity; pore size and distribution; layer thickness; and ionomer distribution.

In some embodiments, the ionomer-catalyst contact is minimized. For example, in embodiments that use a carbon support, the ionomer may form a continuous network along the surface of the carbon with minimal contact with the catalyst. The ionomer, support, and catalyst may be designed such that the ionomer has a higher affinity for the support surface than the catalyst surface. This can facilitate gas transport to and from the catalyst without being blocked by the ionomer, while allowing the ionomer to conduct ions to and from the catalyst.

Ionomer (Cathode Catalyst Layer)

The ionomer may have several functions including holding particles of the catalyst layer together and allowing movement of ions through the cathode catalyst layer. In some cases, the interaction of the ionomer and the catalyst surface may create an environment favorable for CO$_x$ reduction, increasing selectivity to a desired product and/or decreasing the voltage required for the reaction. Importantly, the ionomer is an ion-conducting polymer to allow for the movement of ions through the cathode catalyst layer. Hydroxide, bicarbonate, and carbonate ions, for example, are moved away from the catalyst surface where the $CO_x$ reduction occurs. In the description below, the ionomer in the cathode catalyst layer can be referred to as a first ion-conducting polymer.

The first ion-conducting polymer can comprise at least one ion-conducting polymer that is an anion-conductor. This can be advantageous because it raises the pH compared to a proton conductor.

In some embodiments, the first ion-conducting polymer can comprise one or more covalently-bound, positively-charged functional groups configured to transport mobile negatively-charged ions. The first ion-conducting polymer can be selected from the group consisting of aminated tetramethyl polyphenylene; poly(ethylene-co-tetrafluoroethylene)-based quaternary ammonium polymer; quaternized polysulfone), blends thereof, and/or any other suitable ion-conducting polymers. The first ion-conducting polymer can be configured to solubilize salts of bicarbonate or hydroxide.

In some embodiments, the first ion-conducting polymer can comprise at least one ion-conducting polymer that is a cation-and-anion-conductor. The first ion-conducting polymer can be selected from the group consisting of polyethers that can transport cations and anions and polyesters that can transport cations and anions. The first ion-conducting polymer can be selected from the group consisting of polyethylene oxide, polyethylene glycol, polyvinylidene fluoride, and polyurethane.

A cation-and-anion conductor will raise pH (compared to a pure cation conductor.) Further, in some embodiments, it may be advantageous to use a cation-and-anion conductor to promote acid base recombination in a larger volume instead of at a 2D interface of anion-conducting polymer and cation conducting polymer. This can spread out water and $CO_2$ formation, heat generation, and potentially lower the resistance of the membrane by decreasing the barrier to the acid-base reaction. All of these may be advantageous in helping avoid the buildup of products, heat, and lowering resistive losses in the MEA leading to a lower cell voltage.

A typical anion-conducting polymer has a polymer backbone with covalently bound positively charged functional groups appended. These may include positively charged nitrogen groups in some embodiments. In some embodiments, the polymer backbone is non-polar, as described above. The polymer may be any appropriate molecular weight, e.g., 25,000 g/mol-150,000 g/mol, though it will be understood that polymers outside this range may be used.

Particular challenges for ion-conducting polymers in CRR's include that $CO_2$ can dissolve or solubilize polymer electrolytes, making them less mechanically stable, prone to swelling, and allowing the polymer to move more freely. This makes the entire catalyst layer and polymer-electrolyte membrane less mechanically stable. In some embodiments, polymers that are not as susceptible to $CO_2$ plasticization are used. Also, unlike for water electrolyzers and fuel cells, conducting carbonate and bicarbonate ions is a key parameter for $CO_2$ reduction.

The introduction of polar functional groups, such as hydroxyl and carboxyl groups which can form hydrogen bonds, leads to pseudo-crosslinked network formation. Cross-linkers like ethylene glycol and aluminum acetylacetonate can be added to reinforce the anion exchange polymer layer and suppress polymer $CO_2$ plasticization. Additives like polydimethylsiloxane copolymer can also help mitigate $CO_2$ plasticization.

According to various embodiments, the ion-conducting polymer may have a bicarbonate ionic conductivity of at least 12 mS/cm, is chemically and mechanically stable at temperatures 80° C. and lower, and soluble in organic solvents used during fabrication such as methanol, ethanol, and isoproponal. The ion-conducting polymer is stable (chemically and has stable solubility) in the presence of the $CO_x$ reduction products. The ion-conducting polymer may also be characterized by its ion exchange capacity, the total of active sites or functional groups responsible for ion exchange, which may range from 2.1 mmol/g-2.6 mmol/g in some embodiments.

Examples of anion-conducting polymers are given above in above table as Class A ion-conducting polymers. A particular example of an anion-conducting polymer is Orion mTPN1, which has m-triphenyl fluori-alkylene as backbone and trimethylamonium (TMA+) as cation group. The chemical structure is shown below.

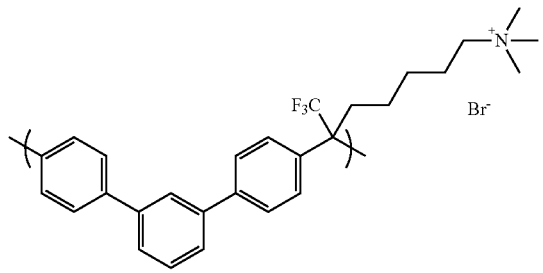

Additional examples include anion exchange membranes produced by Fumatech and Ionomr. Fumatech FAA-3 ionomers come in Br— form. Anion exchange polymer/membrane based on polybenzimidazole produced by Ionomr comes in I— form as AF-1-HNN8-50-X.

The as-received polymer may be prepared by exchanging the anion (e.g., I⁻, Br⁻, etc.) with bicarbonate.

Also, as indicated above, in certain embodiments the ionomer may be a cation-and-anion-conducting polymer. Examples are given in the above table as Class B ion-conducting polymers.

Metal Catalyst (Cathode Catalyst Layer)

The metal catalyst catalyzes the $CO_x$ reduction reaction(s). The metal catalyst is typically nanoparticles, but larger particles, films, and nanostructured surfaces may be used in some embodiments. The specific morphology of the nanoparticles may expose and stabilize active sites that have greater activity.

The metal catalyst is often composed of pure metals (e.g., Cu, Au, Ag), but specific alloys or other bimetallic systems may have high activity and be used for certain reactions. The choice of catalyst may be guided by the desired reaction. For example, for CO production, Au may be used; for methane and ethylene production, Cu may be used. Other metals including Ag, alloys, and bimetallic systems may be used. CuAu and CuAg alloys are suitable catalysts for $CO_2$ reduction to methane and/or ethylene. $CO_2$ reduction has a high overpotential compared to other well-known electrochemical reactions such as hydrogen evolution and oxygen evolution on known catalysts. Small amounts of contaminants can poison catalysts for $CO_2$ conversion. And as indicated above, metal catalysts such as Cu, Au, and Ag are less developed than catalysts such as platinum used in hydrogen fuel cells.

Metal catalyst properties that affect the cathode catalyst layer performance include size, size distribution, uniformity of coverage on the support particles, shape, loading (characterized as weight of metal/weight of metal+weight of carbon or as mass of particles per geometric area of catalyst layer), surface area (actual metal catalyst surface area per volume of catalyst layer), purity, and the presence of poisoning surface ligands from synthesis.

Nanoparticles may be synthesized by any appropriate method, such as for example, described in Phan et al., "Role of Capping Agent in Wet Synthesis of Nanoparticles," J. Phys. Chem. A 2018, 121, 17, 3213-3219; Bakshi "How Surfactants Control Crystal Growth of Nanomaterials," Cryst. Growth Des. 2016, 16, 2, 1104-1133; and Morsy "Role of Surfactants in Nanotechnology and Their Applications," Int. J. Curr. Microbiol. App. Sci. 2014, 3, 5, 237-260, which are incorporated by reference herein.

In some embodiments, metal nanoparticles are provided without the presence of poisoning surface ligands. This may be achieved by using the ionomer as a ligand to direct the synthesis of nanocrystal catalysts. The surface of the metal nanocatalysts are directly connected with ionically conductive ionomer. This avoids having to treat the catalyst surface to allow ionomer contact with the metal and improves the contact.

The metal catalyst may be disposed on a carbon support in some embodiments. For CO production, examples include Premetek 20 wt % Au supported on Vulcan XC-72R carbon with 4-6 nm Au particle size and 30% Au/C supported on Vulcan XC-72R with 5-7 nm Au particle size. For methane, examples include Premetek 20 wt % Cu supported on Vulcan XC-72R carbon with 20-30 nm Cu particle size. In some embodiments, the metal catalyst may be unsupported. For ethylene production, examples of unsupported metal catalysts include SigmaAldrich unsupported Cu 80 nm particle size and ebeam or sputter deposited thin Cu layer of 10 nm to 100 nm.

Support (Cathode Catalyst Layer)

The support of the cathode catalyst layer may have various functions. It may stabilize metal nanoparticles to prevent them from agglomerating and distributed the catalytic sites throughout the catalyst layer volume to spread out loss of reactants and formation of products. It may also form an electronically form an electrically conductive pathway to metal nanoparticles. Carbon particles, for example, pack together such that contacting carbon particles provide the electrically conductive pathway. Void space between the particles forms a porous network that gas and liquids can travel through.

In some embodiments, carbon supports developed for fuel cells can be used. Many different types have been developed; these are typically 50 nm-500 nm in size, and can be obtained in different shapes (spheres, nanotubes, sheets (e.g., graphene)), porosities, surface area per volume, electrical conductivity, functional groups (N-doped, O-doped, etc).

The support may be hydrophobic and have affinity to the metal nanoparticle.

Examples of carbon blacks that can be used include:
Vulcan XC-72R-Density of 256 mg/cm2, 30-50 nm
Ketjen Black-Hollow structure, Density of 100-120 mg/cm2, 30-50 nm
Printex Carbon, 20-30 nm Anode Catalyst Layer The anode of the MEA, which is also referred to as the anode layer or anode catalyst layer, facilitates oxidation reactions. It is a porous layer containing catalysts for oxidation reactions. Examples of reactions are:
$2H_2O \rightarrow 4H^+ + 4e^- + O_2$ (in acidic environment of proton exchange polymer electrolyte—bipolar membrane); or
$4OH^- \rightarrow 4e^- + O_2 + 2H_2O$ (in basic environment of anion exchange polymer electrolyte)

The oxidation of other materials, such as hydrocarbons to make $CO_2$ or chloride ions to make chlorine gas, may also be performed.

In some embodiments, with reference to FIG. 10, the anode 1040 contains a blend of oxidation catalyst and an anode ion-conducting polymer. There are a variety of oxidation reactions that can occur at the anode depending on the reactant that is fed to the anode and the anode catalyst(s). In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles selected from the group consisting of carbon, boron-doped diamond, and titanium.

The oxidation catalyst can be in the form of a structured mesh or can be in the form of particles. If the oxidation catalyst is in the form of particles, the particles can be supported by electronically-conductive support particles. The conductive support particles can be nanoparticles. It is especially useful if the conductive support particles are compatible with the chemicals that are present in the anode 1040 when the CRR is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In general, such conductive support particles are larger than the oxidation catalyst particles, and each conductive support particle can support many oxidation catalyst particles. An example of such an arrangement is shown in FIG. 11 and is discussed above with respect to the cathode catalyst layer. In one arrangement, the oxidation catalyst is iridium ruthenium oxide. Examples of other materials that can be used for the oxidation catalyst include, but are not limited to, those listed above. It should be understood that many of these metal catalysts can be in the form of oxides, especially under reaction conditions.

In some embodiments, the MEA has an anode layer comprising oxidation catalyst and a second ion-conducting polymer. The second ion-conducting polymer can comprise one or more polymers that contain covalently-bound, negatively-charged functional groups configured to transport mobile positively-charged ions. The second ion-conducting polymer can be selected from the group consisting of ethanesulfonyl fluoride, 2-[1-[difluoro-[(trifluoroethenyl) oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. Examples of cation-conducting polymers include e.g., Nafion® 115, Nafion® 117, and/or Nafion® 211.

There are tradeoffs in choosing the amount of ion-conducting polymer in the anode. It is important to include enough anode ion-conducting polymer to provide sufficient ionic conductivity. But it is also important for the anode to be porous so that reactants and products can move through it easily, and to maximize the amount of catalyst surface area that is available for reaction. In various arrangements, the ion-conducting polymer in the anode makes up approximately 50 wt % of the layer or between approximately 5 and 20 wt %, 10 and 90 wt %, between 20 and 80 wt %, between 25 and 70 wt %, or any suitable range. It is especially useful if the anode 240 can tolerate high voltages, such as voltages above about 1.2 V vs. a reversible hydrogen electrode. It is especially useful if the anode 240 is porous in order to maximize the amount of catalyst surface area available for reaction and to facilitate gas and liquid transport.

In one example of a metal catalyst, Ir or IrOx particles (100-200 nm) and Nafion® ionomer form a porous layer approximately 10 μm thick. Metal catalyst loading is approximately 0.5-3 g/cm$^2$.

In some embodiments, NiFeOx is used for basic reactions.
PEM

The MEAs include a polymer electrolyte membrane (PEM) disposed between and conductively coupled to the anode catalyst layer and the cathode catalyst layer. Referring to FIG. 10, the polymer electrolyte membrane 1065 has high ionic conductivity (greater than about 1 mS/cm), and is mechanically stable. Mechanical stability can be evidenced in a variety of ways such as through high tensile strength, modulus of elasticity, elongation to break, and tear resistance. Many commercially-available membranes can be used for the polymer electrolyte membrane 1065. Examples include, but are not limited to, various Nafion® formulations, GORE-SELECT®, FumaPEM® (PFSA) (FuMA-Tech GmbH), and Aquivion® (PFSA) (Solvay).

In one arrangement, the PEM comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2, 2, -tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof.

Cathode Buffer Layer

Referring to FIG. 10, it may be noted that when the polymer electrolyte membrane 1065 is a cation conductor and is conducting protons, it contains a high concentration of protons during operation of the CRR, while the cathode 1020 operates best when a low concentration of protons is present. It can be useful to include a cathode buffer layer 1025 between the polymer electrolyte membrane 1065 and the cathode 1020 to provide a region of transition from a high concentration of protons to a low concentration of protons. In one arrangement, the cathode buffer layer 1025 is an ion-conducting polymer with many of the same properties as the ion-conducting polymer in the cathode 1020. The cathode buffer layer 1025 provides a region for the proton concentration to transition from the polymer electrolyte membrane 1065, which has a high concentration of protons to the cathode 1020, which has a low proton concentration. Within the cathode buffer layer 1025, protons from the polymer electrolyte membrane 1065 encounter anions from the cathode 1020, and they neutralize one another. The cathode buffer layer 1025 helps ensure that a deleterious number of protons from the polymer electrolyte membrane 1065 does not reach the cathode 1020 and raise the proton concentration. If the proton concentration of the cathode 1020 is too high, $CO_x$ reduction does not occur. High proton concentration is considered to be in the range of approximately 10 to 0.1 molar and low concentration is considered to be less than approximately 0.01 molar.

The cathode buffer layer 1025 can include a single polymer or multiple polymers. If the cathode buffer layer 1025 includes multiple polymers, the multiple polymers can be mixed together or can be arranged in separate, adjacent layers. Examples of materials that can be used for the cathode buffer layer 1025 include, but are not limited to, FumaSep® FAA-3, Tokuyama anion exchange membrane material, and polyether-based polymers, such as polyethylene oxide (PEO), and blends thereof. Further examples are given above in the discussion of the cathode catalyst layer.

The thickness of the cathode buffer layer is chosen to be sufficient that $CO_x$ reduction activity is high due to the proton concentration being low. This sufficiency can be different for different cathode buffer layer materials. In general, the thickness of the cathode buffer layer is between approximately 200 nm and 100 μm, between 300 nm and 75 μm, between 500 nm and 50 μm, or any suitable range.

In some embodiments, the cathode buffer layer is less than 50 μm, for example between 1-25 μm such between 1-5 μm, 5-15 μm, or 10-25 μm. By using a cathode buffer layer in this range of thicknesses, the proton concentration in the cathode can be reduced while maintaining the overall conductivity of the cell. In some embodiments, an ultra-thin layer (100 nm-1 μm and in some embodiments, sub-micron) may be used. And as discussed above, in some embodiments, the MEA does not have a cathode buffer layer. In some such embodiments, anion-conducting polymer in the cathode catalyst layer is sufficient. The thickness of the cathode buffer layer may be characterized relative to that of the PEM.

Water and $CO_2$ formed at the interface of a cathode buffer layer and a PEM can delaminate the MEA where the polymer layers connect. The delamination problem can be addressed by employing a cathode buffer layer having inert filler particles and associated pores. One possible explanation of its effectiveness is that the pores create paths for the gaseous carbon dioxide to escape back to the cathode where it can be reduced.

Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. The particles may be generally spherical.

If PTFE (or other filler) volume is too high, it will dilute the polymer electrolyte to the point where ionic conductivity is low. Too much polymer electrolyte volume will dilute the PTFE to the point where it does not help with porosity. In many embodiments a mass ratio of polymer electrolyte/PTFE is 0.25 to 2, and more particularly, 0.5 to 1. A volume ratio polymer electrolyte/PTFE (or, more generally, polymer electrolyte/inert filler) may be 0.25 to 3, 0.5 to 2, 0.75 to 1.5, or 1.0 to 1.5.

In other arrangements, porosity is achieved by using particular processing methods when the layers are formed. One example of such a processing method is laser ablation, where nano to micro-sized channels are formed in the layers. Another example is mechanically puncturing a layer to form channels through it.

In one arrangement, the cathode buffer layer has a porosity between 0.01% and 95% (e.g., approximately between, by weight, by volume, by mass, etc.). However, in other arrangements, the cathode buffer layer can have any suitable porosity (e.g., between 0.01-95%, 0.1-95%, 0.01-75%, 1-95%, 1-90%). In some embodiments, the porosity is 50% or less, e.g., 0.1-50%, 5-50%, 20-50%, 5-40%, 10-40%, 20-40%, or 25%-40%. In some embodiments, the porosity is 20% or below, e.g. 0.1-20%, 1-10%, or 5-10%.

Porosity may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation.

Porosity in layers of the MEA, including the cathode buffer layer, is described further below.

Anode Buffer Layer

In some CRR reactions, bicarbonate is produced at the cathode 1020. It can be useful if there is a polymer that blocks bicarbonate transport somewhere between the cathode 1020 and the anode 1040, to prevent migration of bicarbonate away from the cathode. It can be that bicarbonate takes some $CO_2$ with it as it migrates, which decreases the amount of $CO_2$ available for reaction at the cathode. In one arrangement, the polymer electrolyte membrane 1065 includes a polymer that blocks bicarbonate transport. Examples of such polymers include, but are not limited to, Nafion® formulations, GORE-SELECT®, FumaPEM® (PFSA) (FuMA-Tech GmbH), and Aquivion® (PFSA) (Solvay). In another arrangement, there is an anode buffer layer 1045 between the polymer electrolyte membrane 1065 and the anode 1040, which blocks transport of bicarbonate. If the polymer electrolyte membrane is an anion-conductor, or does not block bicarbonate transport, then an additional anode buffer layer to prevent bicarbonate transport can be useful. Materials that can be used to block bicarbonate transport include, but are not limited to Nafion® formulations, GORE-SELECT®, FumaPEM® (PFSA) (FuMA-Tech GmbH), and Aquivion® (PFSA) (Solvay). Of course, including a bicarbonate blocking feature in the ion-exchange layer 1060 is not particularly desirable if there is no bicarbonate in the CRR.

In another embodiment of the invention, the anode buffer layer 1045 provides a region for proton concentration to transition between the polymer electrolyte membrane 1065 to the anode 1040. The concentration of protons in the polymer electrolyte membrane 1065 depends both on its composition and the ion it is conducting. For example, a Nafion® polymer electrolyte membrane 1065 conducting protons has a high proton concentration. A FumaSep® FAA-3 polymer electrolyte membrane 1065 conducting hydroxide has a low proton concentration. For example, if the desired proton concentration at the anode 1040 is more than 3 orders of magnitude different from the polymer electrolyte membrane 1065, then an anode buffer layer 1045 can be useful to effect the transition from the proton concentration of the polymer electrolyte membrane 1065 to the desired proton concentration of the anode. The anode buffer layer 1045 can include a single polymer or multiple polymers. If the anode buffer layer 1045 includes multiple polymers, the multiple polymers can be mixed together or can be arranged in separate, adjacent layers. Materials that can be useful in providing a region for the pH transition include, but are not limited to, Nafion®, FumaSep® FAA-3, Sustainion®, Tokuyama anion exchange polymer, and polyether-based polymers, such as polyethylene oxide (PEO), blends thereof, and/or any other suitable materials. High proton concentration is considered to be in the range of approximately 10 to 0.1 molar and low concentration is considered to be less than approximately 0.01 molar. Ion-conducting polymers can be placed in different classes based on the type(s) of ions they conduct. This has been discussed in more detail above. There are three classes of ion-conducting polymers described in Table 4 above. In one embodiment of the invention, at least one of the ion-conducting polymers in the cathode 1020, anode 1040, polymer electrolyte membrane 1065, cathode buffer layer 1025, and anode buffer layer 1045 is from a class that is different from at least one of the others.

Layer Porosity

It can be useful if some or all of the following layers are porous: the cathode 1020, the cathode buffer layer 1025, the anode 1040 and the anode buffer layer 1045. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. In other arrangements, porosity is achieved by using particular processing methods when the layers are formed. One example of such a processing method is laser ablation, where nano to micro-sized channels are formed in the layers. Laser ablation can additionally or alternatively achieve porosity in a layer by subsurface ablation. Subsurface ablation can form voids within a layer, upon focusing the beam at a point within the layer, and thereby vaporizing the layer material in the vicinity of the point. This process can be repeated to form voids throughout the layer, and thereby achieving porosity in the layer. The volume of a void is preferably determined by the laser power (e.g., higher laser power corresponds to a greater void volume), but can additionally or alternatively be determined by the focal size of the beam, or any other suitable laser parameter. Another example is mechanically puncturing a layer to form channels through the layer. The porosity can have any suitable distribution in the layer (e.g., uniform, an increasing porosity gradient through the layer, a random porosity gradient, a decreasing porosity gradient through the layer, a periodic porosity, etc.).

The porosities (e.g., of the cathode buffer layer, of the anode buffer layer, of the membrane layer, of the cathode layer, of the anode layer, of other suitable layers, etc.) of the examples described above and other examples and variations preferably have a uniform distribution, but can additionally or alternatively have any suitable distribution (e.g., a randomized distribution, an increasing gradient of pore size through or across the layer, a decreasing gradient of pore size through or across the layer, etc.). The porosity can be formed by any suitable mechanism, such as inert filler particles (e.g., diamond particles, boron-doped diamond particles, polyvinylidene difluoride/PVDF particles, polytetrafluoroethylene/PTFE particles, etc.) and any other suitable mechanism for forming substantially non-reactive regions within a polymer layer. The inert filler particles can have any suitable size, such as a minimum of about 10 nanometers and a maximum of about 200 nanometers, and/or any other suitable dimension or distribution of dimensions.

As discussed above, the cathode buffer layer preferably has a porosity between about 1 and 90 percent by volume, but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%, etc.). in some embodiments, the porosity is 20% or below, e.g. 0.1-20%, 1-10%, or 5-10%.

In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode.

MEA Fabrication

MEAs for $CO_x$ reduction may be fabricated using a variety of techniques. In various embodiments, MEAs fabrication employs multiple steps. Small differences in the parameters of the fabrication process can make a large difference in performance.

In certain embodiments, MEA fabrication employs a polymer-electrolyte membrane (e.g., a Nafion® PEM) layer and depositing or otherwise forming an anion-exchange polymer electrolyte layer and cathode catalyst layer on the cathode and depositing or otherwise forming an anode catalyst layer on the anode. An alternate route is to fabricate the catalyst layers on to porous gas diffusion layers (e.g., carbon for the cathode or titanium for the anode) and sandwich the membrane (which may include the anion-exchange layer) between catalyst containing porous layers. In certain embodiments, catalyst layers are fabricated by making an ink of the solid catalyst and support particles and polymer electrolyte dispersed in a solvent. The ink may be applied by a variety of methods to the polymer electrolyte membrane or GDL. The solvent subsequently evaporates leaving behind a porous solid catalyst layer.

Imaging methods may be used to characterize the thickness and uniformity. The thickness should be consistent and controllable, and the uniformity smooth and as defect free as possible.

Various techniques may be employed to form the individual layers of the MEA. Generally, these techniques form the layer on a substrate such as a PEM layer or GDL as mentioned herein. Examples of such techniques include ultrasonic spray deposition, doctor blade application, gravure, screen printing, and decal transfer Catalyst inks using anion-exchange polymers are not well studied (particularly for certain polymers) and do not have the same solution structure as typical Nafion®-based inks used in fuel cells and electrolyzers. The formulation and steps needed for form a well dispersed and stable catalyst ink were not known. It is believed that Nafion® forms micelle-like structures that allow relatively easy suspension in aqueous media. Other ion-conducting polymers and particularly some anion-conducting polymers do not form such structures and therefore are more difficult to provide in suspensions.

In certain embodiments, a catalyst layer ink is prepared by mixing metal or metal supported on carbon catalyst with ion-conducting polymer (e.g., an anion-conducting polymer) and dispersing in solvent (alcohol, etc.) by sonicating.

As indicated, certain fabrication techniques utilize doctor blade application, screen printing, decal transfer, electro-spinning, etc. Roll-to-roll techniques such as gravure or microgravure may be used for high throughput processing.

MEA Post Treatments

After the MEA is fabricated, additional treatments may be used to increase performance. Examples the types of performance improvement include lifetime and voltage. In some embodiments, a post treatment introduces salt or certain salt ions into an MEA. In some embodiments, a post treatment produces an MEA that has structural modifications resulting from the treatments including better adhesion between layers.

Hot pressing: heating the MEA under pressure to bond the layers together. Hot pressing will help 'melt' layers together to prevent delamination.
 Time: about 2 min to 10 min (MEA only); 1.5 min~2 min (MEA+gas distribution layer (GDL)); the "MEA+GDL" may be pressed at least twice to form a stable assembly
 Temperature: about 100° C. to 150° C.;
 Pressure: between about 300 psi and 600 psi (for 3×3 inch ½ MEAs), but the MEA can tolerate about 2500 psi without GDL;

Hydration: soaking the MEA in water or aqueous solutions to wet the polymer-electrolytes prior to cell assembly. In some embodiments, the aqueous solution is a salt solution as described herein.

Boil Nafion® or other polymer electrolyte MEA. This permanently changes the macrostructure of the polymer electrolyte and increases the amount of water in the polymer matrix. This increases ionic conductivity, but also increases water transport number.

Heat to dry. This can decrease water content and can reduce the amount of water transported through the polymer electrolyte during operation.

Stabilized Interface Between MEA Layers

Water and $CO_2$ formed at the interface of an anion-conducting layer (e.g., a cathode buffer layer) and a cation-conducting membrane (e.g., a PEM) can cause the two layers to separate or delaminate where the polymer layers connect. The reaction at the bipolar interface is depicted in FIGS. 3 and 7.

In addition, it is desirable for the $CO_2$ to return to the cathode of the cell where it can be reduced instead of lost to the anode, so a pathway (e.g., pores) in an anion-exchange layer (e.g., a cathode buffer layer and/or cathode layer) provides both a way to remove water and $CO_2$ from the interface to prevent delamination and return $CO_2$ to the cathode where it can react.

Figure 15:
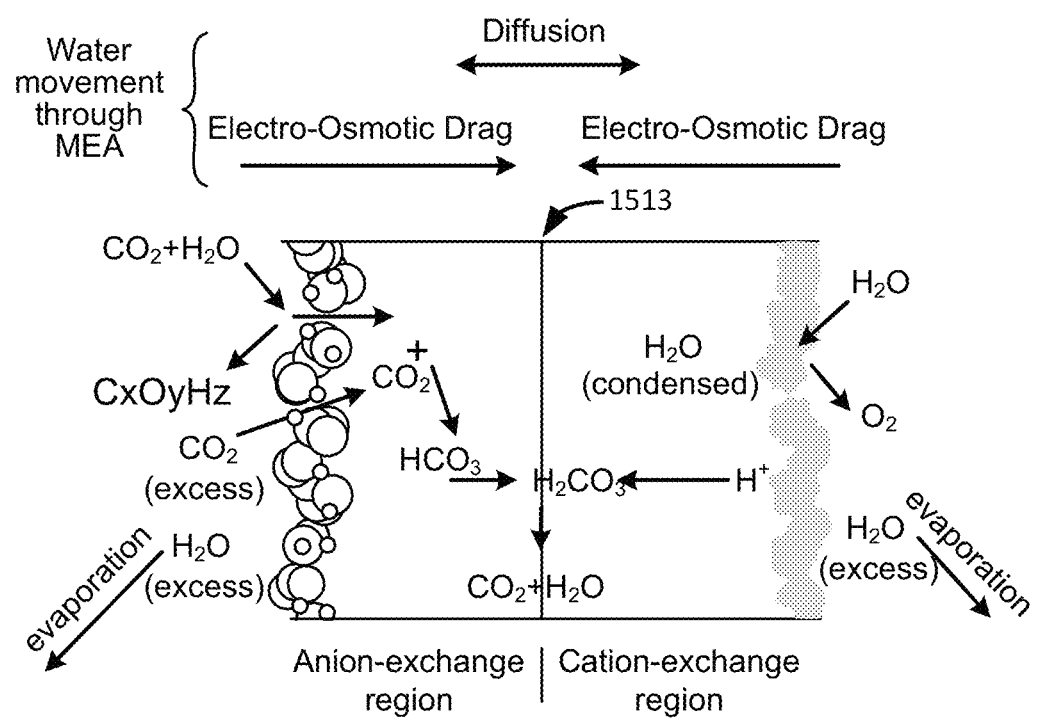
FIG. 15 is an illustration of an MEA similar to that shown FIG. 11, but additionally shows information relevant to mass transport and generation of CO$_2$ and water at a bipolar interface.

The structure depicted in FIG. 15 is similar to that depicted in FIG. 11, but FIG. 15 includes additional information relevant to mass transport and generation of $CO_2$ and water at a bipolar interface. For example, it shows hydroxide and $CO_2$ reacting on the cathode side to produce bicarbonate ions, which move toward the bipolar interface 1513. On the anode side, hydrogen ions produced by water oxidation move toward bipolar interface 1513, where they react with the bicarbonate ions to produce water and $CO_2$, both of which should be allowed to escape without damaging the bipolar layers.

Also depicted in FIG. 15 are water transport paths including (a) electroosmotic drag with anions from the cathode to interface 1513, (b) electroosmotic drag with cations from the anode to interface 1513, and (c) diffusion. Water evaporates at the anode and cathode.

Various MEA designs contain features that resist delamination and optionally provide a pathway for the reaction products to leave the interface area. In some embodiments, the bipolar interface is flat. But in some designs, the interface is provided with a composition gradient and/or interlocking structures. These are described further below with reference to FIGS. 16A, 16B, 16C, and 16D, which illustrate bipolar interfaces of MEA designs configured to resist delamination.

In some embodiments, the interface includes a gradient. A gradient may be formed, for example, by using two nozzles during spray deposition and adding anion-exchange polymer with the relative amounts of the polymers varied during deposition of the cation-exchange layer. Similarly, cation-exchange polymer may be added during deposition of the anion-exchange layer. Referring for example to FIG. 15, a gradient may extend through substantially all or a portion of the anion-exchange region and cation-exchange region, such that the anion-exchange region has predominantly anion-exchange polymer adjacent to the cathode with the relative amount of cation-exchange polymer increasing moving from the cathode toward the interface 1513. Similarly, the cathode-exchange region has a predominantly cation-exchange polymer adjacent the anode cathode with the relative amount of anion-exchange polymer increasing moving from the anode toward the interface 1513. In some embodiments, there are a pure anion-exchange and pure cation-exchange regions with a gradient between the two.

In some embodiments, the layers of the bipolar membrane are melted together. This may be accomplished by choosing an appropriate solvent. For example, Nafion® is at least slightly soluble in a water/ethanol mixture. By using that mixture (or another solvent in which the cation-conducting polymer is soluble) as a solvent for the anion-conducting polymer can result in Nafion® or other cation-conducting polymer at least slightly dissolvent and melting into the interface. In some embodiments, this results in a thin gradient, e.g., one that extends 0.5-10% into the anion-conducting polymer layer thickness.

Figure 16A:
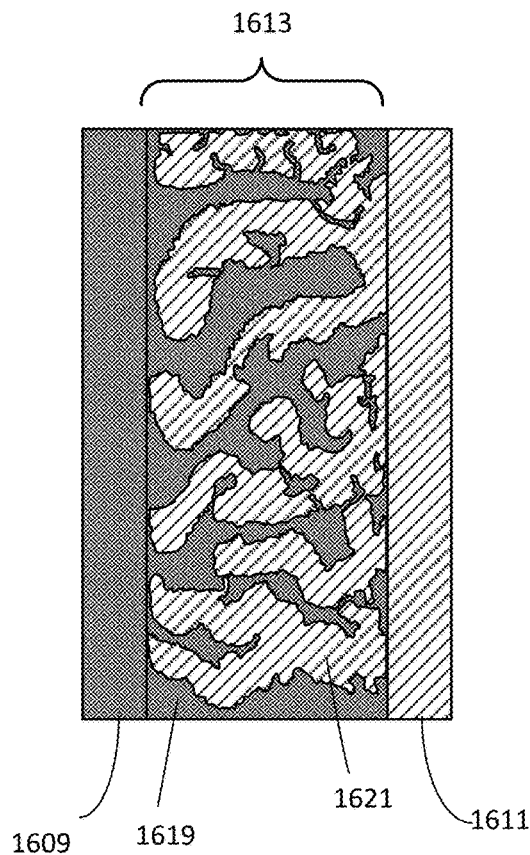
FIGS. 16A-16D present various MEA designs that contain features that resist delamination and optionally provide a pathway for the reaction products to leave the interface area.

In some embodiments, the interface includes a mixture of the polymers. FIG. 16A illustrates a bipolar interface 1613 in which a cation-conducting polymer 1621 and an anion-conducting polymer 1619 are mixed. In the example of FIG. 16A, a portion of an anion-conducting polymer layer 1609 and a portion of a cation-conducting polymer layer 1611 are shown. The anion-conducting polymer layer 1609 may be a pure anion-conducting polymer and the cation-conducting polymer layer 1611 may be pure cation exchange polymer. The cation-conducting polymer 1621 may be the same or different cation-conducting polymer as in the cation-conducting polymer layer 1611. The anion-conducting polymer 1619 may be the same or different anion-conducting polymer as in the anion-conducting polymer layer 1609.

Figure 16B:
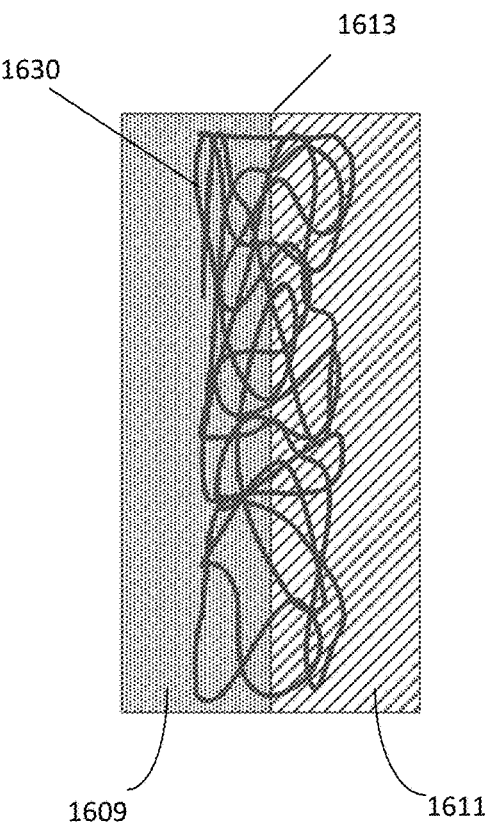

In some embodiments, the interface includes a third material that physically reinforces the interface. For example, FIG. 16B shows an example of a material 1630 that straddles interface 1613. That is, the material 1630 partially resides in an anion-conducting polymer layer 1609 and a cation-conducting polymer layer 1611. Because of this, material 1630 may bind the two layers in a manner that resists delamination. In one example, the material 1630 is a porous inert material, such as porous PTFE. Such an interface may be fabricated, for example, by casting or otherwise applying the cation-conducting polymer and the anion-conducting polymer on opposite sides of a PTFE or similar porous film, followed by hot pressing.

Figure 16C:
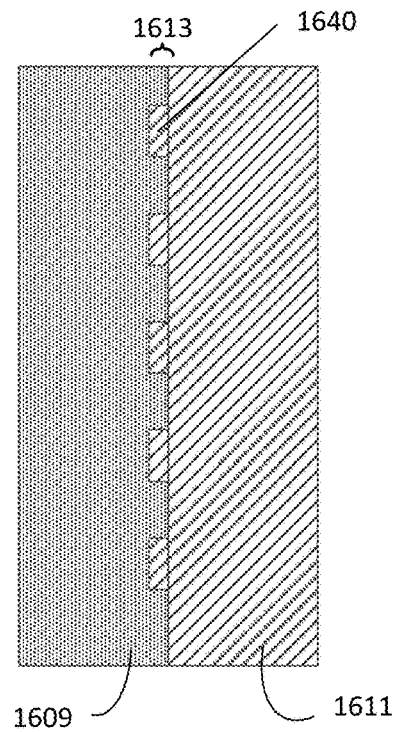

FIG. 16C illustrates a bipolar interface 1613 having protrusions 1640 of the cation-conducting polymer extending from the cation-conducting polymer layer 1611 into the anion-conducting polymer layer 1609. These protrusions may mechanically strengthen interface 1613 so that it does not delaminate when $CO_2$ and water are produced at the interface. In some embodiments, protrusions extend from anion-conducting polymer layer 1609 into cation-conducting polymer layer 1611. In certain embodiments, protrusions extend both directions. Example dimensions are 10 μm-1 mm in the in-plane dimension, though smaller dimensions (e.g., 500 nm-1 μm) are possible. The out-of-plane dimension may be for example, 10-75% or 10-50% of the total thickness of the polymer layer into which it extends. The protrusions may be fabricated for example by any appropriate technique such as lithographic techniques or by spraying the polymer into a patterned mesh that is then removed. Surface roughening techniques may also be used to create protrusions. In some embodiments, protrusions may be formed from a different material, e.g., metal to help interlock the polymer layers and mechanically strengthen the interface.

Figure 16D:
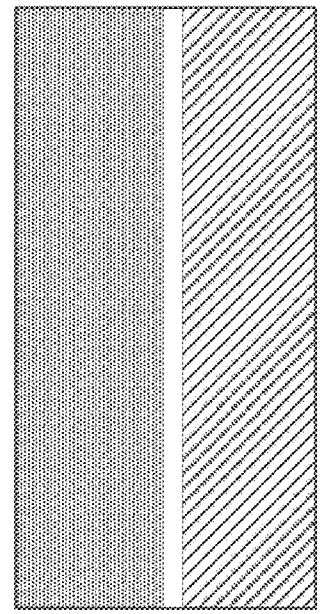

FIG. 16D illustrates a bipolar interface 1613 having a third material 1650 disposed between or mixed one or more of the cation-conducting polymer layer 1611 into the anion-conducting polymer layer 1609. In some embodiments, for example, the third material 1650 can be an additive as discussed further below. In some embodiments, the third material 1650 can be a blend of anion-conducting and cation-conducting ionomers at the interface. For example, it can be a mixture of Nafion® 5 wt % ionomer and Orion 2 wt % mTPN1. In some embodiments, the third material may include ion acceptors and donors, either mixed together or provided as distinct layers.

In some embodiments, the interface includes additives to facilitate acid-base reactions and prevent delamination. In some embodiments, the additives may facilitate spreading out the acid base recombination a larger volume instead of just at a 2D interface of the anion conducting polymer and cation conducting polymer. This spreads out water and $CO_2$ formation, heat generation, and may lower the resistance of the membrane by decreasing the barrier to the acid-base reaction. These effects can be advantageous in helping avoid build-up of products, heat, and lowering resistive losses in the MEA leading to a lower cell voltage. Further, it helps avoid degrading materials at the interface due to heat and gas production.

Examples of additives that facilitate acid-base reactions include molecules that are both proton and anion acceptors, such as hydroxide containing ionic liquids with 1-butyl-3-methylimidazolium hydroxide being a specific example. Other ionic liquids may also be used. In some embodiments, an ionomer different from that of the anion-conductive polymer layer and the cation-conductive polymer layer may be used. For example, a relatively high conductivity anion-exchange material such as Sustainion may be used. Such anion-exchange material may not be selective enough to use as a cathode buffer layer, but can be used at the interface.

Additional examples of materials that may be present at the interface include block copolymers having different charged groups (e.g., both cation and anion stationary charge groups), cation-and-anion conducting polymers, resin material, ion donors such as oxides including graphene oxide, catalysts for acid/base recombination, catalysts that react $H_2$ and $O_2$ diffusing from the anode and cathode, water splitting catalysts, $CO_2$ absorbing material, and $H_2$ absorbing material.

In some embodiments, a cross-linker may be added to covalently cross-link the two polymers of the bipolar membrane. Examples of cross-linking groups include xylene, which may be provided on an ionomer. Other cross-linking groups may be used. A cross-linker may be provided, for example, on the cation-conductive polymer, with the anion-conductive polymer spray-deposited on top, followed by heating to induce the cross-linking reaction and introduce cross-linking across the interface.

In some embodiments, the anion-conducting polymer and the cation-conducting polymer of the bipolar membrane have the same backbone, with different stationary charge groups. As an example, Orion ionomers may be used with different stationary charge groups. The ionomers are more compatible and less apt to delaminate.

In the examples above, the interface 1613 may be a three-dimensional volume having thickness that is between 1% and 90% of the overall thickness of the bipolar membrane, or between 5% and 90%, or between 10% and 80%, or between 20% and 70%, or between 30% and 60% of the overall thickness of the bipolar membrane. In some embodiments, it less than half the overall thickness, including between 1% and 45%, 5% and 45%, 5% and 40%, or 5% and 30%.

Hot pressing may be used in fabricating any of the bipolar interface designs described above.

Relative Sizes of MEA Layers

In certain embodiments, a polymer electrolyte membrane and an adjoining cathode buffer layer or other anion-conducting polymer layer may have relative thickness that facilitate the fabrication and/or operating performance of an MEA.

Figure 17:
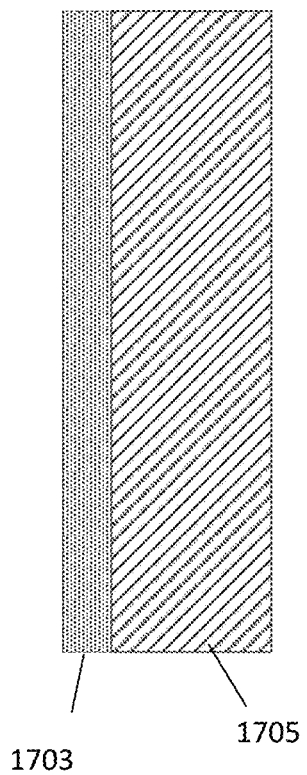
FIG. 17 is an illustration of a partial MEA that includes an anion-conducting polymer layer, which may be a cathode buffer layer, and a polymer electrolyte membrane, which may be cation-conducting polymer layer.

FIG. 17 depicts an example of a partial MEA that includes an anion-conducting polymer layer (AEM) 1703, which may be a cathode buffer layer, and a polymer electrolyte membrane (PEM) 1705, which may be cation-conducting polymer layer (e.g., a proton exchange polymer layer) or an anion-conducting polymer layer. In this example, the PEM 1705 is relatively thicker than the anion-conducting polymer layer 1703, which may be a cathode buffer layer, and a polymer electrolyte membrane (PEM) 1705, which may be cation-conducting polymer layer (e.g., a proton exchange polymer layer) or an anion-conducting polymer layer. In this example, the PEM 1705 is relatively thicker than the anion-conducting polymer layer 1703. For example, the PEM 1705 may be 120 micrometers compared with about 10-20 micrometers thick for the AEM 1703.

In some cases, anion-conducting polymers such as those used in anion-conducting polymer layer 1703 are substantially less conductive than cation-conducting polymers such as those used in PEM 1705. Therefore, to provide the benefits of a cathode buffer layer (e.g., anion-conducting polymer layer 1703) without substantially increasing the overall resistance of the MEA, a relatively thin cathode buffer is used. However, when a cathode buffer layer becomes too thin, it becomes difficult to handle during fabrication of the MEA and in other contexts. Therefore, in certain embodiments, a thin cathode buffer layer is fabricated on top of a relatively thicker PEM layer such as a cation-conducting polymer layer. The anion-conducting polymer layer may be fabricated on the PEM layer using, for example, any of the fabrication techniques described elsewhere herein.

In various embodiments, the polymer electrolyte membrane layer is between about 20 and 200 micrometers thick. In some embodiments, the polymer electrolyte membrane layer is between about 60 and 120 micrometers thick. In some embodiments, a thin polymer electrolyte membrane layer is used, being between about 20 and 60 micrometers thick. In some embodiments, a relatively thick polymer electrolyte layer is used, between about 120 and 200 micrometers thick.

In some embodiments, a thinner cathode buffer layer is used with a thinner polymer electrolyte membrane. This can facilitate movement of the $CO_2$ formed at the interface back to cathode, rather than to the anode. In some embodiments, a thicker cathode buffer layer is used with a thicker polymer electrolyte membrane. This can result in reducing cell voltage in some embodiments.

Factors that can influence the thickness of a cathode buffer layer include the ion selectivity of the anion-conducting polymer, the porosity of the anion-conducting polymer, the conformality of the anion-conducting polymer coating the polymer electrolyte membrane.

Many anion-conducting polymers are in the range of 95% selective for anions, with about 5% of the current being cations. Higher selectivity anion-conducting polymers, with greater than 99% selectivity for anions can allow for a reduction in a significant reduction in thickness while providing a sufficient buffer.

Mechanical strength of an anion-conducting layer can also influence its thickness, with stronger layers enabling thinner layers. Reducing porosity of an anion-conducting polymer may reduce the thickness of the anion-conducting layer.

In some implementations, a cathode buffer layer or other anion-conducting polymer layer that abuts the polymer electrolyte membrane is between about 10 and 20 micrometers thick. Using a >99% selective polymer can allow the cathode buffer layer to be reduced to between 2 and 10 microns in some embodiments.

In some cases, the ratio of thicknesses of the polymer electrolyte membrane and the adjoining anion-conducting polymer layer is between about 3:1-90:1 with the ratios at the higher end used with highly selective anion-conducting polymer layers. In some embodiments, the ratio is about 2:1-13:1, about 3:1-13.1, or about 7:1-13.1.

In certain embodiments, a relatively thinner PEM improves some aspects of the MEA's performance. Referring to FIG. 17, for example, polymer electrolyte membrane 1705 may have a thickness of about 50 micrometers, while the anion-conducting layer may have a thickness between about 10 and 20 micrometers. A thin PEM favors movement of water generated at the AEM/PEM interface to move toward the anode. The pressure of gas on the cathode side of the cell can be about 80-450 psi, which causes the water at the interface to move to the anode. However, in some instances, a thick PEM can cause the majority of water to move through the AEM to the cathode, which leads to flooding. By using a thin PEM, flooding can be avoided.

$CO_x$ Reduction Reactor (CRR)

Figure 18:
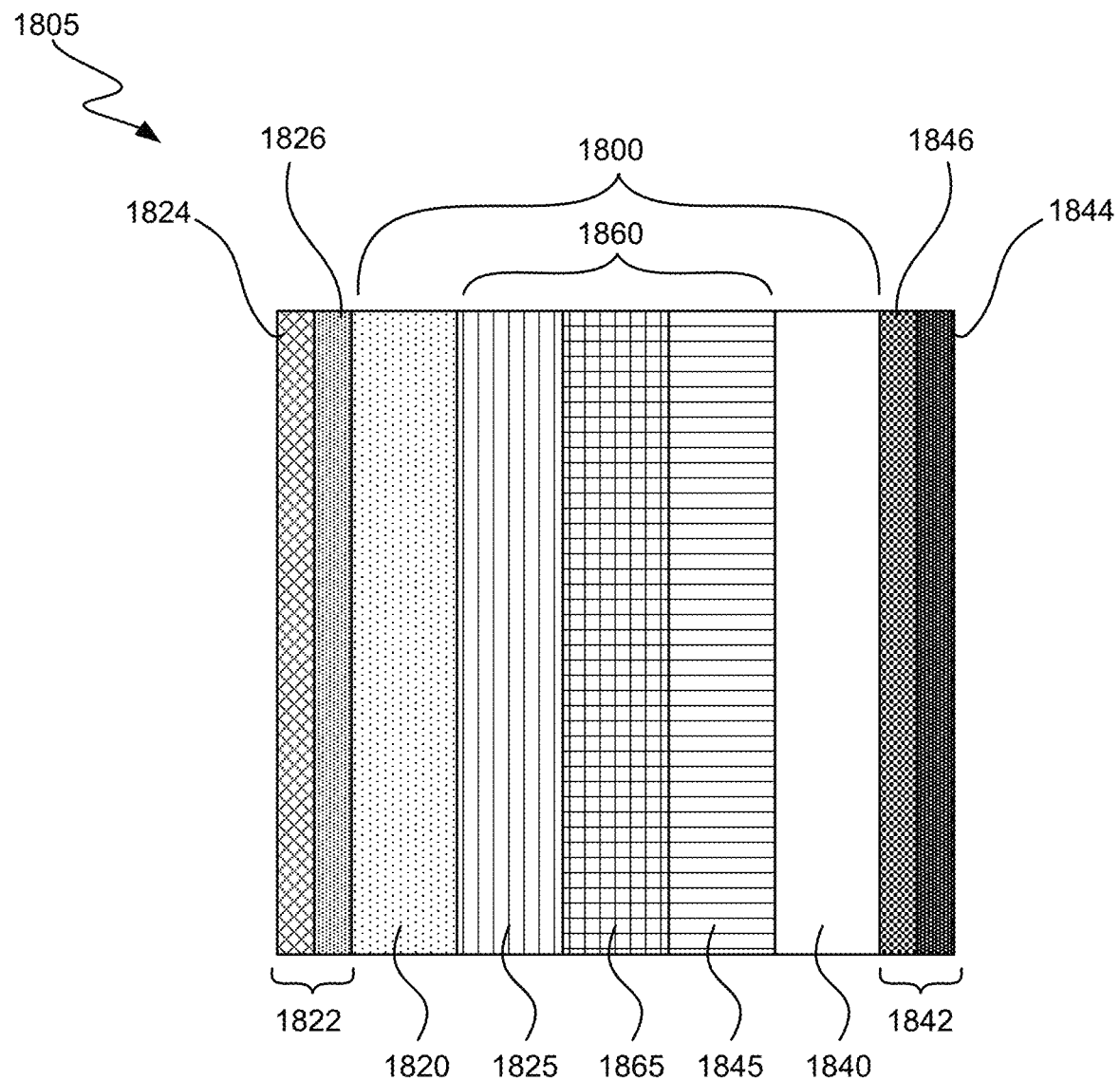
FIG. 18 is a schematic drawing that shows the major components of a CO$_x$ reduction reactor (CRR) according to various embodiments of the disclosure.

FIG. 18 is a schematic drawing that shows the major components of a $CO_x$ reduction reactor (CRR) 1805, according to an embodiment of the disclosure. The CRR 1805 has a membrane electrode assembly 1800 such as any of those described elsewhere herein. The membrane electrode assembly 1800 has a cathode 1820 and an anode 1840, separated by an ion-exchange layer 1860. The ion-exchange layer 1860 may include sublayers. The depicted embodiment has three sublayers: a cathode buffer layer 1825, a polymer electrolyte membrane 1865, and an optional anode buffer layer 1845. In addition, the CRR 1805 has a cathode support structure 1822 adjacent to the cathode 1820 and an anode support structure 1842 adjacent to the anode 1840.

The cathode support structure 1822 has a cathode polar plate 1824, made of, for example, graphite, to which a voltage can be applied. There can be flow field channels, such as serpentine channels, cut into the inside surfaces of the cathode polar plate 1824. There is also a cathode gas diffusion layer 1826 adjacent to the inside surface of the cathode polar plate 1824. In some arrangements, there is more than one cathode gas diffusion layer (not shown). The cathode gas diffusion layer 1826 facilitates the flow of gas into and out of the membrane electrode assembly 1800. An example of a cathode gas diffusion layer 1826 is a carbon paper that has a carbon microporous layer.

The anode support structure 1842 has an anode polar plate 1844, usually made of metal, to which a voltage can be applied. There can be flow field channels, such as serpentine channels, cut into the inside surfaces of the anode polar plate 1844. There is also an anode gas diffusion layer 1846 adjacent to the inside surface of the anode polar plate 1844. In some arrangements, there is more than one anode gas diffusion layer (not shown). The anode gas diffusion layer 1846 facilitates the flow of gas into and out of the membrane electrode assembly 1800. An example of an anode gas diffusion layer 1846 is a titanium mesh or titanium felt. In some arrangements, the gas diffusion layers 1826, 1846 are microporous.

There are also inlets and outlets (not shown) associated with the support structures 1822, 1842, which allow flow of reactants and products, respectively, to the membrane electrode assembly 1800. There are also various gaskets (not shown) that prevent leakage of reactants and products from the cell.

In one embodiment, a direct current (DC) voltage is applied to the membrane electrode assembly 1800 through the cathode polar plate 1824 and the anode polar plate 1842. Water is supplied to the anode 1840 and is oxidized over an oxidation catalyst to form molecular oxygen ($O_2$), releasing protons (H+) and electrons (e−). The protons migrate through the ion-exchange layer 1860 toward the cathode 1820. The electrons flow through an external circuit (not shown). In one embodiment, the reaction is described as follows:

$$2H_2O \rightarrow 4H^+ + 4e^- + O_2$$

In other embodiments, other reactants can be supplied to the anode 1840 and other reactions can occur.

While the depicted embodiment shows an ion-exchange layer having three sublayers, certain embodiments employ ion-exchange layers having only a single layer (e.g., a cation conducting polymer layer or an anion conducting polymer layer). Other embodiments have only two sublayers.

Figure 19:
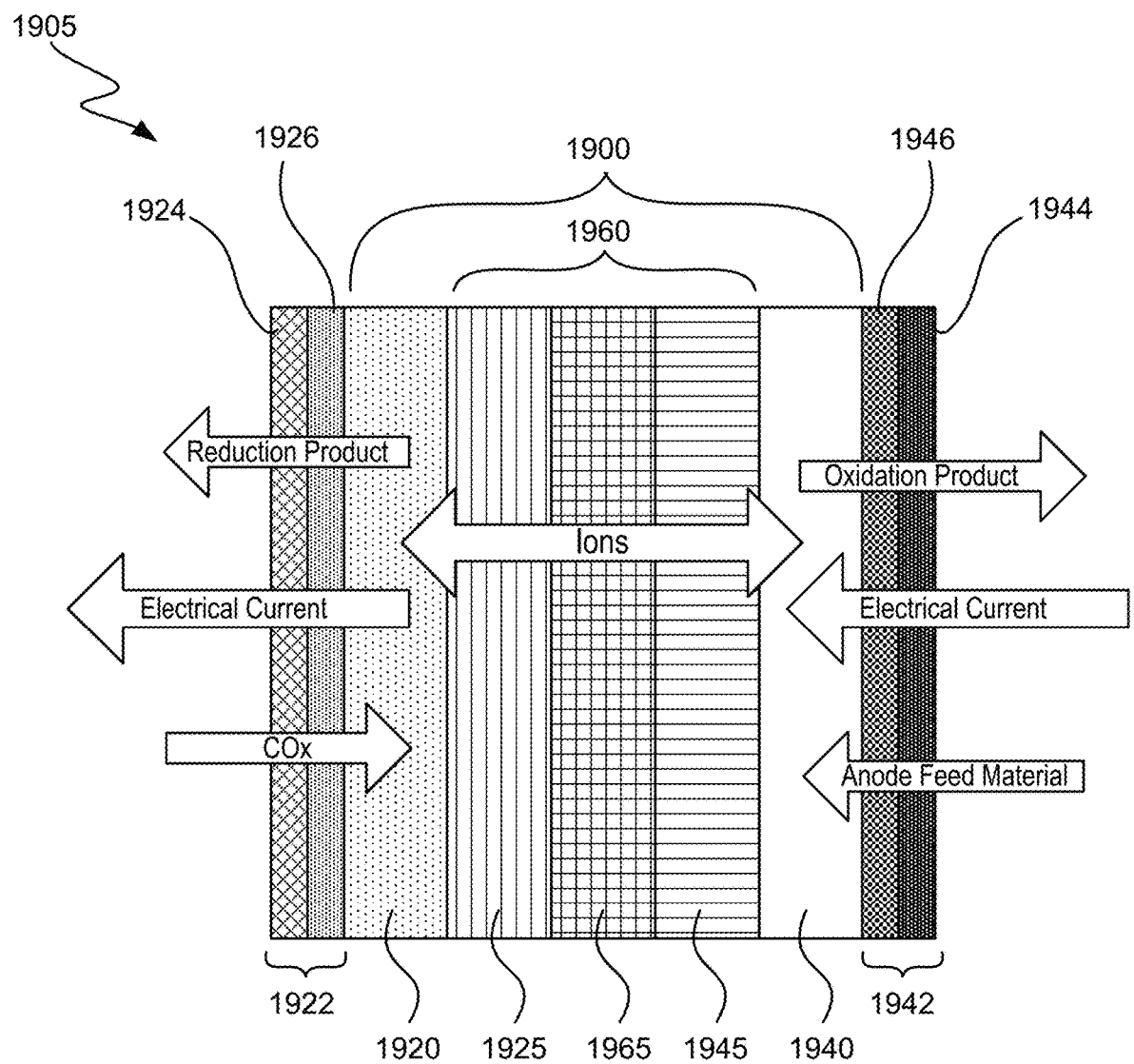
FIG. 19 is a schematic drawing that shows the major components of a CRR with arrows showing the flow of molecules, ions, and electrons according to various embodiments of the disclosure.

The flow of reactants, products, ions, and electrons through a CRR 1905 reactor is indicated in FIG. 19, according to an embodiment. The CRR 1905 has a membrane electrode assembly 1900 such as any of the MEAs described elsewhere herein. The membrane electrode assembly 1900 has a cathode 1920 and an anode 1940, separated by an ion-exchange layer 1960. In certain embodiments, the ion-exchange layer 1960 has three sublayers: a cathode buffer layer 1925, a polymer electrolyte membrane 1965, and an optional anode buffer layer 1945. In addition, the CRR 1905 has a cathode support structure 1922 adjacent to the cathode 1920 and an anode support structure 1942 adjacent to the anode 1940.

The cathode support structure 1922 has a cathode polar plate 1924, which may be made of graphite, to which a voltage can be applied. There can be flow field channels, such as serpentine channels, cut into the inside surfaces of the cathode polar plate 1924. There is also a cathode gas diffusion layer 1926 adjacent to the inside surface of the cathode polar plate 1924. In some arrangements, there is more than one cathode gas diffusion layer (not shown). The cathode gas diffusion layer 1926 facilitates the flow of gas into and out of the membrane electrode assembly 1900. An example of a cathode gas diffusion layer 1926 is a carbon paper that has a carbon microporous layer.

The anode support structure 1942 has an anode polar plate 1944, which may be made of metal, to which a voltage can be applied. There can be flow field channels, such as serpentine channels, cut into the inside surfaces of the anode polar plate 1944. There is also an anode gas diffusion layer 1946 adjacent to the inside surface of the anode polar plate 1944. In some arrangements, there is more than one anode gas diffusion layer (not shown). The anode gas diffusion layer 1946 facilitates the flow of gas into and out of the membrane electrode assembly 1900. An example of an anode gas diffusion layer 1946 is a titanium mesh or titanium felt. In some arrangements, the gas diffusion layers 1926, 1946 are microporous.

There can also be inlets and outlets associated with the support structures 1922, 1942, which allow flow of reactants and products, respectively, to the membrane electrode assembly 1900. There can also be various gaskets that prevent leakage of reactants and products from the cell.

$CO_x$ can be supplied to the cathode 1920 and reduced over $CO_x$ reduction catalysts in the presence of protons and electrons. The $CO_x$ can be supplied to the cathode 1920 at pressures between 0 psig and 1000 psig or any other suitable range. The $CO_x$ can be supplied to the cathode 1920 in concentrations below 100% or any other suitable percentage along with a mixture of other gases. In some arrangements, the concentration of $CO_x$ can be as low as approximately 0.5%, as low as 5%, or as low as 20% or any other suitable percentage.

In one embodiment, between approximately 10% and 100% of unreacted $CO_x$ is collected at an outlet adjacent to the cathode 1920, separated from reduction reaction products, and then recycled back to an inlet adjacent to the cathode 1920. In one embodiment, the oxidation products at the anode 1940 are compressed to pressures between 0 psig and 1500 psig.

In one embodiment, multiple CRRs (such as the one shown in FIG. 18) are arranged in an electrochemical stack and are operated together. The CRRs that make up the individual electrochemical cells of the stack can be connected electrically in series or in parallel. Reactants are supplied to individual CRRs and reaction products are then collected.

Figure 20:
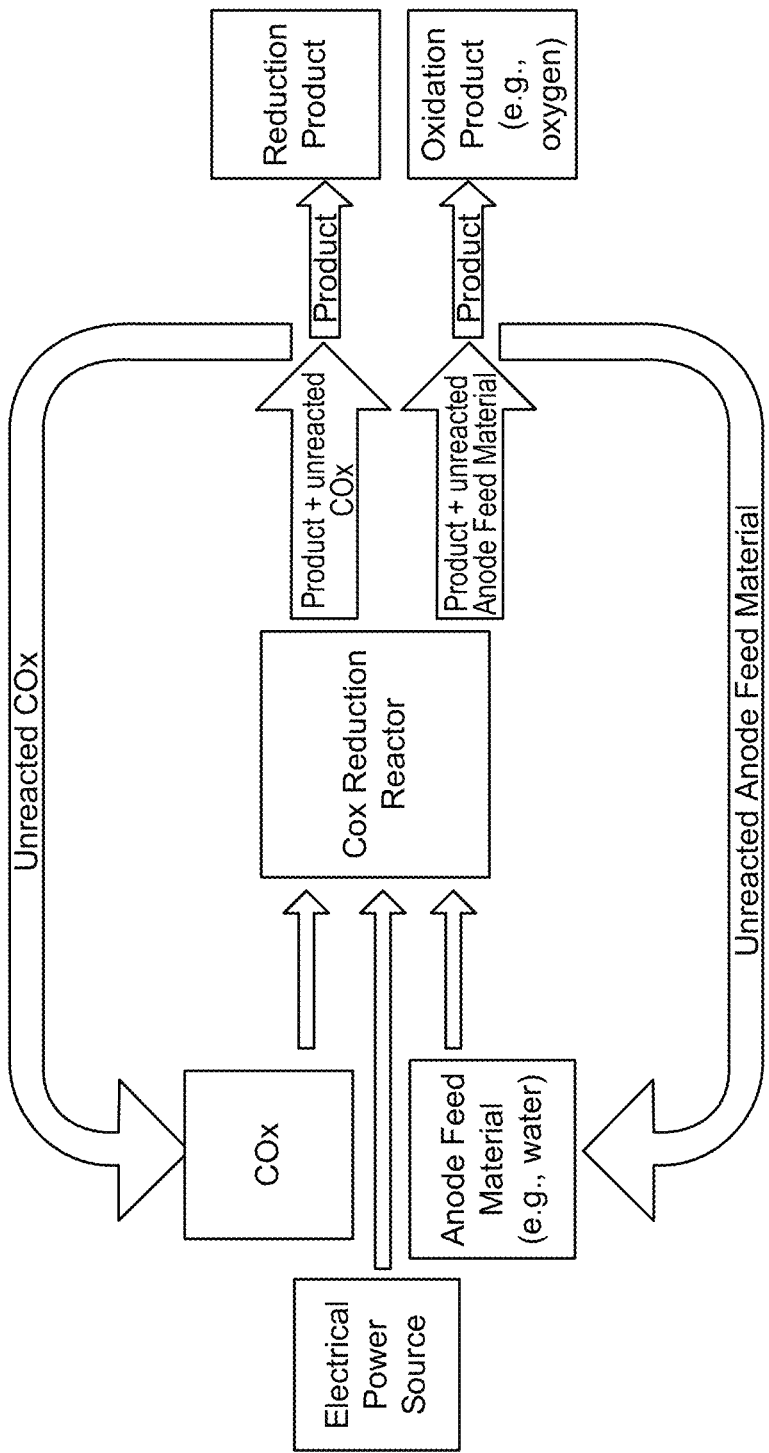
FIG. 20 is a schematic drawing that shows the major inputs and outputs of the CRR reactor according to various embodiments of the disclosure.

In accordance with some embodiments, inputs and outputs to the reactor are shown in FIG. 20. $CO_x$ anode feed material, and electricity are fed to the reactor. $CO_x$ reduction product and any unreacted $CO_x$ leave the reactor. Unreacted $CO_x$ can be separated from the reduction product and recycled back to the input side of the reactor. Anode oxidation product and any unreacted anode feed material leave the reactor in a separate stream. Unreacted anode feed material can be recycled back to the input side of the reactor.

Various catalysts in the cathode of a CRR cause different products or mixtures of products to form from $CO_x$ reduction reactions. Examples of possible $CO_x$ reduction reactions at the cathode are described as follows:

$$CO_2 + 2H^+ + 2e^- \rightarrow CO + H_2O$$

$$2CO_2 + 12H^+ + 12e^- \rightarrow CH_2CH_2 + 4H_2O$$

$$2CO_2 + 12H^+ + 12e^- \rightarrow CH_3CH_2OH + 3H_2O$$

$$CO_2 + 8H^+ + 8e^- \rightarrow CH_4 + 2H_2O$$

$$2CO + 8H^+ + 8e^- \rightarrow CH_2CH_2 + 2H_2O$$

$$2CO + 8H^+ + 8e^- \rightarrow CH_3CH_2OH + H_2O$$

$$CO + 6H^+ + 8e^- \rightarrow CH_4 + H_2O$$

In some embodiment, a method of operating a $CO_x$ reduction reactor, as described in the embodiments above, involves applying a DC voltage to the cathode polar plate and the anode polar plate, supplying oxidation reactants to the anode and allowing oxidation reactions to occur, supplying reduction reactants to the cathode and allowing reduction reactions to occur, collecting oxidation reaction products from the anode; and collecting reduction reaction products from the cathode. Current or voltage may be controlled to cycle according to a schedule as described above.

In one arrangement, the DC voltage is greater than about −1.2V. In various arrangements, the oxidation reactants can be any of hydrogen, methane, ammonia, water, or combinations thereof, and/or any other suitable oxidation reactants. In one arrangement, the oxidation reactant is water. In various arrangements, the reduction reactants can be any of carbon dioxide, carbon monoxide, and combinations thereof, and/or any other suitable reduction reactants. In one arrangement, the reduction reactant is carbon dioxide.

What is claimed is:

1. A membrane electrode assembly (MEA) comprising:
a cathode catalyst layer comprising a carbon oxide reduction catalyst that selectively promotes production of a product selected from a hydrocarbon, a carboxylic acid, or an alcohol, wherein the carbon oxide reduction catalyst comprises copper,
wherein the roughness factor of the cathode catalyst layer is below 0.25;
an anode catalyst layer comprising a catalyst that promotes oxidation of water; and
a polymer electrolyte membrane (PEM) layer disposed between, and in contact with, the cathode catalyst layer and the anode catalyst layer, wherein the cathode catalyst layer is characterized by a catalyst loading of less than 1 mg/cm$^2$ and wherein the PEM layer comprises an anion conducting polymer layer in contact with the cathode catalyst layer.

2. The MEA of claim 1, wherein the catalyst loading is less than 0.5 mg/cm$^2$.

3. The MEA of claim 1, wherein the catalyst loading is less than 0.25 mg/cm$^2$.

4. The MEA of claim 1, wherein the catalyst loading is less than 0.15 mg/cm$^2$.

5. The MEA of claim 1, wherein the copper is pure copper.

6. The MEA of claim 1, wherein the copper is in a mixture of nanoparticles, the mixture comprising copper nanoparticles and further comprising nanoparticles comprising one or more of silver, gold, and nickel.

7. The MEA of claim 1, wherein the copper is a copper alloy.

8. The MEA of claim 1, further comprising salt ions from a salt solution that contacts the MEA, wherein the salt ions in the salt solution have a concentration of at least about 10 μM.

9. The MEA of claim 1, further comprising salt ions from a salt solution that contacts the MEA, wherein the salt ions in the salt solution have a concentration of at least about 10 mM.

10. The MEA of claim 8, wherein the product is methane and the salt ions are sodium ions.

11. The MEA of claim 8, wherein the product has two or more carbon atoms and the salt ions comprise ions of potassium, cesium, rubidium, or any combination thereof.

12. The MEA of claim 1, wherein the MEA is bipolar, and wherein the MEA further comprises at least one layer of a cation conducting polymer.

13. The MEA of claim 1, wherein the PEM layer comprises a polymer electrolyte layer and a cathode buffer layer.

14. The MEA of claim 13, wherein the polymer electrolyte layer comprises a cation conducting polymer and the cathode buffer layer comprises the anion conducting polymer layer.

15. The MEA of claim 14, wherein the polymer electrolyte layer is between 20 and 60 microns thick.

16. The MEA of claim 14, wherein the ratio of the thickness of the polymer electrolyte layer to the thickness of the cathode buffer layer is at least 3:1.

17. The MEA of claim 14, wherein the cathode buffer layer is no more than 20 microns thick.

18. The MEA of claim 1, wherein the MEA is an anion-exchange membrane (AEM)-only MEA and the AEM comprises the anion conducting polymer layer.

19. The MEA of claim 18, wherein the AEM is between 10 and 75 microns thick.

20. The MEA of claim 1, wherein the carbon oxide reduction catalyst is supported on a support structure.

21. The MEA of claim 20, wherein the support structure comprises carbon.

22. The MEA of claim 1, wherein the carbon oxide reduction catalyst is in the form of metal particles.

23. The MEA of claim 1, wherein the carbon oxide reduction catalyst is in the form of metal nanoparticles.

24. The MEA of claim 1, wherein the catalyst loading is less than 0.1 mg/cm$^2$.

25. The MEA of claim 1, wherein the MEA is capable of producing methane from carbon dioxide at a selectivity of at least 25% as measured by Faradaic yield under an applied current density of 200 mA/cm$^2$.

26. A membrane electrode assembly (MEA) comprising:
a cathode catalyst layer comprising a carbon oxide reduction catalyst that selectively promotes production of a product selected from a hydrocarbon, a carboxylic acid, or an alcohol,
wherein the roughness factor of the cathode catalyst layer is below 0.25;
an anode catalyst layer comprising a catalyst that promotes oxidation of water; and
a polymer electrolyte membrane (PEM) layer disposed between, and in contact with, the cathode catalyst layer and the anode catalyst layer, wherein the cathode catalyst layer is characterized by a copper loading of less than 0.1 mg/cm$^2$ and wherein the PEM layer comprises an anion conducting polymer layer in contact with the cathode catalyst layer.

27. A $CO_2$ electrolyzer comprising:
a cell comprising:
a cathode catalyst layer comprising a carbon oxide reduction catalyst that selectively promotes production of a product selected from a hydrocarbon, a carboxylic acid, or an alcohol, wherein the carbon oxide reduction catalyst comprises copper, and
wherein the roughness factor of the cathode catalyst layer is below 0.25;
an anode catalyst layer comprising a catalyst that promotes oxidation of water;
a polymer electrolyte membrane (PEM) layer disposed between, and in contact with, the cathode catalyst layer and the anode catalyst layer, wherein the cathode catalyst layer is characterized by a copper catalyst loading of less than 0.6 mg/cm$^2$ and wherein the PEM layer comprises an anion conducting polymer layer in contact with the cathode catalyst layer; and
a power source controller configured to apply a current to the cell at a current density of at least 400 mA/cm$^2$.

28. The $CO_2$ electrolyzer of claim 27, wherein the power source controller is configured to apply the current to the cell at the current density of at least 500 mA/cm$^2$ and wherein the copper loading is less than 0.25 mg/cm$^2$.

29. The $CO_2$ electrolyzer of claim 27, wherein the copper loading is less than 0.14 $mg/cm^2$.

\* \* \* \* \*